United States Patent
Oka et al.

(10) Patent No.: US 8,204,919 B2
(45) Date of Patent: Jun. 19, 2012

(54) FILE GENERATION APPARATUS, METHOD, PROGRAM, AND RECORDING MEDIUM

(75) Inventors: Takeshi Oka, Kanagawa (JP); Satoshi Katsuo, Kanagawa (JP); Takashi Furukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 397 days.

(21) Appl. No.: 10/560,128

(22) PCT Filed: Jun. 9, 2004

(86) PCT No.: PCT/JP2004/008402
§ 371 (c)(1),
(2), (4) Date: Dec. 9, 2005

(87) PCT Pub. No.: WO2004/112024
PCT Pub. Date: Dec. 23, 2004

(65) Prior Publication Data
US 2007/0094290 A1    Apr. 26, 2007

(30) Foreign Application Priority Data
Jun. 11, 2003   (JP) ............................... P2003-165859

(51) Int. Cl.
G06F 12/00        (2006.01)
G06F 17/30        (2006.01)
(52) U.S. Cl. ....................................... 707/823; 382/302
(58) Field of Classification Search ................... 707/802, 707/803, 823; 386/46, 104, 124
See application file for complete search history.

(56) References Cited

U.S. PATENT DOCUMENTS

| 5,166,921 | A  | * | 11/1992 | Matsui ........................ 369/275.3 |
| 5,539,723 | A  | * | 7/1996  | Hoshino et al. ............. 369/47.31 |
| 6,118,754 | A  | * | 9/2000  | Sako et al. .................. 369/275.3 |
| 6,269,080 | B1 | * | 7/2001  | Kumar .......................... 370/236 |
| 6,393,206 | B1 | * | 5/2002  | Yagi et al. ..................... 386/125 |
| 6,427,150 | B1 | * | 7/2002  | Oashi et al. ..................... 707/10 |
| 6,574,417 | B1 | * | 6/2003  | Lin et al. ......................... 386/70 |
| 6,883,111 | B2 | * | 4/2005  | Yoshida et al. ................ 714/6.1 |
| 7,272,613 | B2 | * | 9/2007  | Sim et al. ..................... 707/102 |
| 2001/0010752 | A1 |   | 8/2001 | Ando et al. |
| 2004/0042370 | A1 | * | 3/2004 | Sugimura et al. .......... 369/59.25 |
| 2004/0057704 | A1 | * | 3/2004 | Katsuo et al. ................. 386/125 |
| 2005/0025460 | A1 | * | 2/2005 | Hyodo et al. .................... 386/95 |

(Continued)

FOREIGN PATENT DOCUMENTS
EP       0 598 411       5/1994
(Continued)

*Primary Examiner* — Apu M Mofiz
*Assistant Examiner* — Mohammad Rahman
(74) *Attorney, Agent, or Firm* — Frommer Lawrence & Haug LLP; William S. Frommer; Thomas F. Presson

(57) ABSTRACT

A file generating apparatus for improving the usability of recording media and providing efficient read and write processes. A header control portion generates a header arranged at the beginning of a file. A footer control portion generates a footer arranged at the end of the file. A filler control portion generates a filler so that the data amount of a body, the header, or the footer of the file corresponds to an integral multiple of an ECC block on an optical disk by adding the filler to the body, the header, or the footer. A KLV encoder KLV-encodes a filler for the body according to the KLV structure. The present invention can be applied to a disk apparatus that records video data or audio data on optical disks.

10 Claims, 58 Drawing Sheets

U.S. PATENT DOCUMENTS

2005/0198071 A1* 9/2005 Yoo et al. .................. 707/104.1
2005/0237865 A1* 10/2005 Ando et al. ................. 369/30.3

FOREIGN PATENT DOCUMENTS

| | | |
|---|---|---|
| EP | 1 118 998 | 7/2001 |
| EP | 1 357 554 | 10/2003 |
| EP | 1 427 217 | 6/2004 |
| JP | 58 53010 | 3/1983 |
| JP | 59 60670 | 4/1984 |
| JP | 8 102148 | 4/1996 |
| JP | 8-289248 | 11/1996 |
| JP | 11 238361 | 8/1999 |
| JP | 2002-218398 | 8/2002 |
| JP | 2002-230952 | 8/2002 |
| JP | 2004-508777 | 3/2004 |
| JP | 2004-112425 | 4/2004 |
| WO | WO 00/14740 | 3/2000 |
| WO | WO 02/21845 | 3/2002 |

* cited by examiner

FIG.23

|  | Value | GOV | Frame/GOV |
|---|---|---|---|
| 525/60 | 384000 | 64000 | 10 |
| 24P | 384000 | 64000 | 8 |
| 60P | 384000 | 64000 | 20 |
| 626/50 | 384000 | 76800 | 10 |

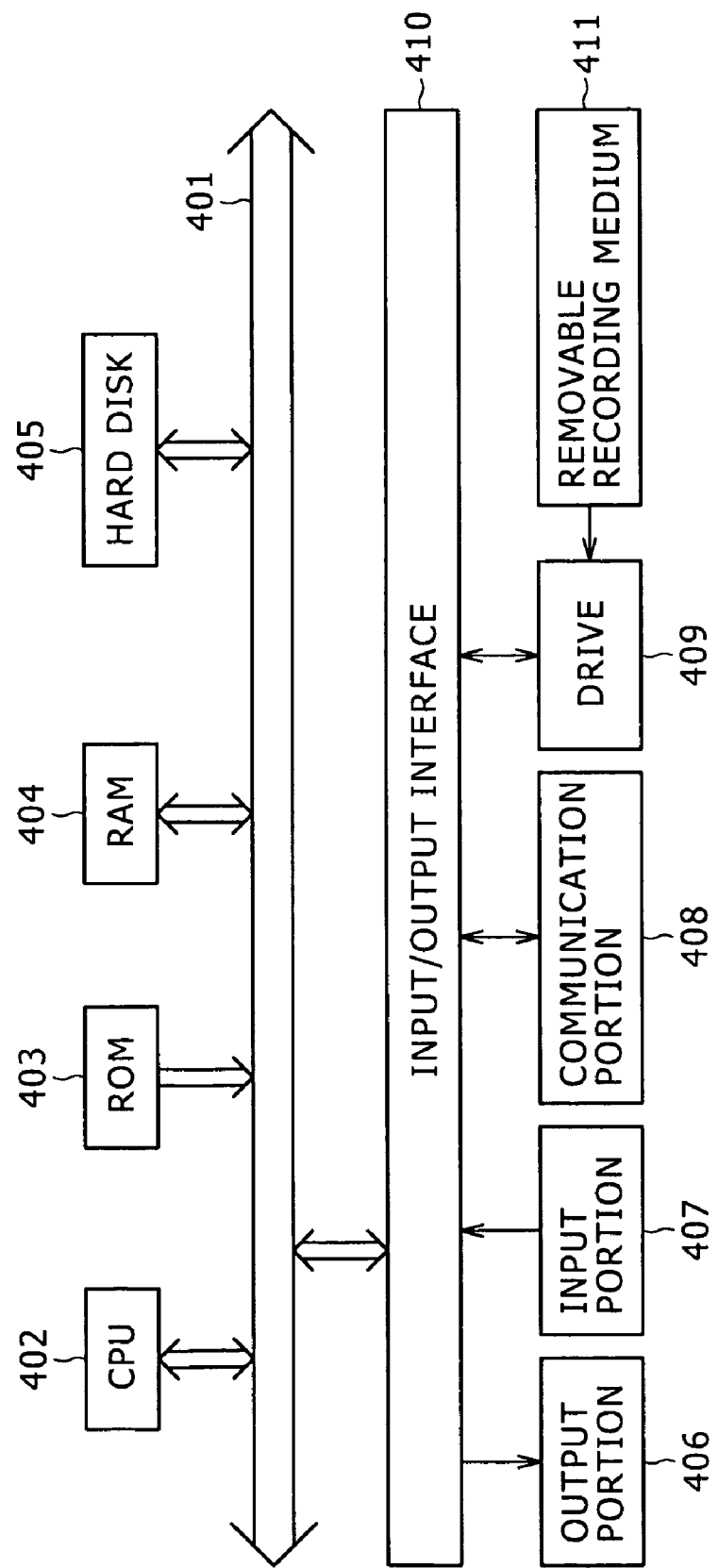
F I G . 5 9

FILE GENERATION APPARATUS, METHOD, PROGRAM, AND RECORDING MEDIUM

TECHNICAL FIELD

The present invention relates to a file generation apparatus, method, program, and recording medium. More specifically, the present invention relates to a file generation apparatus, method, program, and recording medium for generating or recording files suited for recording on a recording medium.

BACKGROUND ART

In recent years, there is an increasing demand for standardizing communication protocols and the like and decreasing prices of communication devices and the like. It has become a general trend to provide personal computers already equipped with a communication I/F (interface).

Further, it has become common practice to already equip or to be able to equip the communication I/F for not only personal computers, but also professional-use broadcast equipments such as AV (Audio Visual) servers and VTRs (Video Tape Recorders). The broadcast equipments exchange files of video data and audio data (hereafter collectively referred to as AV data) with each other.

Generally, it has been a general practice to exchange files between broadcast equipments using formats specific to models and manufacturers, for example. Exchanging files has been difficult between broadcast equipments of different models or manufacturers.

To solve this problem, for example, MXF (Material eXchange Format) is proposed as a file exchange format and is currently in the process of standardization.

MXF is a file format in consideration for streaming in addition to file exchange and multiplexes video data and audio data in fine units such as frames.

As mentioned above, MXF multiplexes video data and audio data for each frame in consideration for streaming. Accordingly, it has been difficult to incorporate an MXF file into a storage and then separately edit video data and audio data (AV independent editing).

To solve this problem, there is a method of using the broadcast equipment to incorporate an MXF file and converting it into a specifically formatted file. When the broadcast equipment converts an MXF file into a file formatted completely irrelevantly to MXF, however, it is difficult to handle that file on another broadcast equipment.

For example, let us consider that a given equipment records a specifically formatted file on a storage and another broadcast equipment accesses that file via a communication I/F such as IEEE (Institute of Electrical and Electronics Engineers) 1394 or USB (Universal Serial Bus). When the other broadcast equipment cannot comprehend that specific format, this broadcast equipment cannot handle (or read, in this example) the specifically formatted file.

Further, let us consider that a given broadcast equipment records a specifically formatted file on a removable recording medium such as an optical disk. When the removable recording medium is mounted on another broadcast equipment and the other broadcast equipment cannot comprehend that specific format, this broadcast equipment cannot handle the specifically formatted file.

When an attempt is made to record a specifically formatted file on a recording medium, the formatting system may be incompatible with the recording medium. To read or write such file on the recording medium, there may be a need for reading or writing data larger than the file to be read or written, for example.

DISCLOSURE OF THE INVENTION

The present invention has been made in consideration of the foregoing. It is therefore an object of the present invention to, for example, improve the usability of recording media such as fast reading a header, a body, or a footer constituting a file and to provide efficient read and write processes by decreasing operations of reading or writing unnecessary data while a file is read from or written to a recording medium.

A file generation apparatus according to the present invention comprises: a first generation means for generating second data to be arranged at the beginning of the file; second generation means for generating third data to be arranged at the end of the file; and third generation means for generating fourth data which allows the data amount of the first, second, or third data to be an integral multiple of a unit of reading or writing to the recording medium by adding the fourth data to the first data, the second data, or the third data.

The first generation means can generate the second data, i.e., a header of the file.

The first generation means can further comprise format conversion means for converting the first data into a KLV (Key, Length, Value) structure. The first generation means can generate the second data composed of the file's header, and a key and a length arranged between the header and the first data.

The third generation means can generate the fourth data by making an addition to each of N−1 portions of the first data toward the beginning out of the first data divided into N portions, where N is an integer, so that the data amount of each of the first data divided into N−1 portions becomes an integral multiple of a physical unit area of the recording medium and the overall data amount of the first data becomes an integral multiple of the unit of reading and writing on the recording medium.

The third generation means can generate the fourth data for the first data divided into units corresponding to specified reproduction times with video data and audio data for a plurality of channels multiplexed in accordance with the divided units so that the data amount for each of divided units of the first data corresponds to an integral multiple of the unit of reading and writing on the recording medium.

The third generation means can generate the fourth data so that the data amount totaling partition data for separating divided portions of the first data from each other, metadata contained in each of divided portions of the first data, and the video data corresponds to an integral multiple of the unit of reading and writing on the recording medium.

The third generation means can generate the fourth data so that the data amount of each of divided portions of the audio data contained in each of divided portions of the first data corresponds to an integral fraction of the unit of reading and writing on the recording medium and the overall data amount of the audio data corresponds to an integral multiple of the unit of reading and writing on the recording medium.

A file generation method according to the present invention comprises: a first generation step of generating second data to be arranged at the beginning of the file; a second generation step of generating third data to be arranged at the end of the file; and a third generation step of generating fourth data which allows the data amount of the first, second, or third data to be an integral multiple of a unit of reading or writing to the recording medium by adding the fourth data to the first data, the second data, or the third data.

A program according to the present invention allows a computer to perform: a first generation step of generating second data to be arranged at the beginning of the file; a second generation step of generating third data to be arranged at the end of the file; and a third generation step of generating fourth data which allows the data amount of the first, second, or third data to be an integral multiple of a unit of reading or writing to the recording medium by adding the fourth data to the first data, the second data, or the third data.

A recording medium according to the present invention is characterized as follows. First additional data is added to record the first data whose data amount corresponds to an integral multiple of a unit of reading or writing to the recording medium so that a boundary of the first data matches a boundary of the unit. Second data is arranged at the beginning of the file and is attached with second additional data to have the data amount corresponding to an integral multiple of the unit so that a boundary of the second data matches a boundary of the unit. Third data is arranged at the end of the file and is attached with third additional data to have the data amount corresponding to an integral multiple of the unit so that a boundary of the third data matches a boundary of the unit.

The file generation apparatus, the method, and the program according to the present invention generate the second data to be arranged at the beginning of a file and the third data to be arranged at the end of the file. The fourth data is generated and is attached to the first, second, or third data so that the data amount of the first, second, or third data corresponds to an integral multiple of a unit of reading or writing to the recording medium.

On the recording medium according to the present invention, first additional data is added to record the first data whose data amount corresponds to an integral multiple of a unit of reading or writing to the recording medium so that a boundary of the first data matches a boundary of the unit. Second data is arranged at the beginning of the file and is attached with second additional data to have the data amount corresponding to an integral multiple of the unit so that a boundary of the second data matches a boundary of the unit. Third data is arranged at the end of the file and is attached with third additional data to have the data amount corresponding to an integral multiple of the unit so that a boundary of the third data matches a boundary of the unit.

BRIEF DESCRIPTION OF DRAWINGS

FIG. 23 shows the data amount of a KLV-structured picture essence.

FIG. 59 is a block diagram exemplifying the configuration of a computer according to an embodiment of the present invention.

BEST MODE FOR CARRYING OUT THE INVENTION

Figure 1:
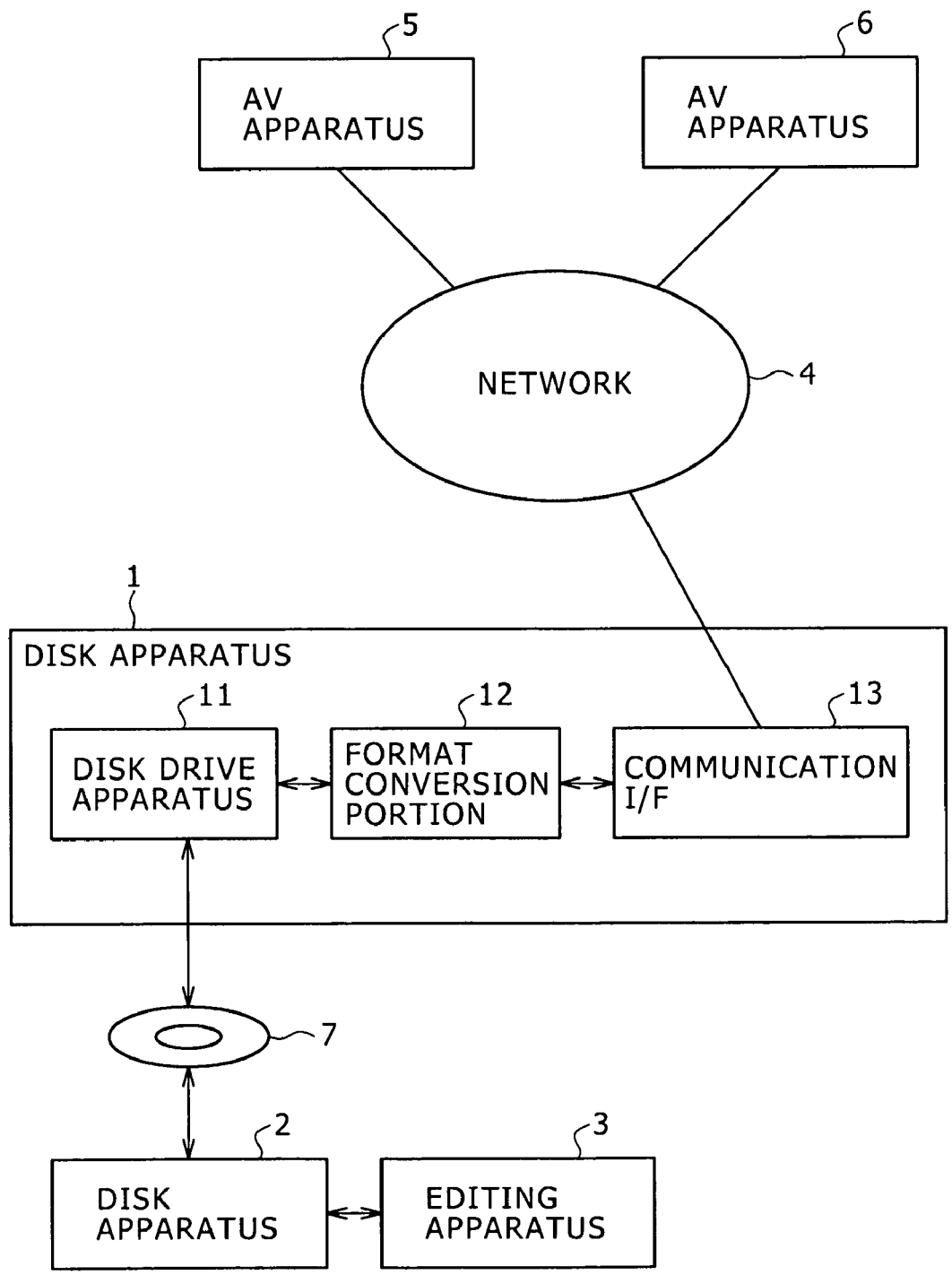
FIG. 1 is a block diagram exemplifying the configuration of an AV network system according to an embodiment of the present invention.

FIG. 1 is a block diagram exemplifying the configuration of an AV network system (the system refers to a logical aggregate of multiple apparatuses independently of whether or not constituent apparatuses are included in the same container) according to an embodiment of the present invention.

A disk apparatus 1 is composed of a disk drive apparatus 11, a format conversion portion 12, and a communication I/F 13. The disk apparatus 1 receives a file of AV data transmitted via a network 4 and records the file on an optical disk 7. The disk apparatus 1 reads the file of AV data recorded on the optical disk 7 and transmits it via the network 4.

That is, the optical disk 7 can be mounted to and demounted from the disk drive apparatus 11. The disk drive apparatus 11 drives the optical disk 7 mounted thereon to record a file having an AV independent format file to be described later. This file is supplied from the format conversion portion 12. The disk drive apparatus 11 reads the AV independent format file from the optical disk 7 and supplies it to the format conversion portion 12.

The format conversion portion 12 is supplied with the AV independent format file from the disk drive apparatus 11, converts this file into a file having a standard AV multiplexing format to be described, and supplies the converted file to the communication I/F 13. The format conversion portion 12 is supplied with the standard AV multiplexing format file supplied from the communication I/F 13, converts the file into an AV independent format file, and supplies it to the disk drive apparatus 11.

The communication I/F 13 is composed of, for example, an IEEE (Institute of Electrical and Electronics Engineers) 1394 port, a USB (Universal Serial Bus) port, an NIC (Network Interface Card) for LAN (Local Area Network) communication, an analog modem, a TA (Terminal Adapter), a DSU (Digital Service Unit), an ADSL (Asymmetric Digital Subscriber Line) modem, and the like. The communication I/F 13 exchanges standard AV multiplexing format files via the network 4 such as the Internet and intranets. That is, the communication I/F 13 transmits standard AV multiplexing format files supplied from the format conversion portion 12 via the network 4. The communication I/F 13 receives standard AV multiplexing format files transmitted via the network 4 and supplies the files to the format conversion portion 12.

In the disk apparatus 1 according to the above-mentioned configuration, the communication I/F 13 receives a standard AV multiplexing format file transmitted via the network 4 and supplies the received file to the format conversion portion 12. The format conversion portion 12 converts the standard AV multiplexing format file received from the communication I/F 13 into an AV independent format file and supplies this file to the disk drive apparatus 11. The disk drive apparatus 11 records the AV independent format file from the format conversion portion 12 on the optical disk 7 mounted thereon.

The disk apparatus 1 reads the AV independent format file from the optical disk 7 mounted thereon and supplies the file to the format conversion portion 12. The format conversion portion 12 converts the AV independent format file from the disk drive apparatus 11 and supplies this file to the communication I/F 13. The communication I/F 13 transmits the standard AV multiplexing format file from the format conversion portion 12 via the network 4.

The standard AV multiplexing format is compliant with the MXF standard, for example, and is composed of a header, a body, and a footer. Since the standard AV multiplexing format file is compliant with the MXF standard, the body contains AV data, i.e., video data and audio data, multiplexed in units of frames, for example.

In FIG. 1, AV apparatuses 5 and 6 are connected to the network 4. The AV apparatuses 5 and 6 are compliant with the MXF standard and are capable of handling MXF compliant files. Accordingly, the AV apparatuses 5 and 6 can transmit standard AV multiplexing format files to the disk apparatus 1 via the network 4. Further, the AV apparatuses 5 and 6 can receive standard AV multiplexing format files transmitted from the disk apparatus 1 via the network 4. That is, the disk apparatus 1 can exchange standard AV multiplexing format files with the AV apparatus 5 or 6 via the network 4. Moreover, the AV apparatuses 5 and 6 can apply various processes such as streaming reproduction to received standard AV multiplexing format files.

Depending on cases, apparatuses compliant with the present MXF standard such as the AV apparatuses 5 and 6 are hereafter referred to as standard apparatuses.

Similarly to a standard AV multiplexing format file, an AV independent format file is composed of a header, a body, and a footer. However, the body format differs from the standard AV multiplexing format. That is, the AV independent format allows video data and audio data to be available as independent files. A video file, i.e., a file for video data, has a header and a footer similarly to standard AV multiplexing format files. The video file's body collectively contains video data. An audio file, i.e., a file for audio data, has a header and a footer similarly to standard AV multiplexing format files. The audio file's body collectively contains audio data.

Let us assume that the disk apparatus 1 transmits an AV independent format video file or audio file to the AV apparatus 5 or 6. The AV apparatus 5 or 6 as the standard apparatus, unless compliant with the AV independent format, cannot handle video data or audio data contained in the body of the AV independent format video file or audio file. However, the AV apparatus 5 or 6 can handle the AV independent format video file or audio file itself. Similarly to a standard AV multiplexing format file, the AV independent format video file or audio file is composed of the header, the body, and the footer. The header and the footer have the same format as that of standard AV multiplexing format files. Unless the body "content" (data contained in the body) is referenced, the AV independent format video file or audio file itself is equivalent to a standard AV format file (i.e., standard AV format compliant file). Even when the AV apparatus 5 or 6 as the standard apparatus is incompatible with the AV independent format, the AV apparatus 5 or 6 can handle the AV independent format video file or audio file itself.

That is, only exchange of AV independent format files is available between the disk apparatus 1 and the standard apparatuses such as AV apparatuses 5 and 6.

As mentioned above, unless the body "content" is referenced, the AV independent format file is equivalent to the standard AV multiplexing format file. From this viewpoint, AV independent format files are compatible with standard AV multiplexing format files.

In FIG. 1, the optical disk 7 can be mounted or dismounted from the disk apparatus 2. Similarly to the AV apparatuses 5 and 6, for example, the disk apparatus 2 is a standard apparatus. From the optical disk 7 mounted thereon, the disk apparatus 2 reads an AV independent format video file or audio file and supplies it to an editing apparatus 3.

As mentioned above, unless the body "content" is referenced, the AV independent format video file or audio file is equivalent to a standard AV multiplexing format file. The disk apparatus 2 as the standard apparatus can read AV independent format video files or audio files from the optical disk 7.

The editing apparatus 3 is compatible with the AV independent format and is capable of handling AV independent format files. For example, the editing apparatus 3 performs AV independent editing for AV independent format video files or audio files supplied from the disk apparatus 2. The editing apparatus 3 supplies the disk apparatus 2 with the edited AV independent format video files or audio files.

The disk apparatus 2 records the AV independent format video files or audio files supplied from the editing apparatus 3 on the mounted optical disk 7.

As mentioned above, unless the body "content" is referenced, the AV independent format video file or audio file is equivalent to a standard AV multiplexing format file. The disk apparatus 2 as the standard apparatus can record AV independent format video files or audio files on the optical disk 7.

As mentioned above, the standard AV multiplexing format file uses its body to contain video data and audio data multiplexed in units of frames, for example. By contrast, the AV independent format video file or audio file uses its body to collectively contain video data or audio data. This can facilitate editing such as AV independent editing. The AV independent format file uses the header and the footer having the same format as the standard AV multiplexing format file. Unless the body "content" is referenced, AV independent format files are compatible with standard AV multiplexing format files and therefore can be processed on the standard apparatus.

Figure 2:
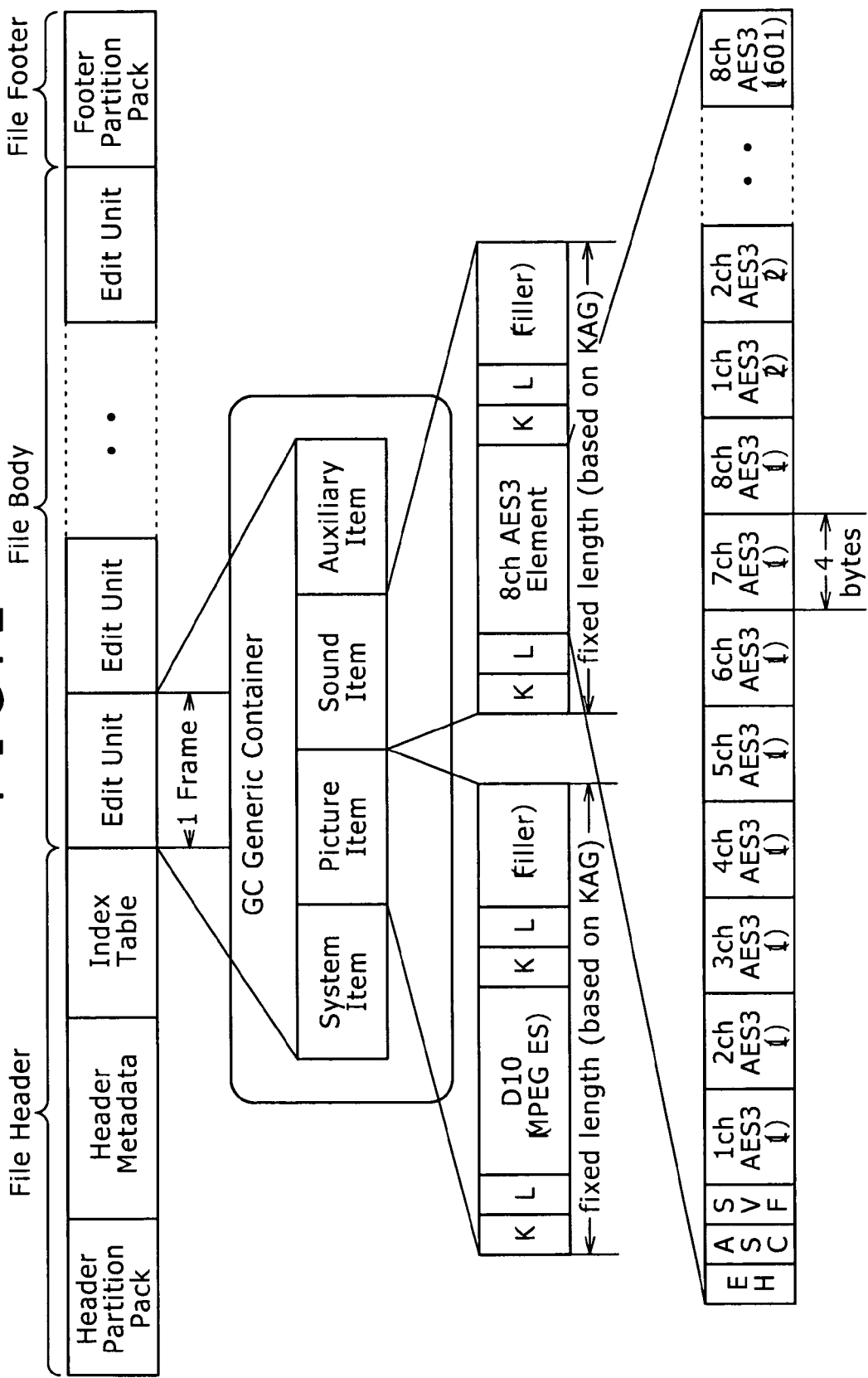
FIG. 2 shows a standard AV multiplexing format.

FIG. 2 shows an example of the standard AV multiplexing format.

FIG. 2 shows the standard AV multiplexing format for video data and audio data contained in the body. The video data is encoded with MPEG (Moving Picture Experts Group) IMX called D10. The audio data is uncompressed according to the AES (Audio Engineering Society) 3 format.

In addition, the body can contain the other video data and audio data according to various formats such as DV (Digital Video).

A standard AV multiplexing format file is composed of a header (File Header), a body (File Body), and a footer (File Footer) in order from the beginning.

The header contains Header Partition Pack, Header Metadata, and Index Table in order from the beginning. The header partition pack contains data for specifying a header and information indicative of a format of data contained in the body and a file format. The header metadata contains, for example, file-based metadata such as a file creation date and information about data contained in the body. The index table contains a table indicative of an edit unit (to be described) contained in the body.

The metadata includes a time code supplied to the video file for each frame or the like, UMID (Unique Material Identifier), GPS (Global Positioning System) information representing positions of capturing by a video camera, capturing date and time (year, month, day, hour, minute, second), ARIB (Association of Radio Industries and Businesses) metadata, and setting or control information about the video camera for capturing. ARIB metadata is standardized by ARIB and is superposed on a standard communication interface such as SDI (Serial Digital Interface). The setting or control information about the video camera includes, for example, IRIS control values, white-balance or black-balance mode, and lens information about lens zooms and focuses.

The index table is optional and may or may not be included in the header. The header can contain various optional data as well as the index table.

The header partition pack contains information indicative of the file format. The standard AV multiplexing format file uses that information to represent the standard AV multiplexing format. The AV independent format file uses that file to represent the AV independent format. The header partition pack format itself is unchanged for the standard AV multiplexing format and the AV independent format.

The footer is composed of Footer Partition Pack that contains data for specifying a footer and the like.

The body is composed of one or more edit units. The edit unit signifies a unit per frame. The edit unit contains AV data and the like for one frame.

That is, the edit unit is composed of a system item, a picture item, a sound item, and an auxiliary item in order from the beginning.

The system item contains metadata (frame-based metadata) concerning a frame of video data contained in the succeeding picture item. The frame-based metadata includes time records, for example.

The picture item contains video data for one frame. In FIG. 2, the picture item contains the above-mentioned D10 formatted video data.

The picture item contains video data for one frame according to KLV coding in the KLV (Key, Length, Value) structure.

The KLV structure contains a key, a length, and a value from the beginning in order. The key contains an SMPTE 298M standard compliant 16-byte label indicating what data is contained in the value. The length contains the length of data contained in the value. The value contains actual data, i.e., video data for one frame in this example.

The picture item uses a fixed data length based on KAG (KLV Alignment Grid). For the picture item to have the fixed length, a filler as stuffing data also uses the KLV structure and is arranged after the video data of the picture item.

The fixed length is based on KAG, i.e., the picture item's data length and is expressed in integral multiples (e.g., 512 bytes, 2 kilobytes, and the like) of the sector length of the optical disk 7, for example. In this case, the affinity between the optical disk 7 and the picture item increases, making it possible to accelerate operations to read and write the picture item on the optical disk 7.

Similarly to the picture item, the KLV structure is used for not only the above-mentioned system item, but also the sound item and the auxiliary item to be described. These items use the fixed data lengths with reference to the KAG.

The sound item contains audio data for one frame of the video data contained in the picture item according to the KLV structure similarly to the above-mentioned picture item.

The sound item contains multiple pieces of audio data, e.g., eight channels of multiplexed audio data.

In the sound item, the value of the KLV structure contains Element Header EH, Audio Sample Count ASC, Stream Valid Flags SVF, and multiplexed 8-channel audio data in order from the beginning.

In the sound item, the 8-channel audio data is multiplexed by arranging audio data samples such as a first sample, a second sample, and so on in order for each of eight channels in one frame. In FIG. 2, audio data is shown at the bottom. A number in parentheses indicates to which ordinal position the audio data sample corresponds.

The element header EH contains data to specify the element header and the like. The audio sample count ASC contains the number of audio data samples contained in the sound item. The stream valid flag SVF is an eight-bit (one-byte) flag. Each bit represents whether or not audio data for the channel corresponding to that bit is valid. That is, each bit of the stream valid flag SVF is set to 1 for example when audio data for the channel corresponding to the bit is valid. Each bit thereof is set to 0 for example when audio data for the channel corresponding to the bit is invalid.

The auxiliary item contains necessary user data. Accordingly, the auxiliary item provides an area where a user can place any type of data.

As mentioned above, the standard AV multiplexing format multiplexes the system item containing frame-based metadata, the picture item containing video data, the sound item containing audio data, and the auxiliary item containing user data in units of frames. Further, the sound item multiplexes 8-channel audio data in units of samples.

There may be a case where video data and audio data are contained in different files. In this case, the video data and the audio data cannot be reproduced until all the files for the video data and the audio data are received. By contrast, the standard AV multiplexing format multiplexes video data and audio data in units of frames. Receiving video data and audio data for one frame promptly makes it possible to reproduce the video data and the audio data for the frame. Accordingly, the standard AV multiplexing format is suited for streaming.

As mentioned above, the standard AV format multiplexes video data and audio data in units of frames and is suited for streaming. On the contrary, however, the standard AV format difficultly provides AV independent editing to independently edit video data and audio data.

Further, the file-based metadata is scattered in the system item of the edit unit and is difficultly handled during editing and the like.

The AES3 standard is compliant with the standard AV format and has the specification of allocating at least four bytes to one sample of audio data, thus increasing the size of the entire file.

Figure 3:
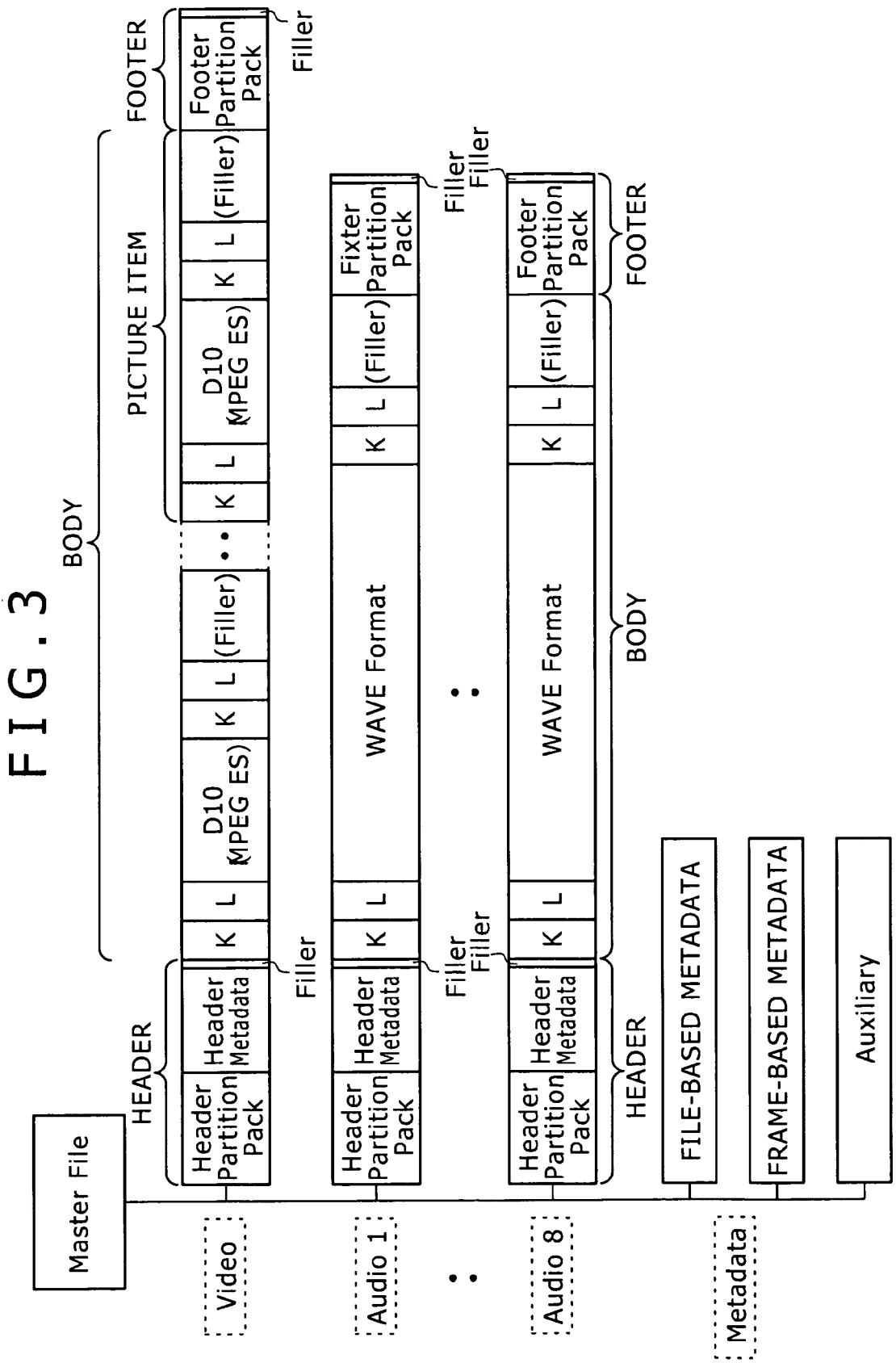
FIG. 3 shows an AV independent format.

FIG. 3 shows an example of the AV independent format.

The AV independent format uses independently arranged files for video data, audio data, file-based metadata, and user data while these data are multiplexed in the standard AV multiplexing format.

That is, the AV independent format uses the body to collectively contain picture items that contain video data according to the standard AV multiplexing format. Further, the body is provided with a header and a footer having the same format as the standard AV multiplexing format to constitute a video file.

The body of the video file according to the AV independent format collectively contains as many picture items as an integral multiple of the sector length for the optical disk 7. Accordingly, the size of the entire body is equivalent to an integral multiple of the sector length for the optical disk 7. That is, the body of the video file according to the AV independent format is sized in accordance with sector alignment.

Further, the entire body of the video file is sized to an integral multiple of the ECC block length for the optical disk 7. As will be described later, the last filler in the body is sized so that the entire body of the video file is sized to an integral multiple of the ECC (Error Correction Code) block length for the optical disk 7.

The ECC block is a unit of performing the ECC process as a unit of reading and writing on the optical disk 7.

The sector is an example of physical unit areas on the optical disk 7. The ECC block is an example units for reading and writing on the optical disk 7. In addition, the fixed number of sectors can be used as a physical unit area on the optical disk 7. A unit of reading and writing on the optical disk 7 can be the fixed number of physical unit areas, for example.

The ECC process is performed in a signal processing portion 115 (to be described) in units of ECC blocks, for example. An ECC block can be composed of one or more sectors.

In the following description, one sector is assumed to be a physical unit area on the optical disk 7. One ECC block is assumed to be a unit of reading and writing composed of one or more sectors.

In FIG. 2, the header of the standard AV multiplexing format file contains the index table. As mentioned above, the MXF provides the index table as an option. No index table is used in a video file in FIG. 3 (also in an audio file to be described).

The standard AV multiplexing format stores multiplexed 8-channel audio data in the sound item. By contrast, the AV independent format separates this audio data into channel-based audio data. The audio data is converted into the WAVE format from the AES3 format and is stored in the file's body for each channel according to the KLV structure. Further, the body is provided with a header and a footer having the same format as the standard AV multiplexing format to constitute an audio file.

That is, the AV independent format independently forms an audio file corresponding to each channel of the 8-channel audio data. The audio file for each channel contains WAVE-formatted and collectively KLV-structured audio data for the channel in the body. Further, the body is provided with a header and a footer having the same format as the standard AV multiplexing format to constitute an audio file.

As mentioned above, the body of the audio file according to the AV independent format contains WAVE-formatted and collectively KLV-structured audio data for a given channel. However, the entire audio data is not always sized to an integral multiple of the ECC block length for the optical disk 7. In consideration for this, the body of the audio file according to the AV independent format is provided with not only a KLV-structured filler after the KLV-structured audio data, but also fillers after the header and the footer.

The AV independent format provides a file-based metadata file and a frame-based metadata file in addition to the video file and the audio file for each of eight channels as mentioned above. The file-based metadata file collectively contains file-based metadata contained in the header metadata according to the standard AV multiplexing format. The frame-based metadata file collectively contains system items containing the frame-based metadata according to the standard AV multiplexing format. Further, the AV independent format provides an auxiliary file collectively containing user data according to the standard AV multiplexing format.

The AV independent format uses a master file that describes pointers to the video file, the audio files corresponding to eight channels, the file-based metadata file, the frame-based metadata file, and the auxiliary file.

The master file is coded in XML (Extensible Markup Language), for example. The master file contains, e.g., file names as pointers to the video file, the audio files corresponding to eight channels, the file-based metadata file, the frame-based metadata file, and the auxiliary file.

Accordingly, the master file can be used to reference the video file, the audio files corresponding to eight channels, the file-based metadata file, the frame-based metadata file, and the auxiliary file.

For example, the auxiliary file may be optional.

In FIG. 3, the file-based metadata file, the frame-based metadata file, and the auxiliary file do not use the header and the footer having the same format as the standard AV multiplexing format. The file-based metadata file, the frame-based metadata file, and the auxiliary file can be also configured to be additionally provided with the header and the footer having the same format as the standard AV multiplexing format.

Furthermore, a minimum set of file-based metadata is contained in the header metadata that provides headers for the video file and the audio files according to the AV independent format.

That is, the AV independent format provides the file-based metadata file containing file-based metadata to be stored in the header metadata according to the standard AV multiplexing format. Therefore, it is redundant to store the file-based metadata contained in the metadata file in addition to the header metadata that provides headers for the video file and the audio files. This also increases the size of the AV independent format file.

However, the MXF requires the header metadata for headers. When a header is configured without using any header metadata, the header format differs from the standard AV multiplexing format.

According to the MXF, various items are available for file-based metadata to be stored in the header metadata. Some of these items are required and the others are optional.

There is a need to prevent the file size from increasing and maintain the compatibility with the standard AV multiplexing format. For this purpose, the following is taken into consideration. While the header metadata provides headers for the video file and the audio files according to the AV independent format, the header metadata stores a minimum set of file-based metadata, i.e., only metadata for items needed to be stored in the header metadata according to the MXF.

As mentioned above, the AV independent format collectively stores video data in the video file and collectively stores audio data for each channel in the audio file corresponding to the channel. It is possible to easily perform editing such as AV independent editing to independently edit video data and audio data.

Further, the AV independent format stores audio data in the WAVE format. Consequently, the data amount can be decreased compared to AES3 audio data according to the standard AV independent format. As a result, when an AV independent format file is recorded in a storage such as the optical disk 7, the storage capacity needed for the recording can be saved compared to recording of a standard AV multiplexing format file.

Similarly to standard AV multiplexing format files, AV independent format video files and audio files are each configured to be provided with the header, the body, and the footer from the beginning. Moreover, the header and the footer have the same format as the standard AV multiplexing format. Let us assume that the disk apparatus 1 records an AV independent format video file or audio file on the removable optical disk 7 and the optical disk 7 is mounted on the disk apparatus 2. When the disk apparatus 2 is a standard apparatus (capable of handling MXF files), the disk apparatus 2 can read the AV independent format video file or audio file from the optical disk 7.

The AV independent format maintains file-based metadata and frame-based metadata independently. Each data is recorded on one file, facilitating a retrieval process using metadata.

Figure 4:
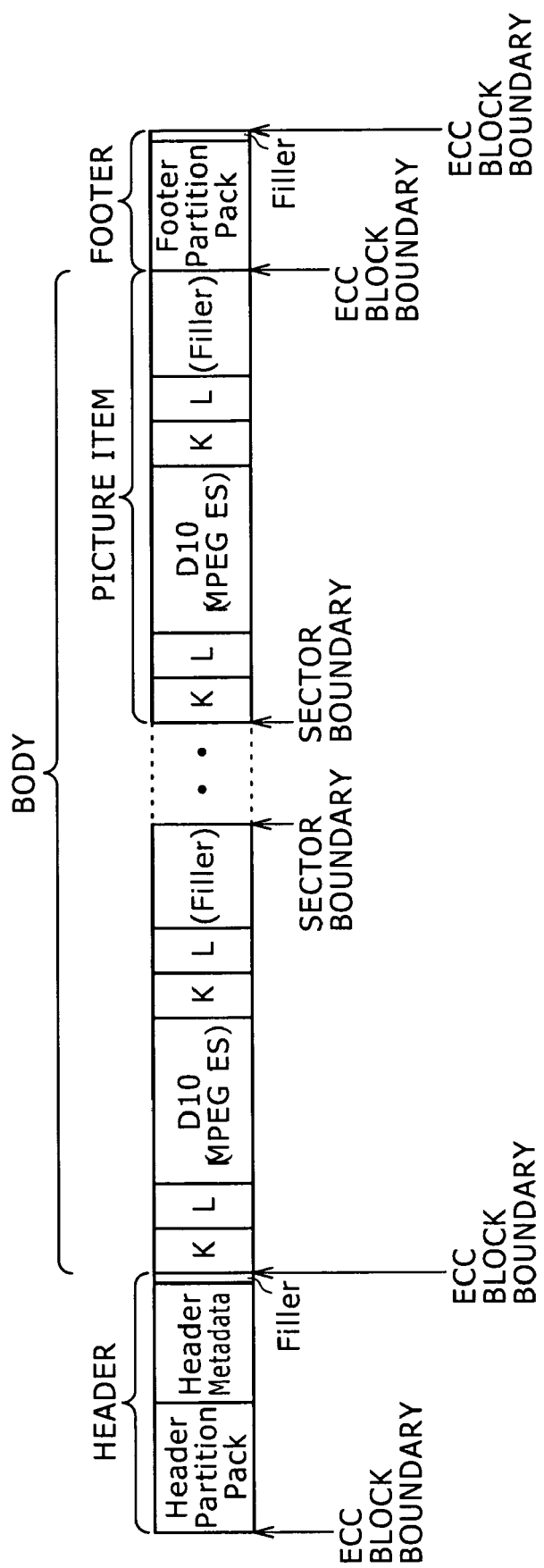
FIG. 4 shows an AV independent format.
Figure 5:
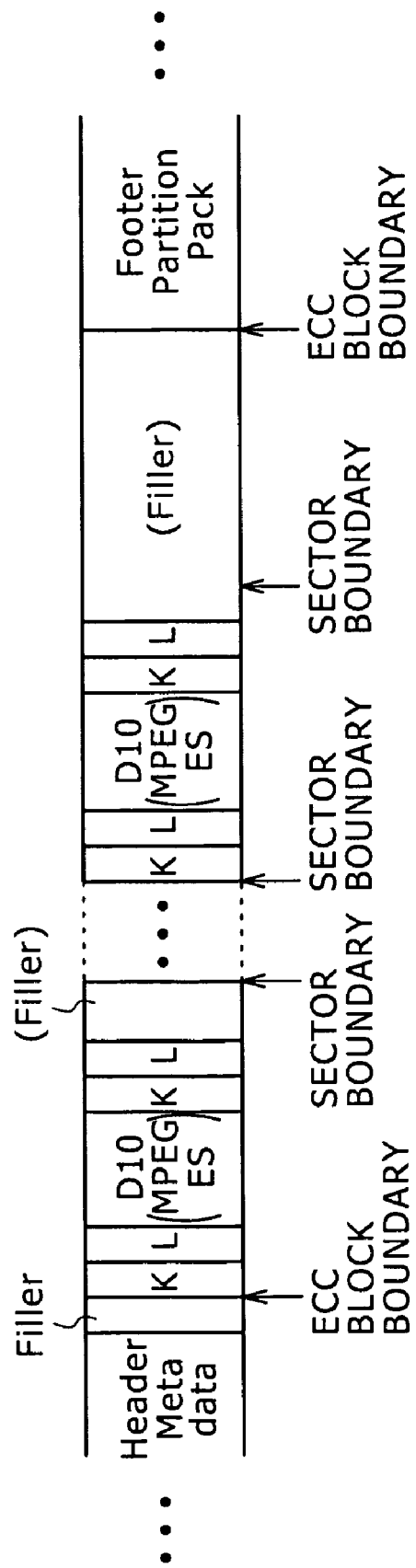
FIG. 5 shows an AV independent format.

FIGS. 4 and 5 diagram the data amount of an AV independent format video file. As shown in FIG. 4, a filler is provided after the header of the AV independent format video file. The entire header is sized to an integral multiple of the ECC block length for the optical disk 7. The video file is written to the optical disk 7 so that the video file's header boundary corresponds to the ECC block boundary on the optical disk 7.

A filler is provided after the video file's footer. The entire footer is sized to an integral multiple of the ECC block length for the optical disk 7. The video file is written to the optical disk 7 so that the video file's footer boundary corresponds to the ECC block boundary on the optical disk 7.

The entire body of the video file is sized to an integral multiple of the ECC block length for the optical disk 7. The video file is written to the optical disk 7 so that the body's boundary corresponds to the ECC block boundary on the optical disk 7. Further, each picture item of the body and the succeeding filler are an integral multiple of the sector length for the optical disk 7. The video file is written to the optical disk 7 so that the preceding boundary of the picture item corresponds to the sector boundary and the boundary succeeding to the filler attached to the picture item corresponds to the sector boundary.

As shown in FIG. 5, the last filler in the body is sized so that the entire body is sized to an integral multiple of the ECC block length for the optical disk 7. When a video file is written to the optical disk 7, the boundary succeeding to the filler attached to the last picture item in the body corresponds to the ECC block boundary.

Figure 6:
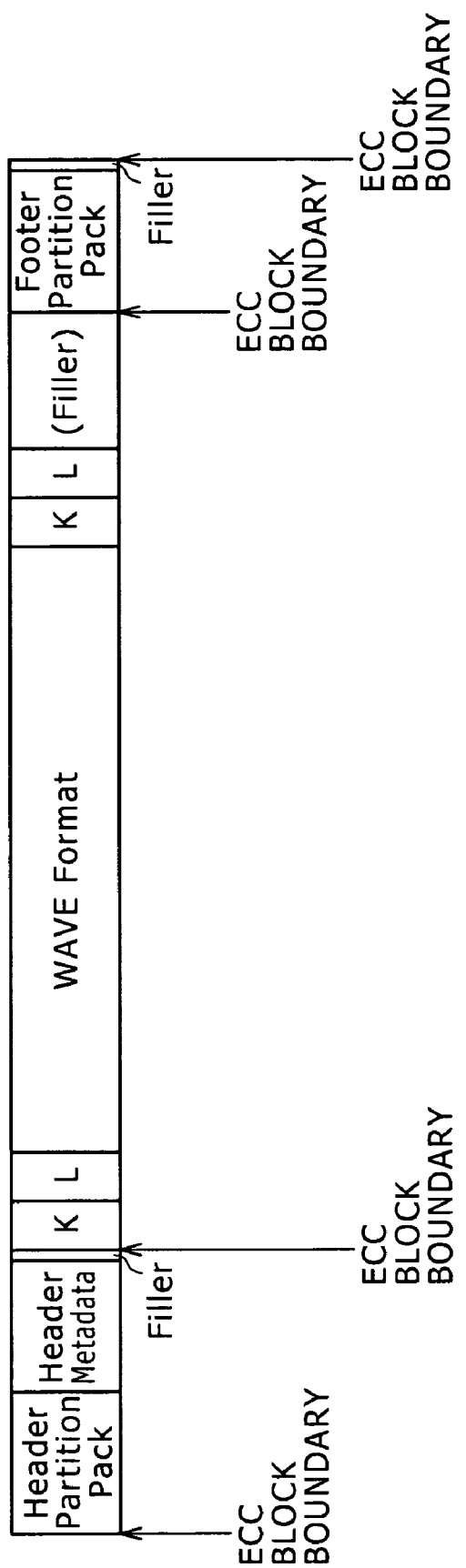
FIG. 6 shows an AV independent format.

FIG. 6 diagrams the data amount of an AV independent format audio file. The filler at the end of the header is sized so that the audio file's header and the audio data's key and length according to the KLV structure in the body are sized to an integral multiple of the ECC block length for the optical disk 7. The audio file is written to the optical disk 7 so that the boundary preceding the audio file's header corresponds to the boundary of the ECC block for the optical disk 7. Further, the audio file is written to the optical disk 7 so that the boundary succeeding the length corresponds to the boundary of the ECC block for the optical disk 7.

The KLV-structured value of the audio data in the body and the KLV-structured filler attached to the body are sized to an integral multiple of the ECC block length for the optical disk 7. The audio file is written to the optical disk 7 so that the boundary succeeding the body corresponds to the boundary of the ECC block for the optical disk 7.

The audio file's footer is followed by a filler. The entire footer is sized to an integral multiple of the ECC block length for the optical disk 7. The audio file is written to the optical disk 7 so that the boundaries preceding and succeeding the audio file's footer correspond to the boundaries of the ECC block for the optical disk 7.

Figure 7:
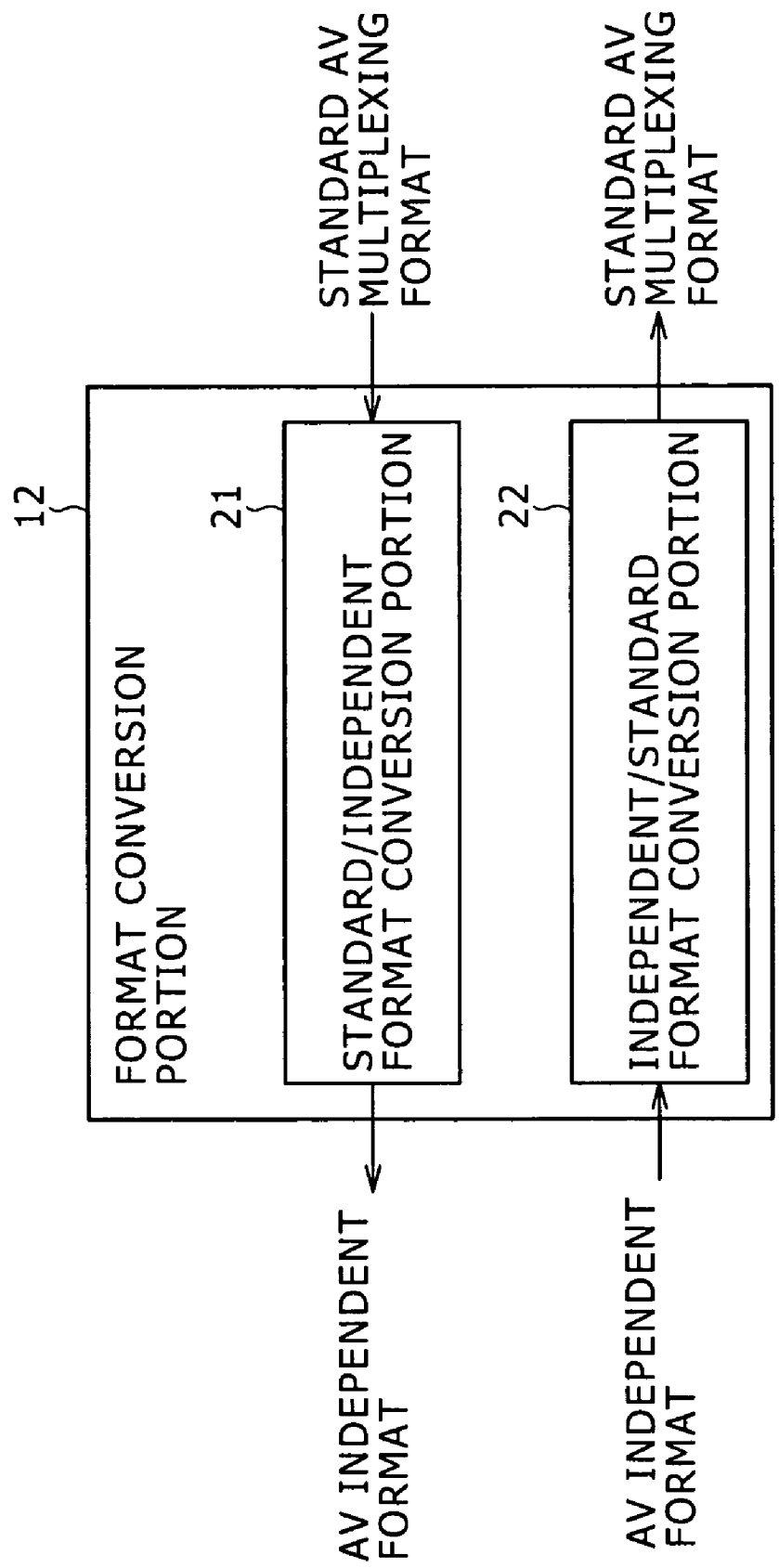
FIG. 7 is a block diagram exemplifying the configuration of a format conversion portion.

FIG. 7 exemplifies the configuration of the format conversion portion 12 provided for the disk apparatus 1 in FIG. 1.

The format conversion portion 12 is composed of a standard/independent format conversion portion 21 and an independent/standard format conversion portion 22.

The standard/independent format conversion portion 21 is supplied with a file according to the standard AV multiplexing format in FIG. 2 from the communication I/F 13, converts the file into a file according to the AV independent format in FIG. 3, and supplies it to the disk drive apparatus 11. The independent/standard format conversion portion 22 is supplied with the file according to the AV independent format in FIG. 3 from the disk drive apparatus 11, converts the file into a file according to the standard AV multiplexing format in FIG. 2, and supplies it to the communication I/F 13.

Figure 8:
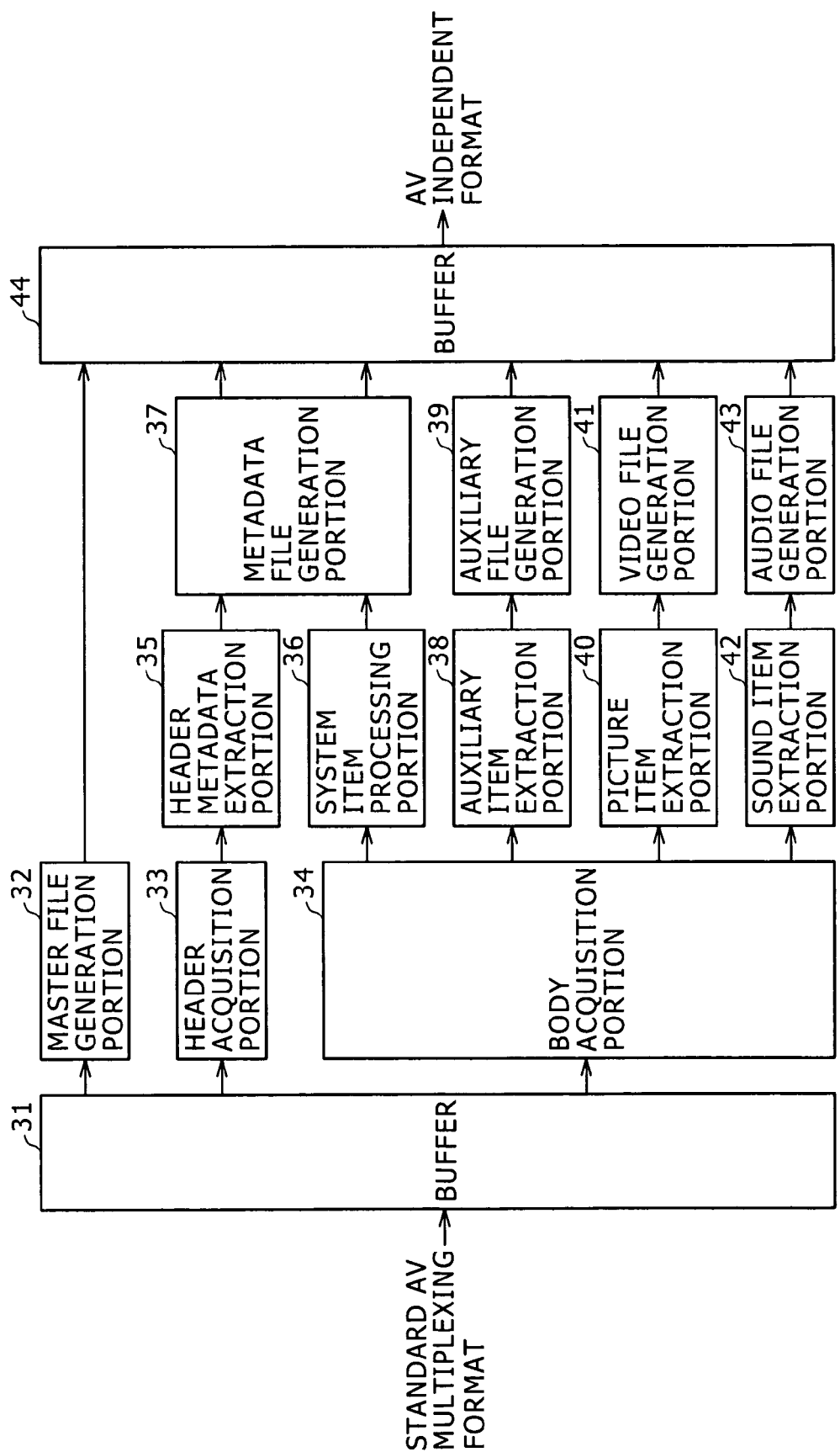
FIG. 8 is a block diagram exemplifying the configuration of a standard/independent format conversion portion.

FIG. 8 exemplifies the configuration of the standard/independent format conversion portion 21 in FIG. 7.

A buffer 31 is supplied with the standard AV multiplexing format file from the communication I/F 13. The buffer 31 temporarily stores the supplied standard AV multiplexing format file.

When the buffer 31 stores the standard AV multiplexing format file, the master file generation portion 32 generates a master file according to the AV independent format for the standard AV multiplexing format file and supplies it to a buffer 44.

The header acquisition portion 33 acquires a header by extracting it from the standard AV multiplexing format file stored in the buffer 31 and supplies the header to a header metadata extraction portion 35.

The body acquisition portion 34 acquires a body by extracting it from the standard AV multiplexing format file stored in the buffer 31. The body acquisition portion 34 supplies the body to a system item processing portion 36, an auxiliary item extraction portion 38, a picture item extraction portion 40, and a sound item extraction portion 42.

The header metadata extraction portion 35 extracts header metadata from the header supplied from the header acquisition portion 33 and supplies a metadata file generation portion 37 with file-based metadata contained in the metadata. The system item processing portion 36 extracts the system item containing frame-based metadata from each edit unit in the body supplied from the body acquisition portion 34 and supplies the system item to the metadata file generation portion 37. The metadata file generation portion 37 generates a file-based metadata file containing file-based metadata supplied from the header metadata extraction portion 35. The metadata file generation portion 37 also generates a frame-based metadata file collectively (sequentially) containing system items in respective edit units supplied from the system item processing portion 36. The metadata file generation portion 37 supplies the file-based metadata file and the frame-based metadata file to the buffer 44.

The auxiliary item extraction portion 38 extracts an auxiliary item containing frame-based user data from each edit unit in the body supplied from the body acquisition portion 34 and supplies the auxiliary item to the auxiliary file generation portion 39. The auxiliary file generation portion 39 generates an auxiliary file collectively containing auxiliary items in the edit units supplied from the auxiliary item extraction portion 38 and supplies the auxiliary file to the buffer 44.

The picture item extraction portion 40 extracts a picture item containing frame-based video data from each edit unit in the body supplied from the body acquisition portion 34 and supplies the picture item to a video file generation portion 41. The video file generation portion 41 collectively stores picture items in the edit units supplied from the picture item extraction portion 40. Further, the video file generation portion 41 generates a video file provided with the header and the footer having the same format as the standard AV multiplexing format and supplies the video file to the buffer 44.

The sound item extraction portion 42 extracts a sound item containing frame-based audio data from each edit unit in the body supplied from the body acquisition portion 34 and supplies the sound item to an audio file generation portion 43. The audio file generation portion 43 is supplied with channel-based audio data contained in the sound item of each edit unit from the sound item extraction portion 42 and collectively stores the audio data for each channel. Further, the audio file generation portion 43 provides the body with the header and the footer having the same format as the standard AV multiplexing format to generate a channel-based audio file and supplies this file to the buffer 44.

The buffer 44 temporarily stores the master file supplied from the master file generation portion 32, the file-based metadata file and the frame-based metadata file supplied from the metadata file generation portion 37, the auxiliary file supplied from the auxiliary file generation portion 39, the video file supplied from the video file generation portion 41, and the channel-based audio file supplied from the audio file generation portion 43. The buffer 44 supplies these files as AV independent format files to the disk drive apparatus 11.

Figure 9:
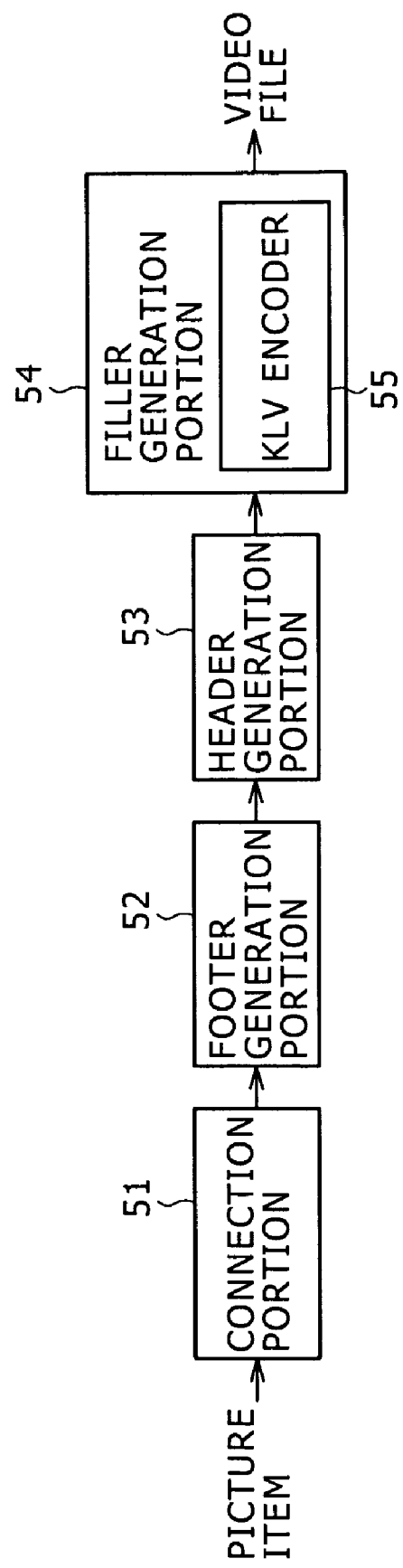
FIG. 9 is a block diagram exemplifying the configuration of a video file generation portion.

FIG. 9 exemplifies the configuration of the video file generation portion 41 in FIG. 8.

The picture item extraction portion 40 supplies picture items in the edit units. The picture items are then supplied to a connection portion 51. The connection portion 51 sequentially connects (concatenates) the supplied picture items in the edit units and supplies the connected picture items to a footer generation portion 52. The footer generation portion 52 makes a body out of the connected picture items in the edit units and generates a footer having the same format as the standard AV multiplexing format file so as to attach the footer to the body. The footer generation portion 52 supplies the footer and the body to a header generation portion 53.

The header generation portion 53 generates headers to be attached to the footer and the body supplied from the footer generation portion 52. The header generation portion 53 supplies the headers, the body, and the footer to a filler generation portion 54.

The filler generation portion 54 generates a filler attached to the header and a filler attached to the footer. Further, the filler generation portion 54 generates a last filler in the body. A KLV encoder 55 in the filler generation portion 54 encodes the body's last filler according to the KLV structure.

The filler generation portion 54 configures an AV independent format video file composed of the header, the body, and the footer provided with fillers and outputs the video file.

A filler generated by the filler generation portion 54 is attached to the header, the body, or the footer in the video file. In this manner, the data amounts of the header, the body, and the footer are adjusted to integral multiples of the ECC block length for the optical disk 7.

When the video file is written to the optical disk 7, it is possible to prevent the header, the body, or the footer from being recorded in part of the ECC block and more efficiently read and write the video file.

Each of the header, the body, and the footer is an integral multiple of the ECC block length for the optical disk 7. It is a good practice to record the header, the body, and the footer so that their boundaries correspond to the ECC block boundaries. To write or read only the header, the body, or the footer, writing or reading it from the minimum number of ECC blocks can write or read the header, the body, or the footer. That is, it is possible to more efficiently read or write video files to the optical disk 7.

Figure 10:
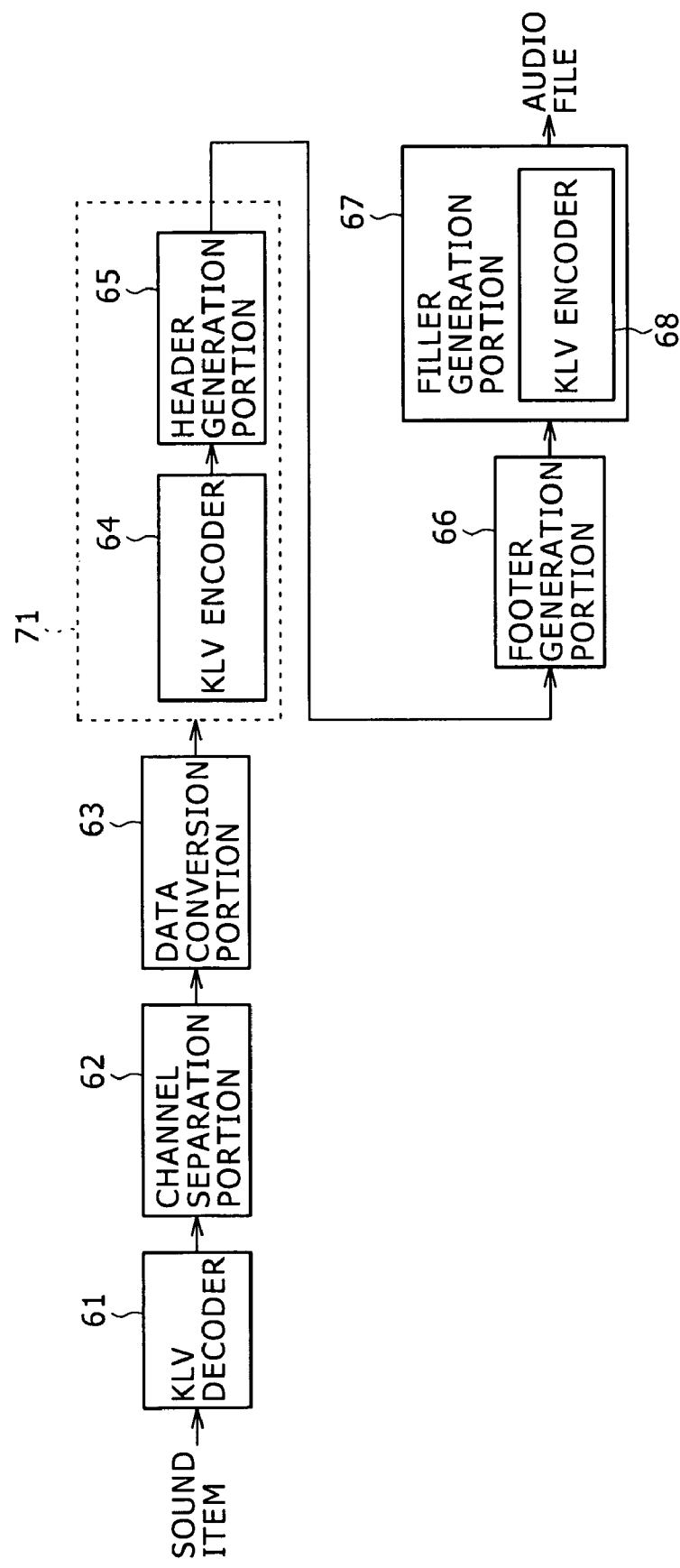
FIG. 10 is a block diagram exemplifying the configuration of an audio file generation portion.

FIG. 10 exemplifies the configuration of the audio file generation portion 43 in FIG. 8.

The sound item in each edit unit is supplied from the sound item extraction portion 42 and is supplied to a KLV decoder 61. The KLV decoder 61 decomposes the KLV structure of the audio data contained in the sound item of each edit unit to generate audio data for eight multiplexed channels (hereafter referred to as multiplexed audio data accordingly). The KLV decoder 61 supplies the resulting multiplexed audio data to a channel separation portion 62.

The channel separation portion 62 separates channel-based audio data from the multiplexed audio data for each sound item supplied from the KLV decoder 61. The channel separation portion 62 groups the channel-based audio data for each channel and supplies it to the data conversion portion 63.

The data conversion portion 63 converts the coding system for channel-based audio data supplied from the channel separation portion 62. That is, the standard AV multiplexing format uses AES3-coded audio data. The AV independent format uses WAVE-coded audio data. For this reason, the data conversion portion 63 converts AES3-coded audio data (AES3-system audio data) supplied from the channel separation portion 62 into WAVE-coded audio data (WAVE-system audio data).

In the above-mentioned example, the data conversion portion 63 converts AES3-system audio data into WAVE-system audio data. The data conversion portion 63 may convert audio data into any data other than the WAVE system. The data conversion portion 63 converts audio data for the purpose of suppressing the amount of AES3-system audio data. The data conversion portion 63 may use any coding system that can achieve the above-mentioned purpose.

The audio file generation portion 43 may be configured without the data conversion portion 63 when the amount of audio data is omissible.

The data conversion portion 63 obtains channel-based WAVE-system audio data and supplies it to a KLV encoder 64. The KLV encoder 64 is supplied with the audio data grouped into channels, KLV-codes each of the audio data according to the KLV structure, and supplies it to a header generation portion 65.

The header generation portion 65 makes a body out of each channel-based audio data supplied from the KLV encoder 64. The header generation portion 65 generates a header having the same format as that of standard AV multiplexing format files so as to attach the header to each channel's body and supplies the body and the header to a footer generation portion 66.

The footer generation portion 66 generates a footer having the same format as that of standard AV multiplexing format files so as to attach the footer to the body. The footer generation portion 66 supplies the header, the footer, and the body to the filler generation portion 67.

The filler generation portion 67 generates a filler to be attached to the header, a filler to be attached to the body, and a filler to be attached to the footer. As shown in FIG. 6, the filler generation portion 67 generates a filler so that data amounts of the header, and the key and the length attached by the KLV encoder 64 match integral multiples of the data amount of the ECC block. The filler generation portion 67 attaches the generated filler after the header. Further, as shown in FIG. 6, the filler generation portion 67 generates a filler so that the data amount of the footer matches an integral multiple of the data amount of the ECC block. The filler generation portion 67 attaches the generated filler after the footer.

A KLV encoder 68 in the filler generation portion 67 encodes a filler to be attached to the body in accordance with the KLV structure. As shown in FIG. 6, the filler generation portion 67 generates a filler encoded in the KLV structure so that the data amount of audio data matches an integral multiple of the data amount of the ECC block. The filler generation portion 67 attaches the generated filler after the audio data.

The KLV encoder 64 and the header generation portion 65 constitutes a first data generation portion 71.

In this manner, fillers generated by the filler generation portion 54 are attached to the header, the audio data, or the footer. Consequently, data amounts of the header, and the key and the length attached by the KLV encoder 64, the audio data, and the footer are adjusted to integral multiples of the ECC block length for the optical disk 7.

In this manner, when an audio file is written to the optical disk 7, it is possible to prevent the header, the body, or the footer from being recorded in part of the ECC block and more efficiently read and write video files.

Each of the header, and the key and the length attached by the KLV encoder 64, the audio data, and the footer is an integral multiple of the ECC block length for the optical disk 7. It is a good practice to record the header, and the key and the length attached by the KLV encoder 64, the audio data, or the footer so that each boundary of these matches the ECC block boundary. There may be a case of writing or reading only the header, and the key and the length attached by the KLV encoder 64, the audio data, or the footer. In such case, writing to or reading from the minimum number of ECC blocks makes it possible to write or read the header, and the key and the length attached by the KLV encoder 64, the audio data, or the footer. That is, it becomes possible to more efficiently read and write audio files to the optical disk 7.

The standard/independent format conversion portion 21 in FIG. 8 performs a master file generation process to generate a master file as an AV independent format file, a metadata file generation process to generate a file-based metadata file and a frame-based metadata file, an auxiliary file generation process to generate an auxiliary file, a video file generation process to generate a video file, and an audio file generation process to generate an audio file.

Figure 11:
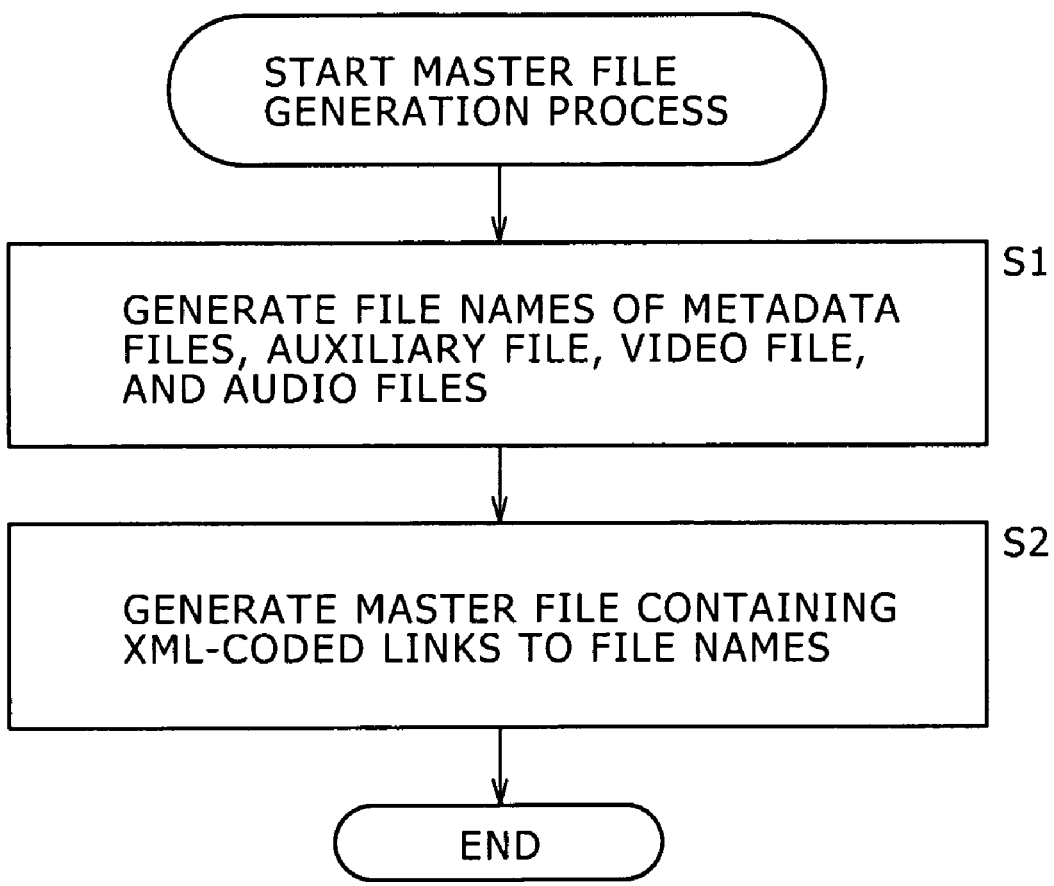
FIG. 11 is a flowchart showing a master file generation process.
Figure 12:
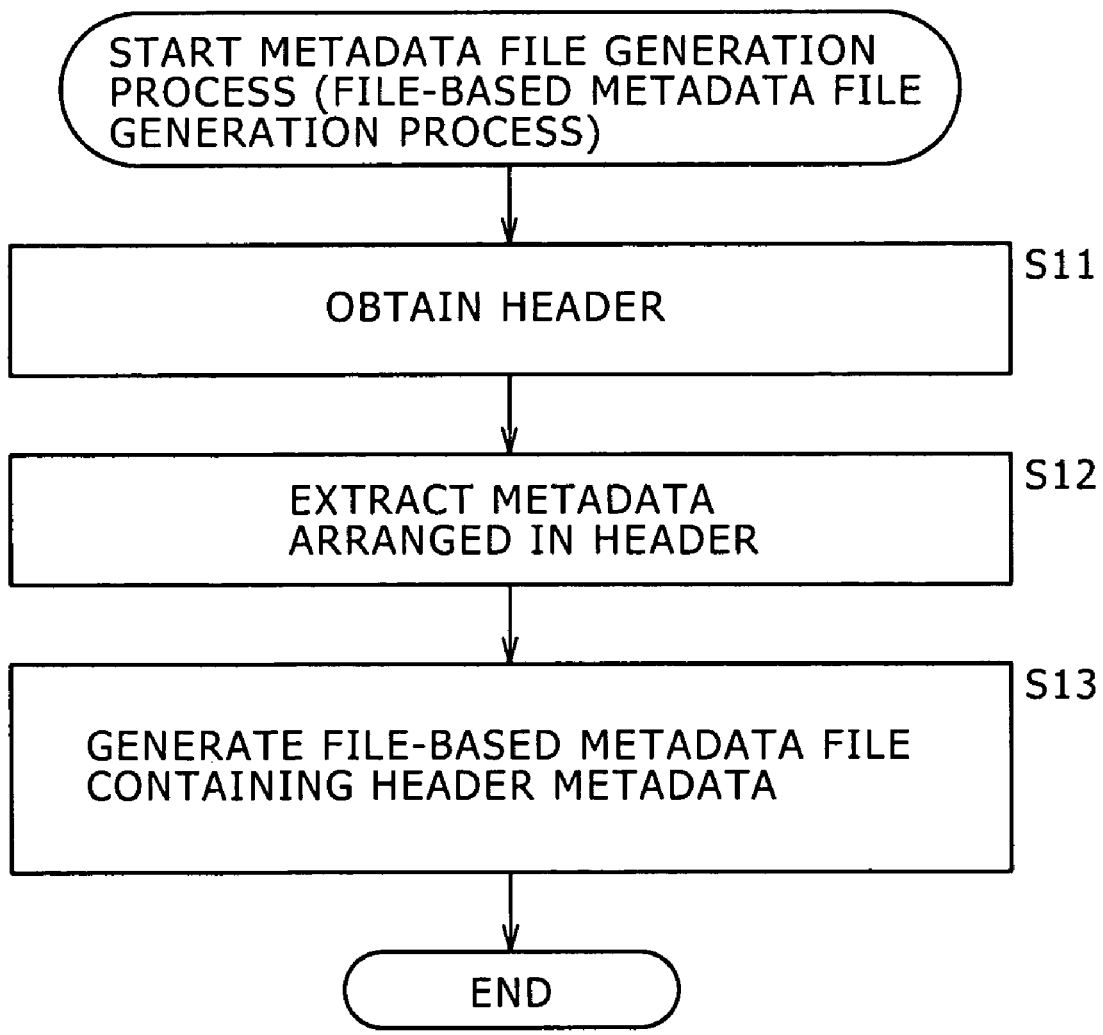
FIG. 12 is a flowchart showing a metadata file generation process in units of files.
Figure 13:
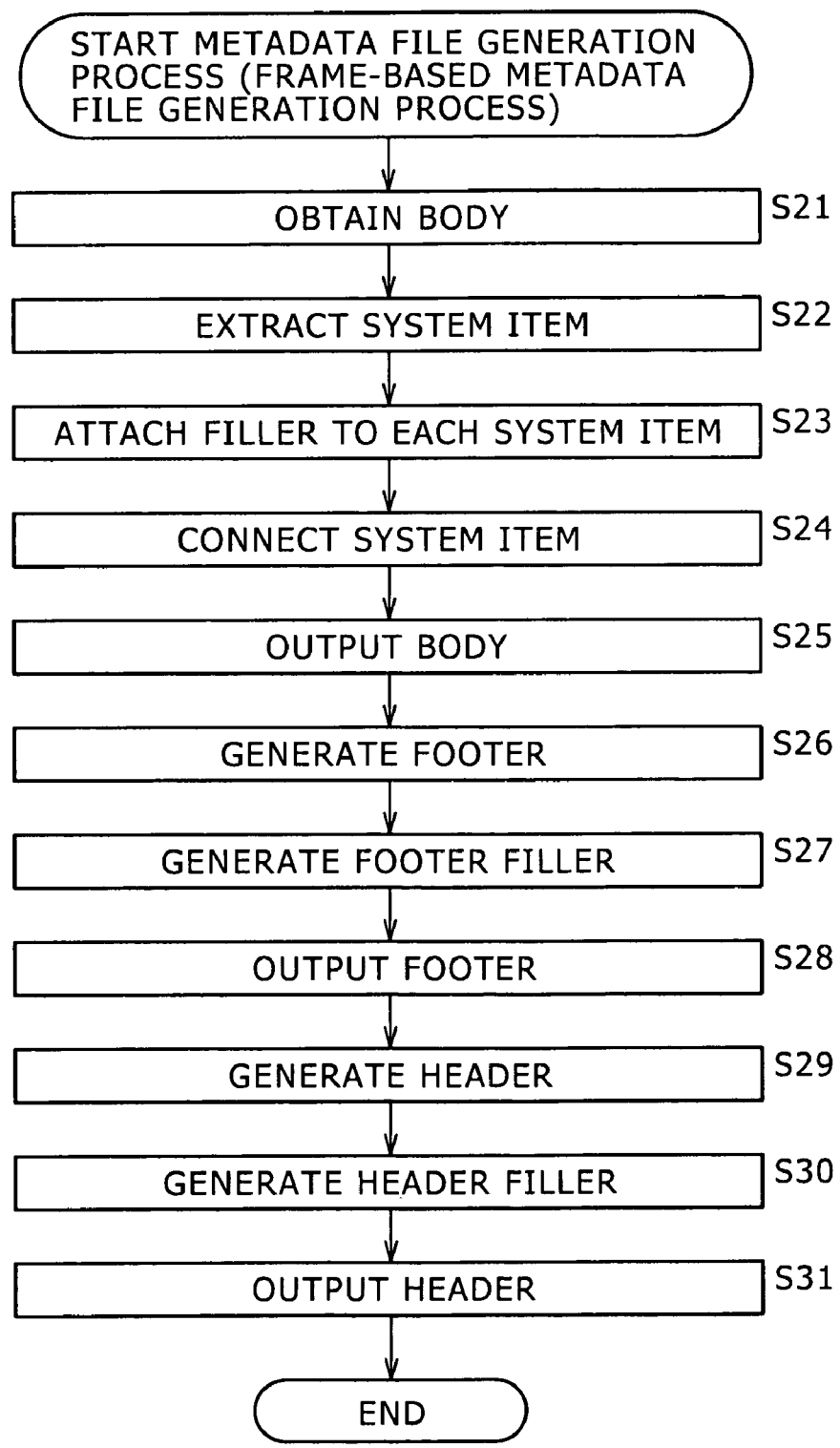
FIG. 13 is a flowchart showing a metadata file generation process in units of frames.

With reference to flowcharts in FIGS. 11 through 13, the following describes the master file generation process, the metadata file generation process, the auxiliary file generation process, the video file generation process, and the audio file generation process performed by the standard/independent format conversion portion 21.

First, the master file generation process will be described with reference to the flowchart in FIG. 11.

The master file generation process starts when a standard AV format file is supplied and is stored in the buffer 31 (FIG. 8), for example. At Step S1, the master file generation portion 32 (FIG. 8) generates filenames of a file-based metadata file, a frame-based metadata file, an auxiliary file, a video file, and audio files for respective channels. The process proceeds to Step S2. At Step S2, the master file generation portion 32 generates a master file containing XML-coded links to the file names generated at Step S1. The master file generation portion 32 supplies the links to the buffer 44 for storing the links. The master file generation process then terminates.

Referring now to the flowchart in FIG. 12, the following describes the file-based metadata file generation process to generate file-based metadata files.

The file-based metadata file generation process starts when a standard AV format file is supplied and is stored in the buffer 31 (FIG. 8), for example. At Step S11, the header acquisition portion 33 first obtains a header from the standard AV format file stored in the buffer 31 and supplies the header to the header metadata extraction portion 35. The process proceeds to Step S12. At Step S12, the header metadata extraction portion 35 extracts metadata from the header supplied from the header acquisition portion 33. The header metadata extraction portion 35 supplies file-based metadata contained in the metadata to the metadata file generation portion 37. The process proceeds to Step S13. At Step S13, the metadata file generation portion 37 generates a file-based metadata file containing the file-based metadata supplied from the header metadata extraction portion 35 and supplies the file to the buffer 44 for storing it. The file-based metadata file generation process then terminates.

Referring now to the flowchart in FIG. 13, the following describes the frame-based metadata frame generation process to generate frame-based metadata frames.

The frame-based metadata file generation process starts when a standard AV format file is supplied and is stored in the buffer 31 (FIG. 8), for example. At Step S21, the body acquisition portion 34 first obtains a body from the standard AV multiplexing format file stored in the buffer 31 and supplies the body to the system item processing portion 36. The process proceeds to Step S22. At Step S22, the system item processing portion 36 extracts the system item containing frame-based metadata from each edit unit in the body supplied from the body acquisition portion 34 and supplies the system item to the metadata file generation portion 37. The process proceeds to Step S23. At Step S23, the metadata file generation portion 37 is supplied with the system item for each edit unit from the system item processing portion 36 and attaches a filler to the system item. The process proceeds to Step S24.

At Step S24, the metadata file generation portion 37 connects the filler-provided system items to generate a body of a file-based metadata containing the system items for the respective edit units. The metadata file generation portion 37 supplies the generated body to the buffer 44. The process proceeds to Step S25. At Step S25, the buffer 44 outputs the metadata file's body. The process proceeds to Step S26.

At Step S26, the metadata file generation portion 37 generates a footer. The process proceeds to Step S27. At Step S27, the metadata file generation portion 37 generates a footer's filler and supplies the filler-provided footer to the buffer 44. The process proceeds to Step S28. At Step S28, the buffer 44 outputs the footer. The process proceeds to Step S29.

At Step S29, the metadata file generation portion 37 generates a header. The process proceeds to Step S30. At Step S27, the metadata file generation portion 37 generates a header's filler and supplies the filler-provided header to the buffer 44. The process proceeds to Step S31. At Step S31, the buffer 44 outputs the header. The frame-based metadata file generation process then terminates.

Figure 14:
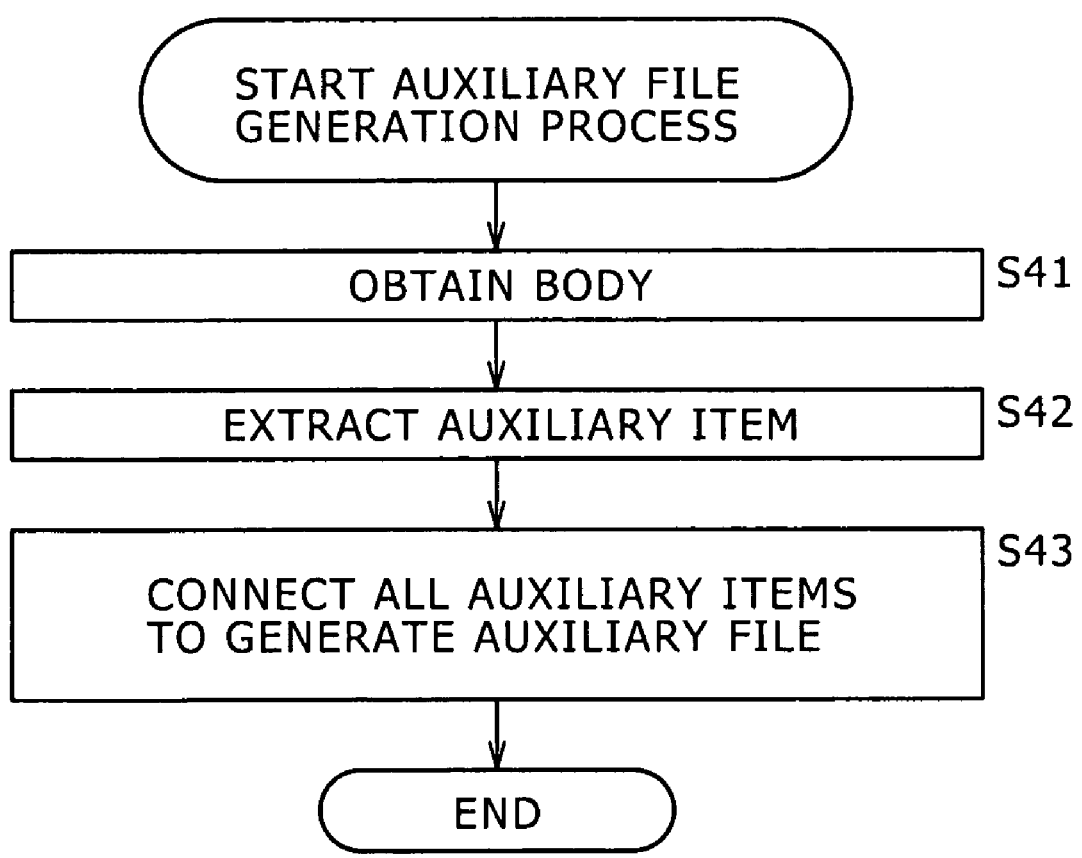
FIG. 14 is a flowchart showing an auxiliary file generation process.

Referring now to the flowchart in FIG. 14, the following describes the auxiliary file generation process to generate auxiliary files.

The auxiliary file generation process starts when a standard AV format file is supplied and is stored in the buffer 31 (FIG. 8), for example. At Step S41, the body acquisition portion 34 first obtains a body from the standard AV multiplexing format file stored in the buffer 31 and supplies the body to the auxiliary item extraction portion 38. The process proceeds to Step S42. At Step S42, the auxiliary item extraction portion 38 extracts an auxiliary item from each edit unit of the body supplied from the body acquisition portion 34 and supplies the auxiliary item to the auxiliary file generation portion 39. The process proceeds to Step S43. At Step S43, the auxiliary file generation portion 39 is supplied with auxiliary items for respective edit units from the auxiliary item extraction portion 38. The auxiliary file control portion 39 connects the auxiliary items to generate an auxiliary file for grouping the auxiliary items for the edit units. The auxiliary file control portion 39 supplies the auxiliary file to the buffer 44 so as to store it. The auxiliary file generation process then terminates.

Figure 15:
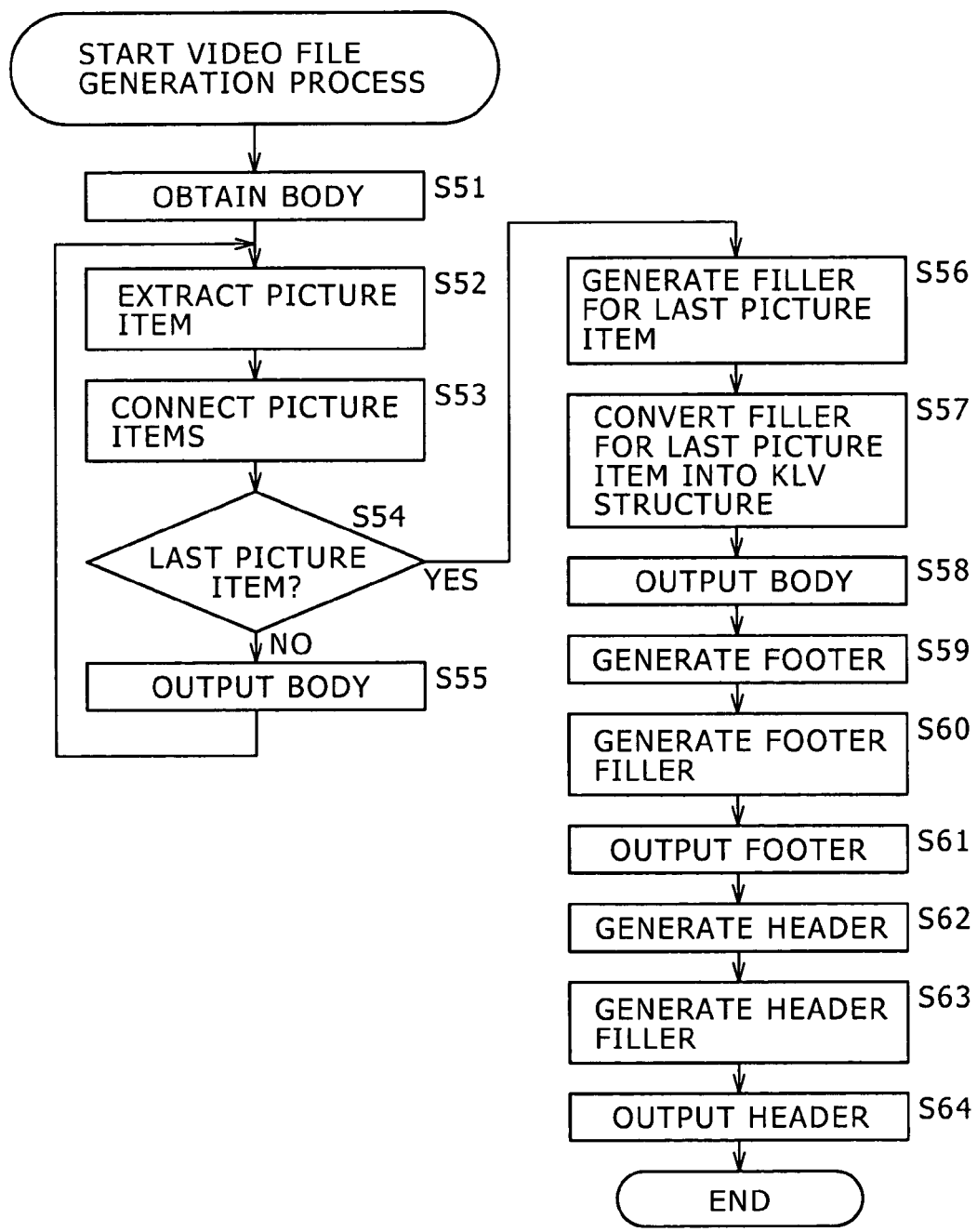
FIG. 15 is a flowchart showing a video file generation process.

Referring now to the flowchart in FIG. 15, the following describes the video file generation process to generate video files.

The video file generation process starts when a standard AV format file is supplied and is stored in the buffer 31 (FIG. 8), for example. At Step S51, the body acquisition portion 34 first obtains a body from the standard AV multiplexing format file stored in the buffer 31 and supplies the body to the picture item extraction portion 40. The process proceeds to Step S52. At Step S52, the picture item extraction portion 40 extracts a picture item from each edit unit of the body supplied from the body acquisition portion 34 and supplies the picture item to the video file generation portion 41. The process proceeds to Step S53. At Step S53, the connection portion 51 in the video file generation portion 41 (FIG. 9) is supplied with picture items for the edit units from the picture item extraction portion 40 and connects the picture items to generate a body containing the picture items for the edit units. The process proceeds to Step S54.

At Step S54, the video file generation portion 41 determines whether or not the connected picture item is the last one. When the connected picture item is determined to be not the last one, the process proceeds to Step S55. The video file generation portion 41 outputs the generated body to the buffer 44. The process returns to step S52. The above-mentioned process is repeated. In this case, the body unchangedly passes through the footer generation portion 52, the header generation portion 53, and the filler generation portion 54.

When the connected picture item is determined to be the last one at Step S54, the process proceeds to Step S56. The filler generation portion 54 in the video file generation portion 41 (FIG. 9) generates a filler for the last picture item. The filler's data amount is adjusted so that the body's data amount matches an integral multiple of the ECC block after conversion into the KLV structure. The process proceeds to Step S57. At Step S57, the KLV encoder 55 converts the last picture item's filler into the KLV structure. The process proceeds to Step S58. At Step S58, the video file generation portion 41 makes a body out of the filler converted into the KLV structure and outputs the body. The process proceeds to Step S59.

At Step S59, the footer generation portion 52 generates a footer. The process proceeds to Step S60. At Step S60, the filler generation portion 54 generates a footer's filler. The filler's data amount is adjusted so that the footer's data amount matches an integral multiple of the ECC block. The process proceeds to Step S61. At Step S61, the video file generation portion 41 outputs the footer. The process proceeds to Step S62.

At Step S62, the header generation portion 53 generates a header. The process proceeds to Step S63. At Step S63, the filler generation portion 54 generates a header's filler. The filler's data amount is adjusted so that the header's data amount matches an integral multiple of the ECC block. The process proceeds to Step S64. At Step S61, the video file generation portion 41 outputs the header. The video file generation process then terminates.

In this manner, the header is generated after the body and the footer. Consequently, a single process can be used to generate a header containing data such as the video data's reproduction time or time code (TC) that need to be settled by the body.

When the header is created first, for example, data such as the video data's reproduction time or time code (TC) is not settled and cannot be written until the body creation terminates. When the body creation terminates, the reproduction time or the time code needs to be written to the header, causing duplication of work. When a video file is recorded on a recording medium such as the optical disk 7, an unnecessary process occurs such as seeking to the header. Alternatively, an unsettled data amount of the header makes it difficult to ensure an area needed to record the header. Depending on conditions, the header may be recorded apart from the body and the footer on the optical disk 7.

Generating the header after the body and the footer can eliminate such duplication of work. A single process suffices for generating the header containing data that is dependent on settlement of the body. When a video file is recorded on a recording medium such as the optical disk 7, the header can be reliably recorded successively to the body and the footer.

Figure 16:
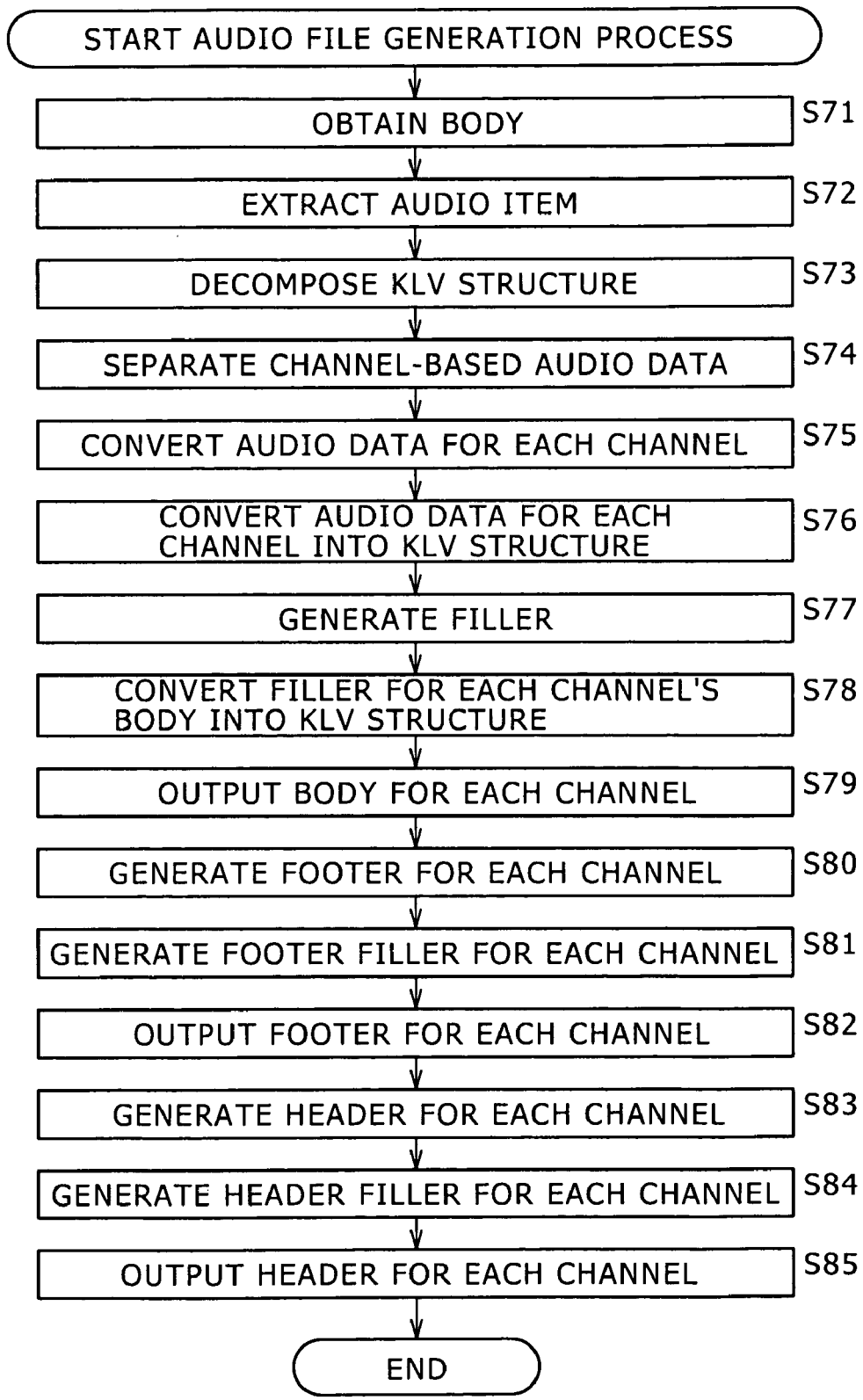
FIG. 16 is a flowchart showing an audio file generation process.

Referring now to the flowchart in FIG. 16, the following describes the audio file generation process to generate audio files.

The audio file generation process starts when a standard AV format file is supplied and is stored in the buffer 31 (FIG. 8), for example. At Step S71, the body acquisition portion 34 first obtains a body from the standard AV multiplexing format file stored in the buffer 31 and supplies the body to the sound item extraction portion 42. The process proceeds to Step S72. At Step S72, the sound item extraction portion 42 extracts a sound item from each edit unit of the body supplied from the body acquisition portion 34 and supplies the sound item to the audio file generation portion 43. The process proceeds to Step S73. At Step S73, the KLV decoder 61 of the audio file generation portion 43 (FIG. 10) decomposes the KLV structure of audio data contained in the sound item of each edit unit. The KLV decoder 61 supplies the channel separation portion 62 with resulting audio data for eight multiplexed channels (multiplexed audio data). The process proceeds to Step S74.

At Step S74, the channel separation portion 62 is supplied with the multiplexed audio data for each sound item from the KLV decoder 61 and separates channel-based AES3 audio data from the multiplexed audio data. The channel separation portion 62 groups the channel-based AES3 audio data for each channel and supplies it to the data conversion portion 63.

The process proceeds to Step S75. The data conversion portion 63 converts the channel-based AES3 audio data supplied from the channel separation portion 62 into WAVE-system audio data and supplies it to the KLV encoder 64. The process proceeds to Step S76. At Step S76, the KLV encoder 64 is supplied with WAVE-system audio data grouped for each channel and KLV-codes each of the audio data according to the KLV structure. In this manner, the KLV encoder 64 generates a channel-based body containing the WAVE-system audio data grouped for each channel. The process proceeds to Step S77.

At Step S77, the filler generation portion 67 generates a filler for each channel's body. The filler's data amount is adjusted so that the data amount of the KLV-structured audio data matches an integral multiple of the ECC block. The process proceeds to Step S78. At Step S78, the KLV encoder 68 KLV-codes each filler for each channel's body according to the KLV structure. The process proceeds to Step S79. At Step S79, the audio file generation portion 43 outputs each channel's body. The process proceeds to Step S80. When each channel's body is output, the audio data's value and the KLV-structured filler are output. The audio data's key and length are not output.

At Step S80, the footer generation portion 66 generates a footer for each channel. The process proceeds to Step S81. At Step S81, the filler generation portion 67 generates a filler for each channel's footer. The filler's data amount is adjusted so that the footer's data amount matches an integral multiple of the ECC block. The process proceeds to Step S82. At Step S82, the video file generation portion 41 outputs each channel's footer. The process proceeds to Step S83.

At Step S83, the header generation portion 65 generates a header for each channel. The process proceeds to Step S84. At Step S84, the filler generation portion 54 generates a filler for each channel's header. The filler's data amount is adjusted so that the data amounts of the header and the audio data's key and length match integral multiples of the ECC block. The process proceeds to Step S85. At Step S85, the video file generation portion 41 outputs each channel's header. The audio file generation process then terminates. At Step S85, the video file generation portion 41 outputs the audio data's key and length as well as each channel's header.

In this manner, the header is generated after the body and the footer. Consequently, a single process can be used to generate a header containing data such as the audio data's reproduction time or time code (TC) that need to be settled by the body.

When an audio file is recorded on a recording medium such as the optical disk 7, the header can be reliably recorded successively to the body and the footer.

Figure 17:
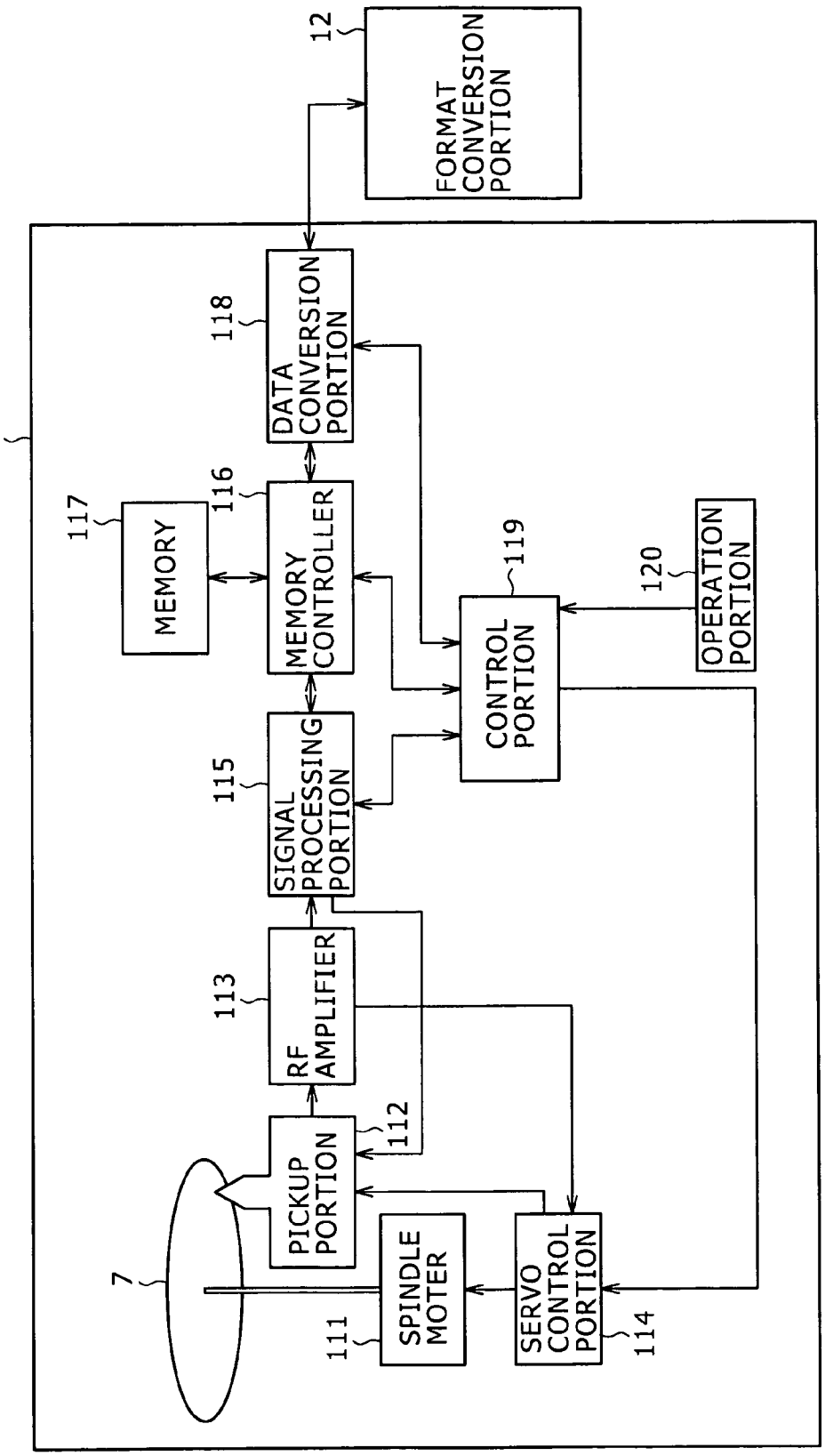
FIG. 17 is a block diagram exemplifying the configuration of a disk drive apparatus.

FIG. 17 exemplifies the configuration of the disk drive apparatus 11 according to an embodiment of the present invention.

A spindle motor 111 operates on a spindle motor drive signal from a servo control portion 114 and rotatively drives the optical disk 7 at CLV (Constant Linear Velocity) or CAV (Constant Angular Velocity).

A pickup portion 112 controls laser beam output based on a recording signal supplied from the signal processing portion 115 to record recording signals on the optical disk 7. The pickup portion also condenses and radiates a laser beam on the optical disk 7. In addition, the pickup portion 112 photo-electrically converts the reflected light from the optical disk to generate an electric current signal and supplies it to an RF (Radio Frequency) amplifier 113. A position to radiate the laser beam is controlled by a servo signal supplied from the servo control portion 114 to the pickup portion 112.

Based on the electric current signal from the pickup portion 112, the RF amplifier 113 generates a focus error signal, a tracking error signal, and a reproduction signal. The RF amplifier 113 supplies the tracking error signal and the focus error signal to the servo control portion 114 and supplies the reproduction signal to the signal processing portion 115.

The servo control portion 114 controls focus servo operations and tracking servo operations. Specifically, the servo control portion 114 generates a focus servo signal and a tracking servo signal based on the focus error signal and the tracking error signal from the RF amplifier 113 and supplies the generated signals to an actuator (not shown) of the pickup portion 112. The servo control portion 114 generates a spindle motor drive signal to drive the spindle motor 111 and controls a spindle servo operation to rotate the optical disk 7 at a specified rotation speed.

Further, the servo control portion 114 provides thread control to change a position to radiate the laser beam by moving the pickup portion 112 along the radial direction of the optical disk 7. The control portion 119 settles position store ad signals on the optical disk 7. The control portion 119 controls positions of the pickup portion 112 so as to be able to read signals from settled read positions.

The signal processing portion 115 modulates recorded data supplied from a memory controller 116 to generate a recording signal and supplies it to the pickup portion 112. The signal processing portion 115 also demodulates a reproduction signal from the RF amplifier 113 to generate reproduction data and supplies to the memory controller 116.

The memory controller 116 accordingly stores recording data from the data conversion portion 118 in memory 117 as will be described later. In addition, the memory controller 116 reads the stored data and supplies it to the signal processing portion 115. Further, the memory controller 116 accordingly stores reproduction data from the signal processing portion 115 in the memory 117. In addition, the memory controller 116 reads the stored data and supplies it to the data conversion portion 118.

The data conversion portion 118 is supplied with an AV independent format file from the format conversion portion 12. From this file, the data conversion portion 118 creates a file of low resolution data, i.e., data resulting from reducing the amount of data contained in the AV independent format file. The data conversion portion 118 supplies the AV independent format file and the low resolution data file to the memory controller 116.

The data conversion portion 118 also supplies the format conversion portion 12 with reproduction data supplied from the memory controller 116.

Based on operation signals and the like from an operation portion 120, the control portion 119 controls the servo control portion 114, the signal processing portion 115, the memory controller 116, and the data conversion portion 118 to perform recording and reproducing processes.

The operation portion 120 is operated by a user, for example, and supplies the control portion 119 with an operation signal corresponding to the operation.

On the disk drive apparatus 11 according to the above-mentioned configuration, let us consider that a user operates the operation portion 120 to issue an instruction to record data. Data supplied from the format conversion portion 12 passes through the data conversion portion 118, the memory controller 116, the signal processing portion 115, and the pickup portion 112, and then is supplied to and is recorded on the optical disk 7.

Let us consider that a user operates the operation portion 120 to issue an instruction to reproduce data. In this case, the data is read and reproduced from the optical disk 7 and passes through the pickup portion 112, the RF amplifier 113, the signal processing portion 115, the memory controller 116, and the data conversion portion 118, and then is supplied to the format conversion portion 12.

Figure 18:
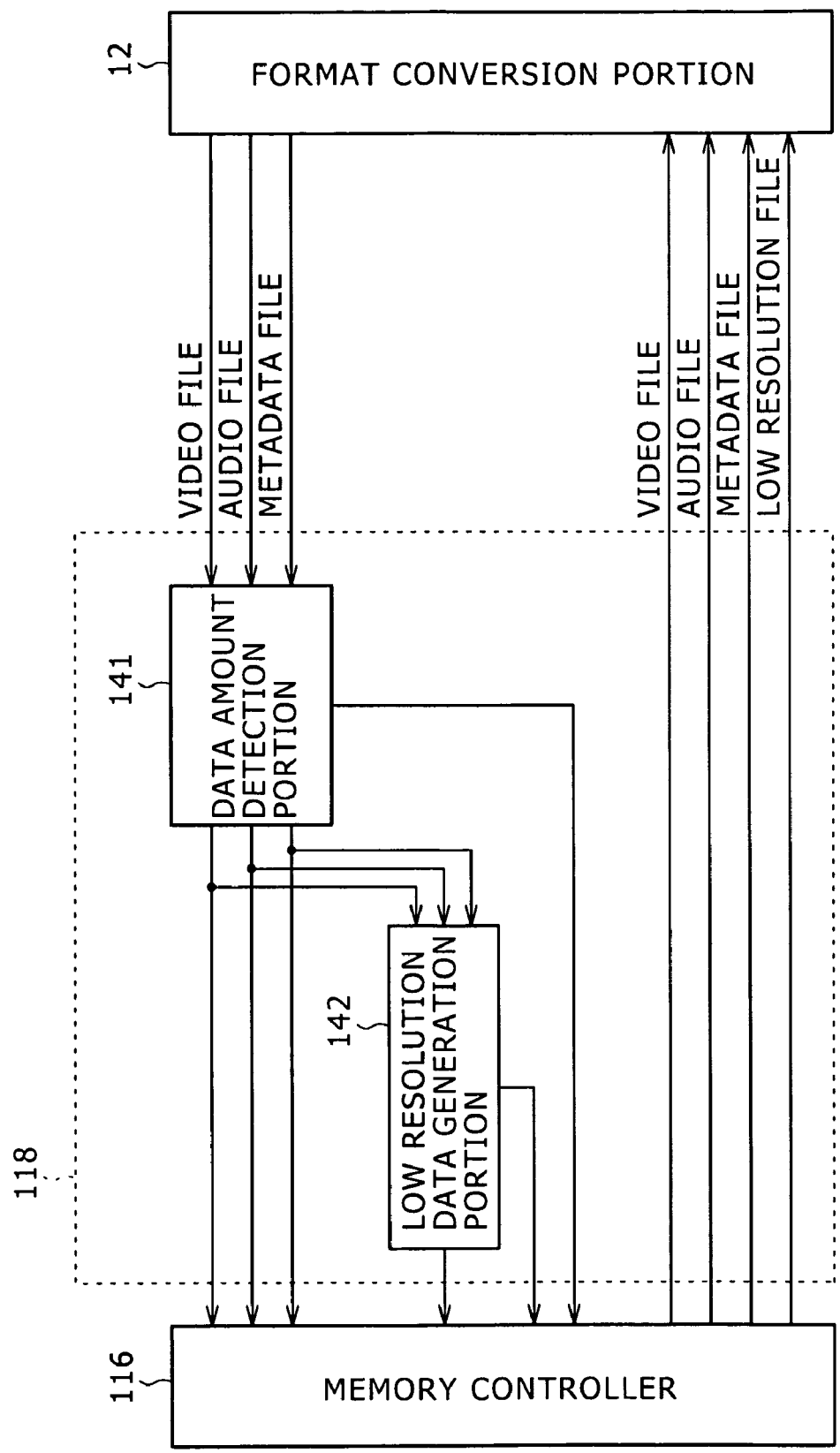
FIG. 18 is a block diagram exemplifying the configuration of a data conversion portion.

FIG. 18 exemplifies the configuration of the data conversion portion 118 in FIG. 17.

When data is recorded on the optical disk 7, the format conversion portion 12 supplies a data amount detection portion 141 with AV independent format files to be recorded such as a video file, an audio file, and a metadata file.

The data amount detection portion 141 unchangedly supplies the video file, the audio file, and the metadata file supplied from the format conversion portion 12 to the memory controller 116. The data amount detection portion 141 detects data amounts of the video file and the audio file and supplies the data amounts to the memory controller 116. That is, the data amount detection portion 141 detects the data amount for a specified reproduction time duration, for example, with respect to each of the video file and the audio file supplied from the format conversion portion 12 and supplies it to the memory controller 116.

The low resolution data generation portion 142 is supplied with low resolution data resulting from reducing the amount of the supplied data. The low resolution data generation portion 142 generates a data series of the low resolution data and supplies it to the memory controller 116. In this case, the low resolution data generation portion 142 outputs a file form of low resolution data. Further, the low resolution data generation portion 142 detects the data amount of low resolution data for a specified reproduction time duration, for example, and supplies it to the memory controller 116.

In the following description, a file form of low resolution data is also referred to as a low resolution data file.

The video file and the audio file supplied to the memory controller 116 are supplied to and recorded on the optical disk 7 as mentioned above.

The format conversion portion 12 supplies data series of the video file and the audio file. The low resolution data generation portion 142 outputs a data series of low resolution data. These data series correspond to video and audio of the same content. The video file and the audio file supplied from the format conversion portion 12 are originally provided for users. For this reason, video files and audio files supplied from the format conversion portion 12 are hereafter referred to as mainline data as needed.

As mentioned above, the low resolution data contains video and audio data with the same content as the mainline data but has the small data amount. Accordingly, when the reproduction is needed for a specified time duration, the low resolution data can be read from the optical disk 7 faster than the mainline data.

A sample data rate for mainline data may be approximately 25 Mbps (Mega bits per second). In this case, a sample data rate for low resolution data may be approximately 3 Mbps. Further, a sample data rate for metadata may be approximately 2 Mbps. In this case, a data rate of approximately 30 (=25+3+2) Mbps may be used to record the entire data on the optical disk 7. Accordingly, the optical disk 7 (or the disk drive apparatus 11 to drive it) can provide a sufficiently practicable recording rate of 35 Mbps, for example.

As mentioned above, the data conversion portion 118 in FIG. 16 supplies the memory controller 116 with not only data series of mainline data (video files and audio files), but also data series of metadata and low resolution data. The mainline data, the metadata, and the low resolution data supplied to the memory controller 116 are supplied to and recorded on the optical disk 7.

During reproduction of data from the optical disk 7, video files, audio files, metadata files, and low resolution data files are read from the optical disk 7 and are supplied to the format conversion portion 12.

Figure 19:
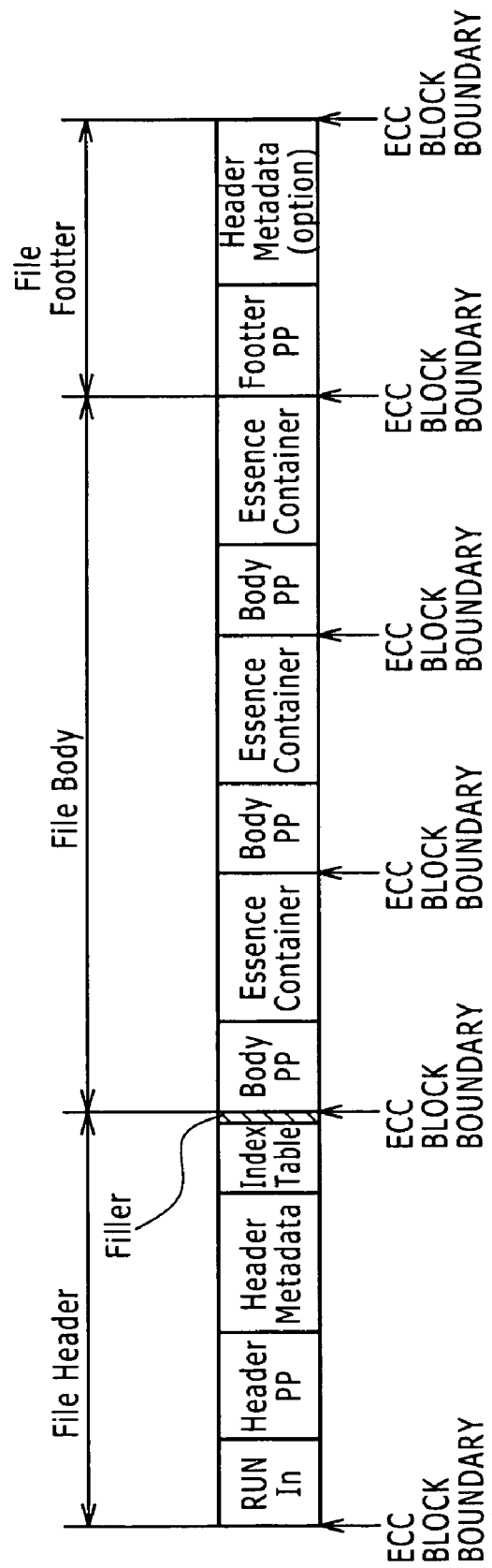
FIG. 19 shows the structure of a low resolution data file.

The structure of a low resolution data file will be described with reference to FIGS. 19 through 24. As shown in FIG. 19, a low resolution data file header contains a run-in, a header partition pack, header metadata, an index table, and a filler. A low resolution data file body contains essence containers separated by body partition packs.

A low resolution data file footer contains a footer partition pack and header metadata. The header metadata in the footer is optional.

The header partition pack, the header metadata, the index table, and the footer partition pack in the low resolution data file are the same as those in a standard AV multiplexing format file and a description thereof is omitted.

The low resolution data file header is sized to be an integral multiple of the ECC block length on the optical disk 7. A set of the body partition pack and the essence container in the low resolution data file body is sized to an integral multiple of the ECC block length for the optical disk 7. The low resolution data file footer is sized to an integral multiple of the ECC block length for the optical disk 7.

Figure 20:
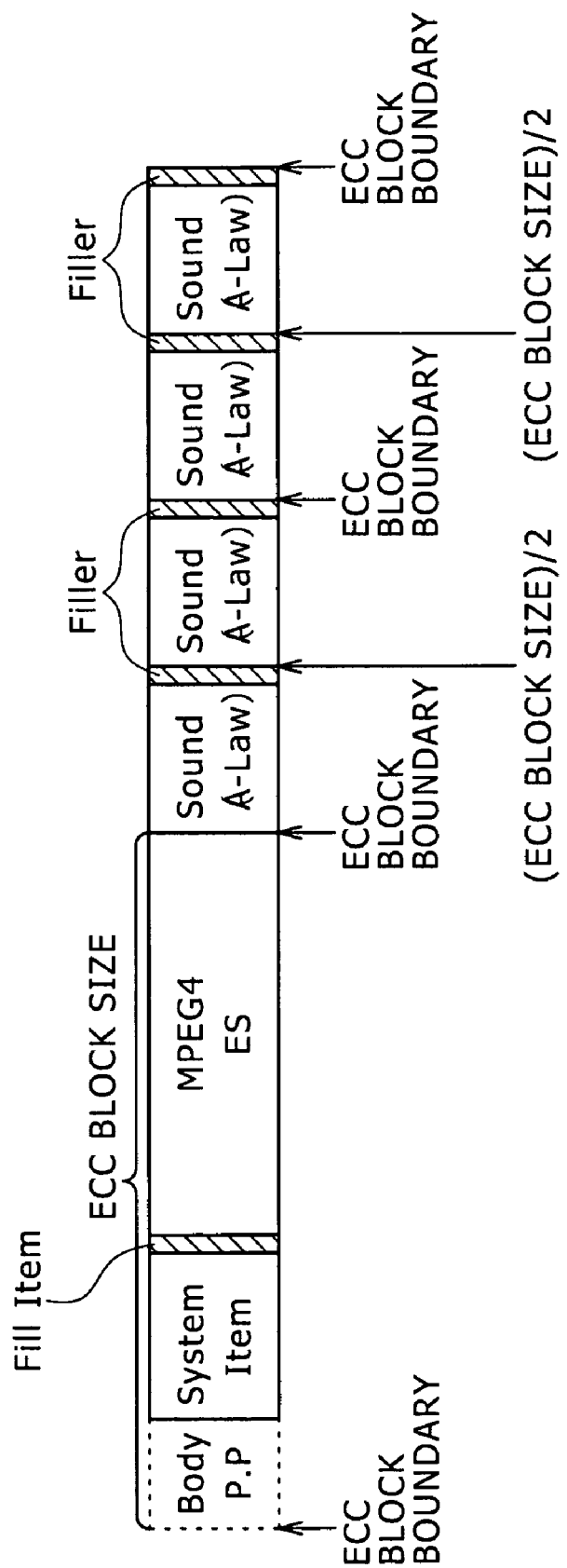
FIG. 20 shows the structure of a low resolution data file.

FIG. 20 shows the configuration of the body partition pack and the essence container stored in the low resolution data file body. The essence container stores a system item, a picture essence (video data) according to the MPEG4 elementary stream, and a sound essence (sound data). A fill item is placed between the system item and the picture essence. The body partition pack, the system item, the fill item, and the picture essence are sized to be an integral multiple of the ECC block length for the optical disk 7.

The sound essence is divided into four portions each of which is attached with a filler. A set of the divided sound essence and the attached filler provides the data amount equivalent to be half the ECC block length for the optical disk 7. That is, two sets of the divided sound essence and the filler provide the data amount equal to the ECC block length for the optical disk 7. Accordingly, the total of the sound essence and the attached fillers in one essence container provides the data amount double as large as the ECC block length for the optical disk 7.

Figure 21:
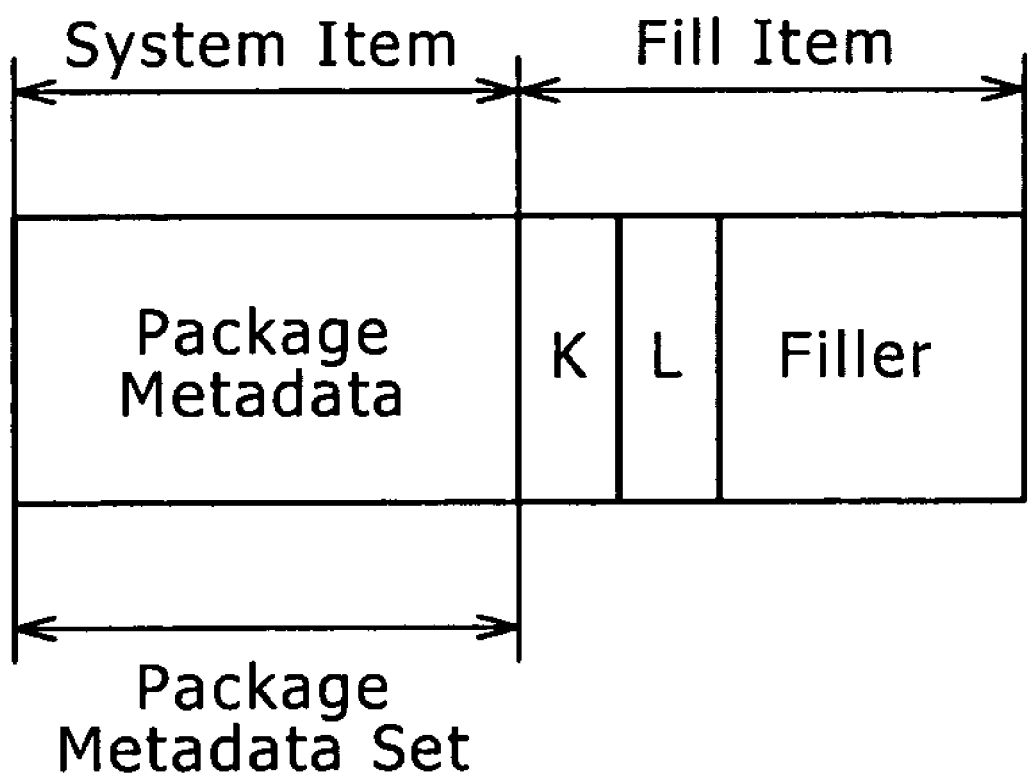
FIG. 21 shows the structure of a system item.

FIG. 21 shows the configuration of the system item and the fill item in the header. The system item stores package metadata. The fill item is composed of a filler having the KLV structure.

Figure 22:
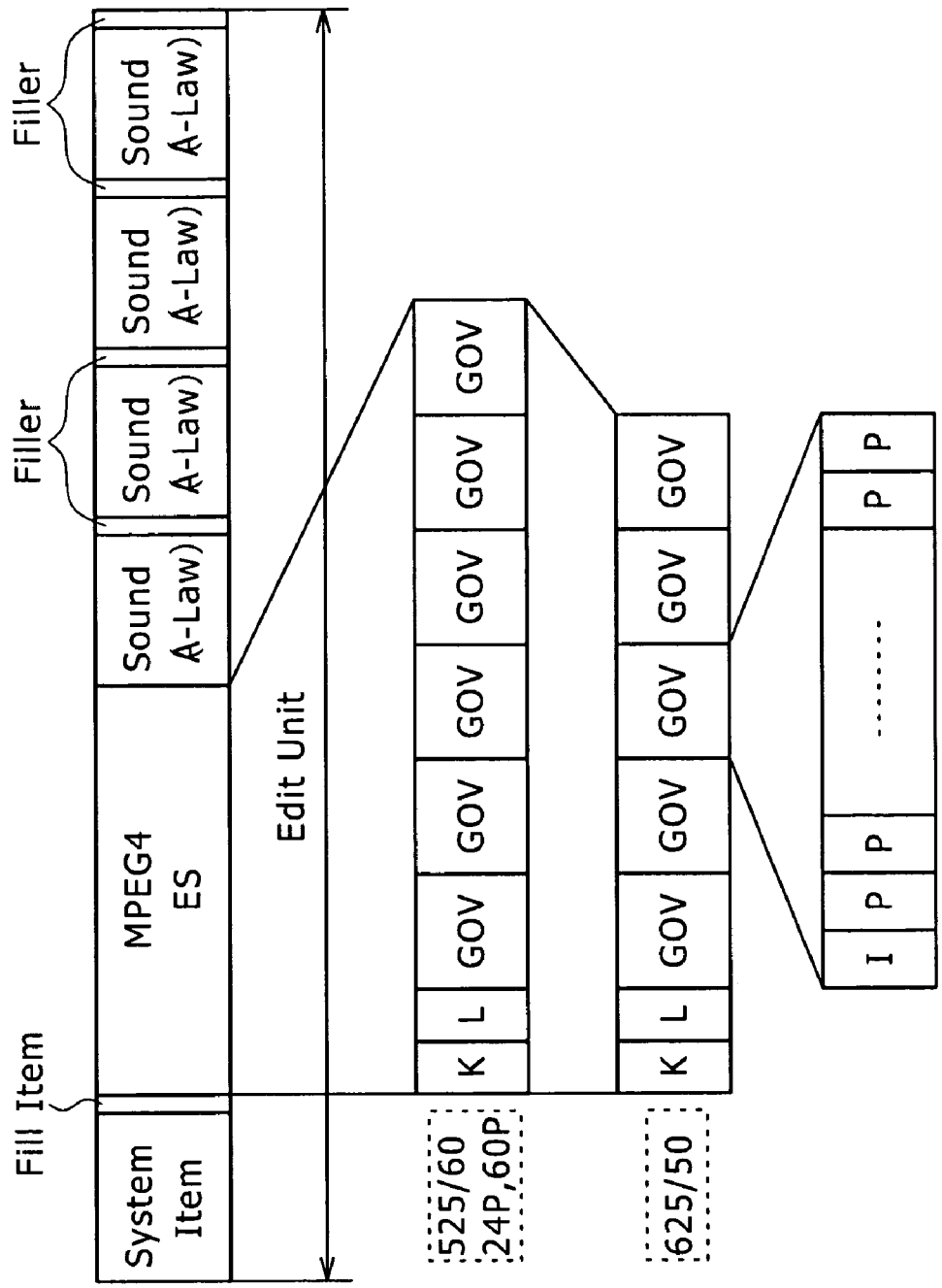
FIG. 22 shows the structure of a picture essence.

FIG. 22 shows the configuration of the picture essence. The picture essence is KLV-structured video data according to the MPEG4 elementary stream. That is, video data may provide the total number of scanning lines per frame rate of 525/60 (59.94) Video data may be a progressive scan image at the frame rate of 24 (23.97). Video data may be a progressive scan image at the frame rate of 60 (59.94). In these cases, the picture essence for one edit unit contains six GOVs (Group of Video Object Plane). When video data provides the total number of scanning lines per frame rate of 625/50, the picture essence for one edit unit contains five GOVs. One GOV contains intra-frame coded I-VOP (Intra Video Object Plane) at the beginning and is followed by the specified number of inter-frame forward predictive-coded P-VOPs (Predicted Video Object Plane).

FIG. 23 shows data amounts in a KLV-structured picture essence. When video data provides the total number of scanning lines per frame rate of 525/60 (59.94), the value's data amount is 384000 bytes (octets). That is, one GOV has the data amount of 6400 bytes. In this case, one GOV stores ten frames of images.

When video data is a progressive scan image at the frame rate of 24 (23.97), the value's data amount is 384000 bytes. That is, one GOV has the data amount of 6400 bytes. In this case, one GOV stores eight frames of images.

When video data is a progressive scan image at the frame rate of 60 (59.94), the value's data amount is 384000 bytes. That is, one GOV has the data amount of 6400 bytes. In this case, one GOV stores 20 frames of images.

When video data provides the total number of scanning lines per frame rate of 625/50, the value's data amount is 384000 bytes. That is, one GOV has the data amount of 76800 bytes. In this case, one GOV stores ten frames of images.

Figure 24:
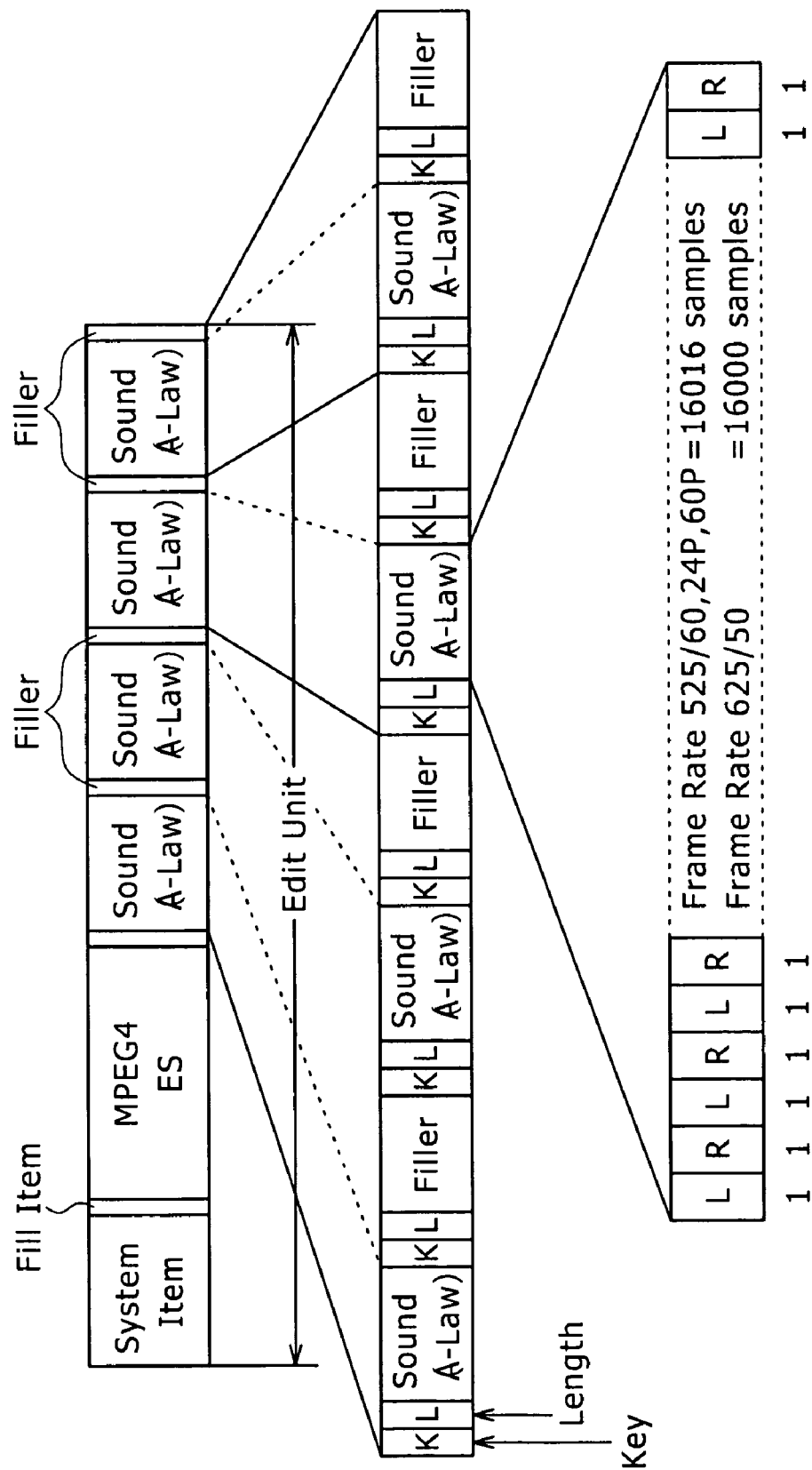
FIG. 24 shows the configuration of a sound essence.

FIG. 24 shows the configuration of a sound essence. The low resolution data file's sound essence is 2-channel data based on the ITU-T (International Telecommunication Union, Telecommunication Standardization Sector) G.711 standard. The sound essence is divided into four portions each of which is KLV-structured. Each of the KLV-structured divided data is attached with a filler.

The value alternately contains 2-channel samples. The sound essence may correspond to a picture essence having the total number of scanning lines per frame rate of 525/60 (59.94) The sound essence may correspond to a picture essence that is a progressive scan image at the frame rate of 24 (23.97). Alternatively, the sound essence may correspond to a picture essence that is a progressive scan image at the frame rate of 60 (59.94). In these cases, one of the four divided sound essences contains 16016 samples. On the other hand, the sound essence may correspond to a picture essence having the total number of scanning lines per frame rate of 625/50. In this case, one of the four divided sound essences contains 16000 samples.

Figure 25:
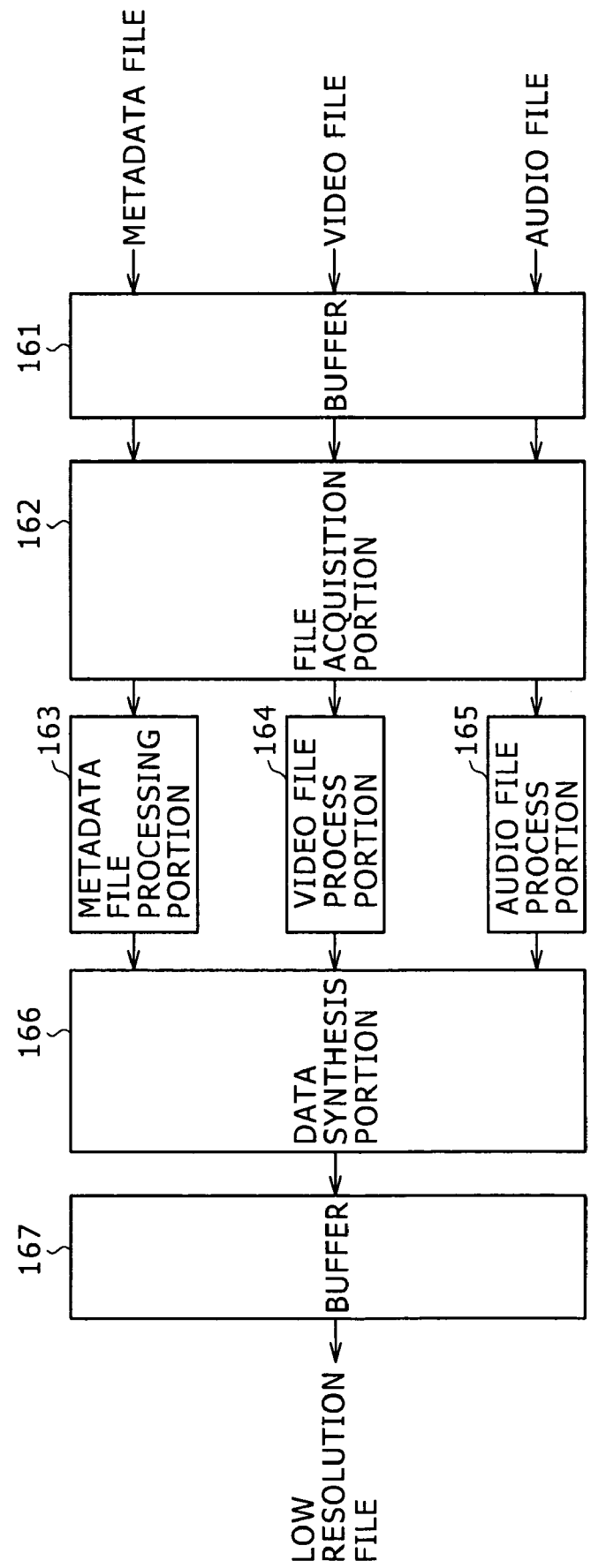
FIG. 25 is a block diagram showing the configuration of a low resolution data generation portion.

FIG. 25 is a block diagram showing the configuration of the low resolution data generation portion 142.

The buffer 161 temporarily stores AV independent format files (master file, file-based metadata file, frame-based metadata file, auxiliary file, video file, and audio files for eight channels) supplied from the format conversion portion 12.

A file acquisition portion 162 references the master file stored in the buffer 161 to identify file names of the file-based metadata file, the frame-based metadata file, the auxiliary file, the video file, and the audio files for eight channels. Based on the filenames, the file acquisition portion 162 acquires the file-based metadata file, the frame-based metadata file, the auxiliary file, the video file, and the audio files for eight channels from the format conversion portion 12 via the buffer 161. Of these acquired files, the file acquisition portion 102 supplies the file-based metadata file and the frame-based metadata file to the metadata file processing portion 163, the video file to the video file process portion 164, and the audio files for eight channels to the audio file process portion 165.

The metadata file processing portion 163 is supplied with the file-based metadata file from the file acquisition portion 162 and extracts file-based metadata from the file-based metadata file. The metadata file processing portion 163 extracts the system item containing frame-based metadata from the frame-based metadata file. The metadata file processing portion 163 supplies the file-based metadata and the system item to the data synthesis portion 166.

The video file process portion 164 is supplied with the video file from the file acquisition portion 162 and extracts the picture item from the video file. The video file process portion 164 generates a picture essence for the low resolution data file from the extracted picture item and supplies the picture essence to the data synthesis portion 166.

The audio file process portion 165 is supplied with the audio files for eight channels from the file acquisition portion 162 and extracts each channel's audio data from the audio files. The audio file process portion 165 generates low bit-rate audio data from the extracted picture item. Further, the audio file process portion 165 constructs a sound essence by multiplexing and storing each channel's audio data and supplies the sound essence to the data synthesis portion 166.

The data synthesis portion 166 constructs a low resolution data file using the file-based metadata and the system item supplied from the metadata file processing portion 163, the picture essence supplied from the video file process portion 164, and the sound essence supplied from the audio file process portion 165 and supplies the low resolution data file to a buffer 167.

The buffer 167 temporarily stores the low resolution data file supplied from the data synthesis portion 166 and supplies the low resolution data file to the memory controller 116.

Figure 26:
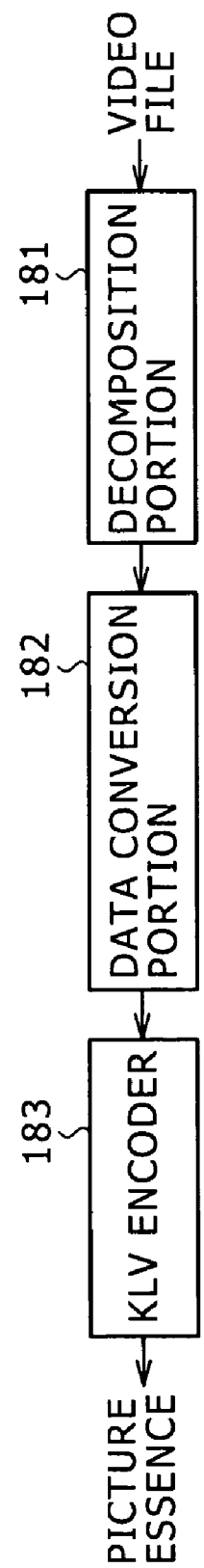
FIG. 26 is a block diagram showing the configuration of a video file process portion.

FIG. 26 is a block diagram showing the configuration of the video file process portion 164. A decomposition portion 181 decomposes the video file supplied from the file acquisition portion 162 into picture items and supplies the decomposed picture items to a data conversion portion 182. The data conversion portion 182 converts the decomposed picture items into MPEG4 video data and supplies it to a KLV encoder 183. The KLV encoder 183 KLV-encodes the picture essence supplied from the data conversion portion 182 and supplies the KLV-structured picture essence to the data synthesis portion 166.

Figure 27:
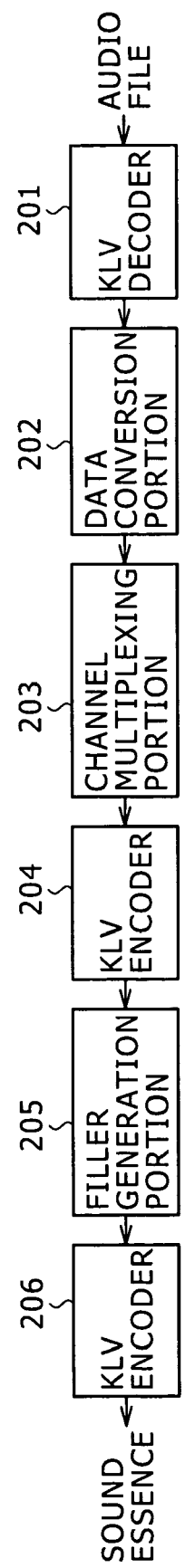
FIG. 27 is a block diagram showing the configuration of an audio file process portion.

FIG. 27 is a block diagram showing the configuration of the audio file process portion 165. A KLV decoder 201 decomposes the KLV structure of the body in the each channel's audio file supplied from the file acquisition portion 162. The KLV decoder 201 supplies a data conversion portion 202 with resulting WAVE-formatted audio data for each channel.

The data conversion portion 202 converts the each channel's WAVE-formatted audio data supplied from the KLV decoder 201 into 2-channel audio data according to the ITU-T G.711 format and supplies the audio data to a channel multiplexing portion 203. The channel multiplexing portion 203 multiplexes the 2-channel audio data supplied from the data conversion portion 202 in units of samples and supplies resulting multiplexed audio data to the KLV encoder 204. The KLV encoder 204 divides the audio data supplied from the channel multiplexing portion 203 into four portions, KLV-codes each divided audio data according to the KLV structure, and supplies the KLV-structured audio data to a filler generation portion 205.

The filler generation portion 205 generates a filler for each KLV-structured audio data, attaches the filler to the audio data, and supplies it to a KLV encoder 206. The KLV encoder 206 KLV-codes the filler attached to the audio data according to the KLV structure and outputs the sound essence attached with the KLV-structured filler.

Figure 28:
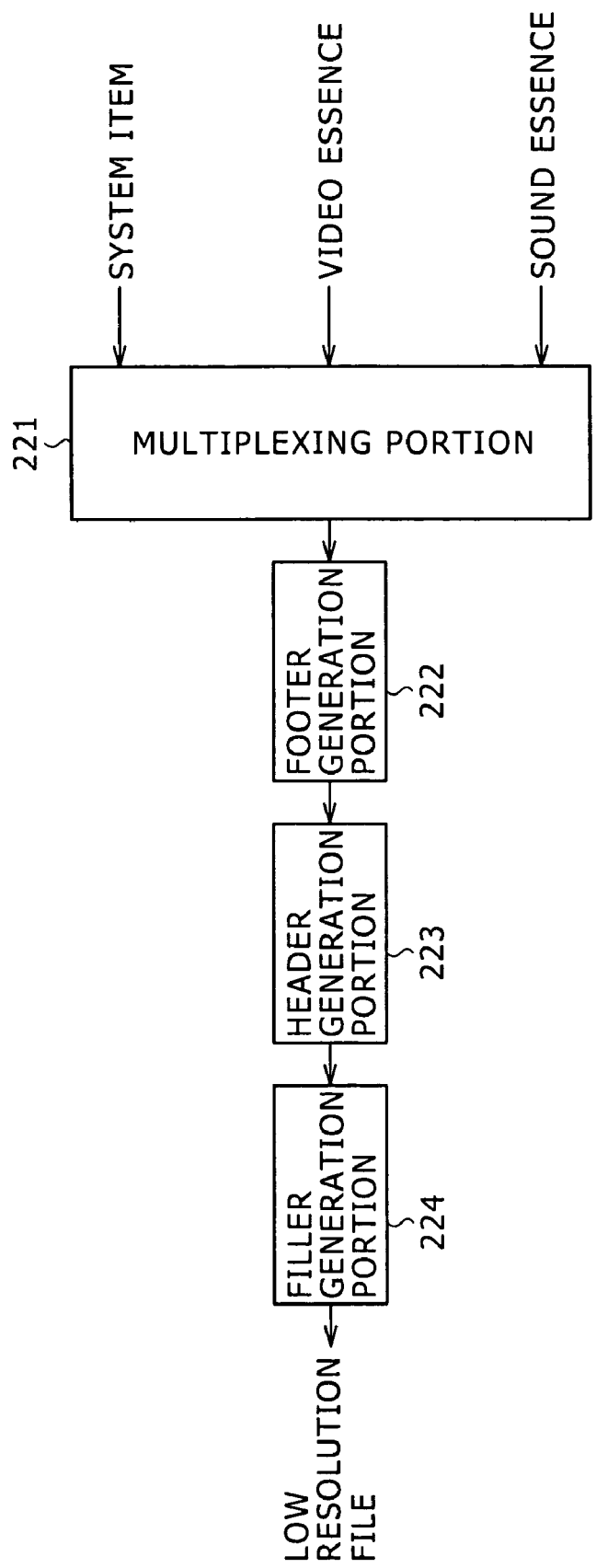
FIG. 28 is a block diagram showing the configuration of a data synthesis portion.

FIG. 28 is a block diagram showing the configuration of the data synthesis portion 166. A multiplexing portion 221 multiplexes the system item supplied from the metadata file processing portion 163, the video essence supplied from the video file process portion 164, and the sound essence supplied from the audio file process portion 165, attaches a body partition to generate a body, and supplies the generated body to a footer generation portion 222. A footer generation portion 222 generates a footer, attaches the footer to the body, and supplies the body and the footer to a header generation portion 223.

The header generation portion 223 generates a header, attaches headers to the body and the footer, and supplies the body, the footer, and the headers to a filler generation portion 224. The filler generation portion 224 generates a filler to be attached to the header, attaches the generated filler to the header, and outputs a low resolution file attached with the filler.

Figure 29:
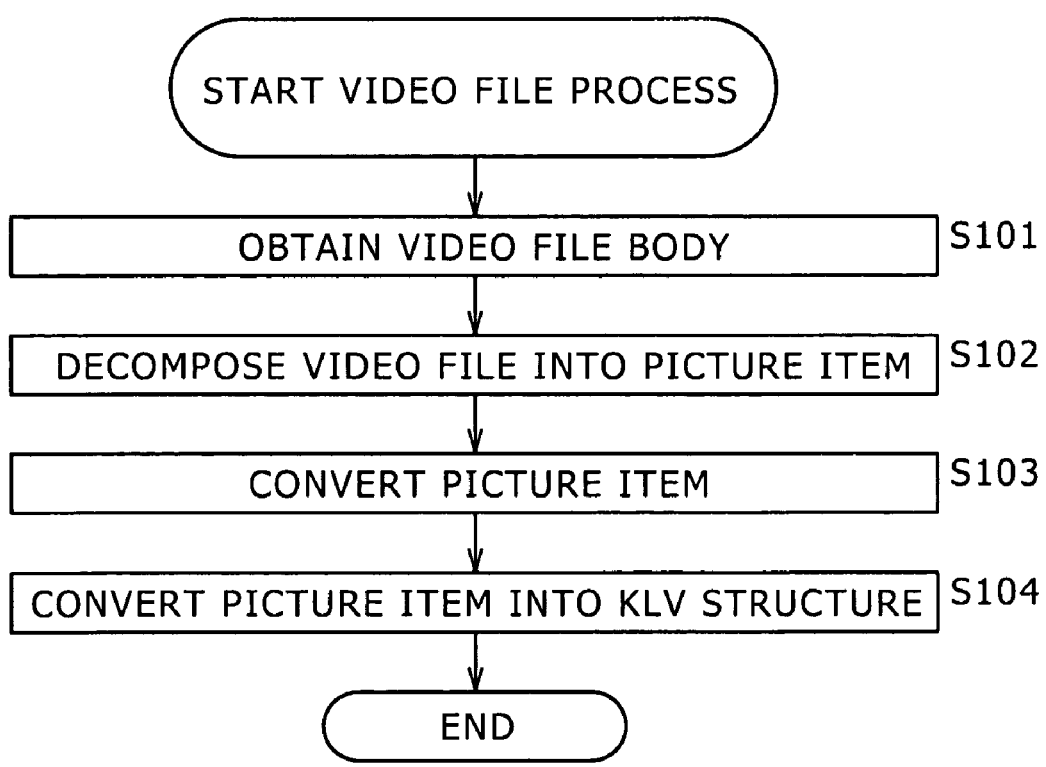
FIG. 29 is a flowchart showing a video file process.

FIG. 29 is a flowchart showing a video file process. At Step S101, the file acquisition portion 162 acquires the video file body from the format conversion portion 12 via the buffer 161. The process proceeds to Step S102. At Step S102, the decomposition portion 181 decomposes the video file supplied from the file acquisition portion 162 into picture items. The process proceeds to Step S103. At Step S103, the data conversion portion 182 converts the decomposed picture item into MPEG video data. The process proceeds to Step S104. At Step S104, the KLV encoder 183 KLV-encodes the picture item supplied from the data conversion portion 182 according to the KLV structure to compose a picture essence. The video file process then terminates.

Figure 30:
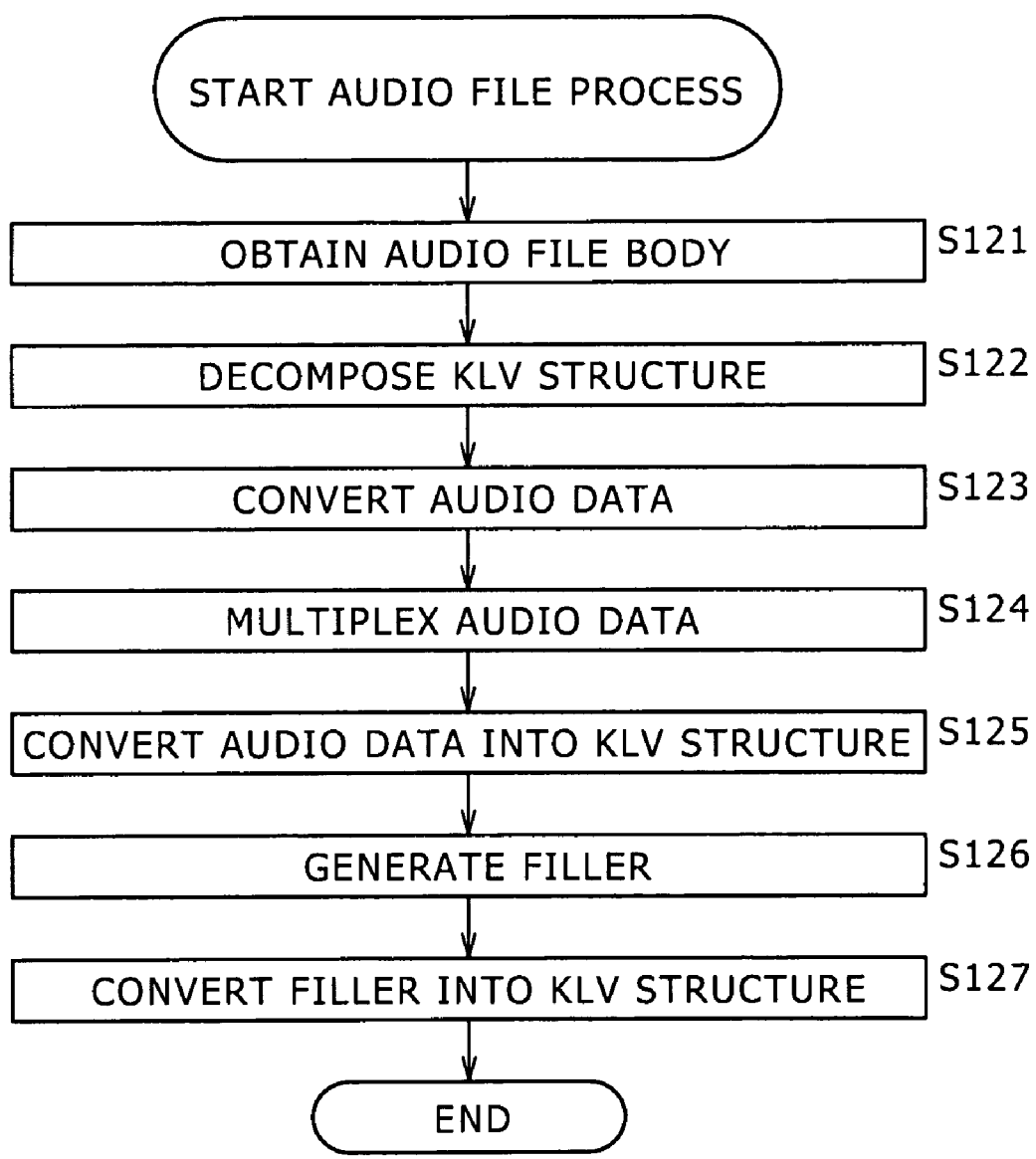
FIG. 30 is a flowchart showing an audio file process.

FIG. 30 is a flowchart showing an audio file process. At Step S121, the file acquisition portion 162 acquires the audio file's body from the format conversion portion 12 via the buffer 161. The process proceeds to Step S122. At Step S122, the KLV decoder 201 decomposes the KLV structure of the body in each channel's audio file supplied from the file acquisition portion 162. The process proceeds to Step S123.

At Step S123, the data conversion portion 202 converts each channel's WAVE audio data supplied from the KLV decoder 201 into 2-channel ITU-TG.711 audio data. The process proceeds to Step S124. At Step S124, the channel multiplexing portion 203 multiplexes the 2-channel audio data supplied from the data conversion portion 202 in units of samples. The process proceeds to Step S125. At Step S125, the KLV encoder 204 divides the audio data supplied from the channel multiplexing portion 203 into four portions and KLV-codes each divided audio data according to the KLV structure. The process proceeds to Step S126.

At Step S126, the filler generation portion 205 generates a filler for each KLV-structured audio data and attaches the filler to the audio data. The process proceeds to Step S127. At Step S127, the KLV encoder 206 KLV-codes the filler attached to the audio data according to the KLV structure to compose a sound essence. The audio file process then terminates.

Figure 31:
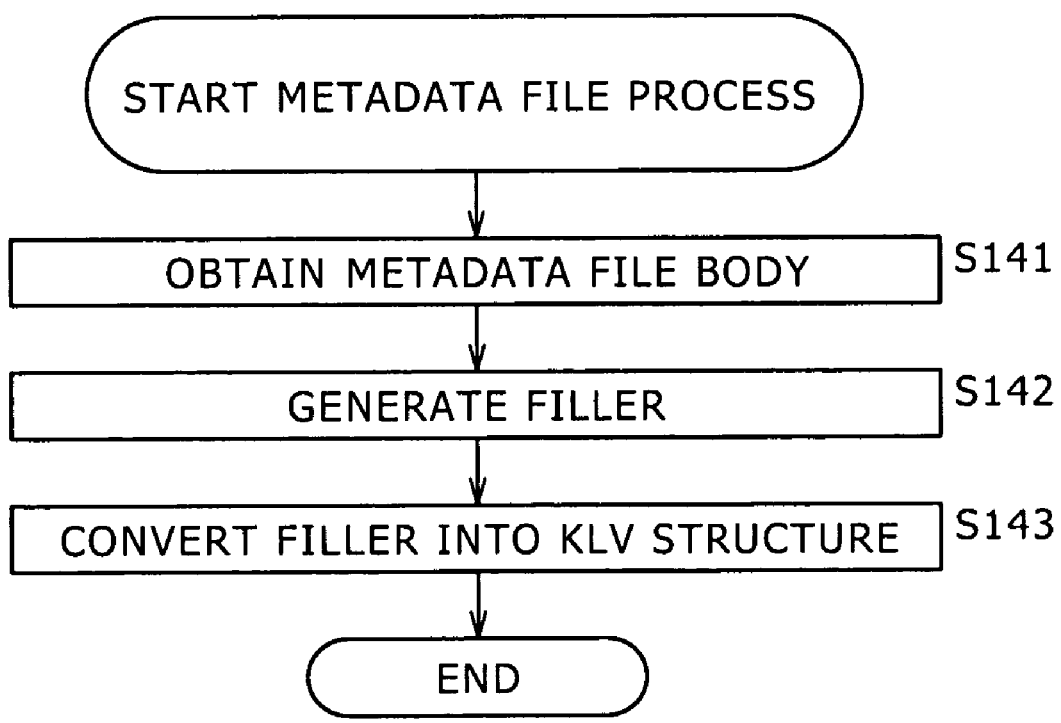
FIG. 31 is a flowchart showing a metadata file process.

FIG. 31 is a flowchart showing a metadata file process. At Step S141, the file acquisition portion 162 acquires the metadata file's body from the format conversion portion 12 via the buffer 161 to compose a system item. The process proceeds to Step S142. At Step S142, the metadata file processing portion 163 generates a filler. The process proceeds to Step S143. At Step S143, the metadata file processing portion 163 KLV-codes the filler attached to the system item according to the KLV structure to compose a file item and outputs the system item attached with the file item. The metadata file process then terminates.

Figure 32:
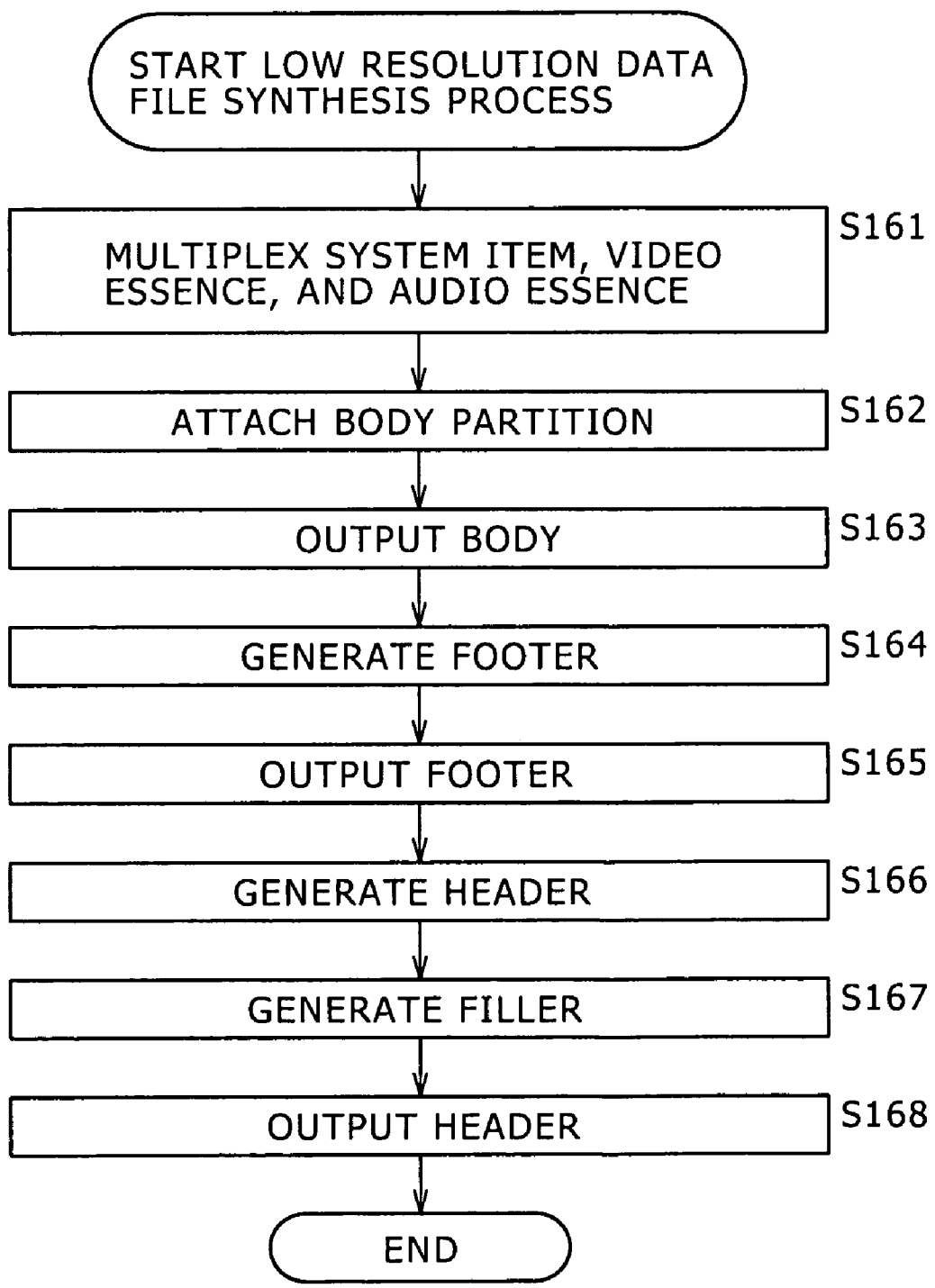
FIG. 32 is a flowchart showing a low resolution synthesis process.

FIG. 32 is a flowchart showing a low resolution data file synthesis process. At Step S161, the multiplexing portion 221 multiplexes the system item supplied from the metadata file processing portion 163, the video essence supplied from the video file process portion 164, and the sound essence supplied from the audio file process portion 165 to generate an essence container. The process proceeds to Step S162. At Step S162, the multiplexing portion 221 attaches a body partition to the essence container to generate a body. The process proceeds to Step S163.

At Step S163, the data synthesis portion 166 outputs the body. The process proceeds to Step S164. At Step S164, the footer generation portion 222 generates a footer. The process proceeds to Step S165. At Step S165, the data synthesis portion 166 outputs the footer. The process proceeds to Step S166.

At Step S166, the header generation portion 223 generates a header. The process proceeds to Step S167. At Step S167, the filler generation portion 224 generates a filler to be attached to the header. The process proceeds to Step S168. At Step S168, the data synthesis portion 166 outputs the header attached with the filler. The low resolution data file synthesis process then terminates.

Figure 33:
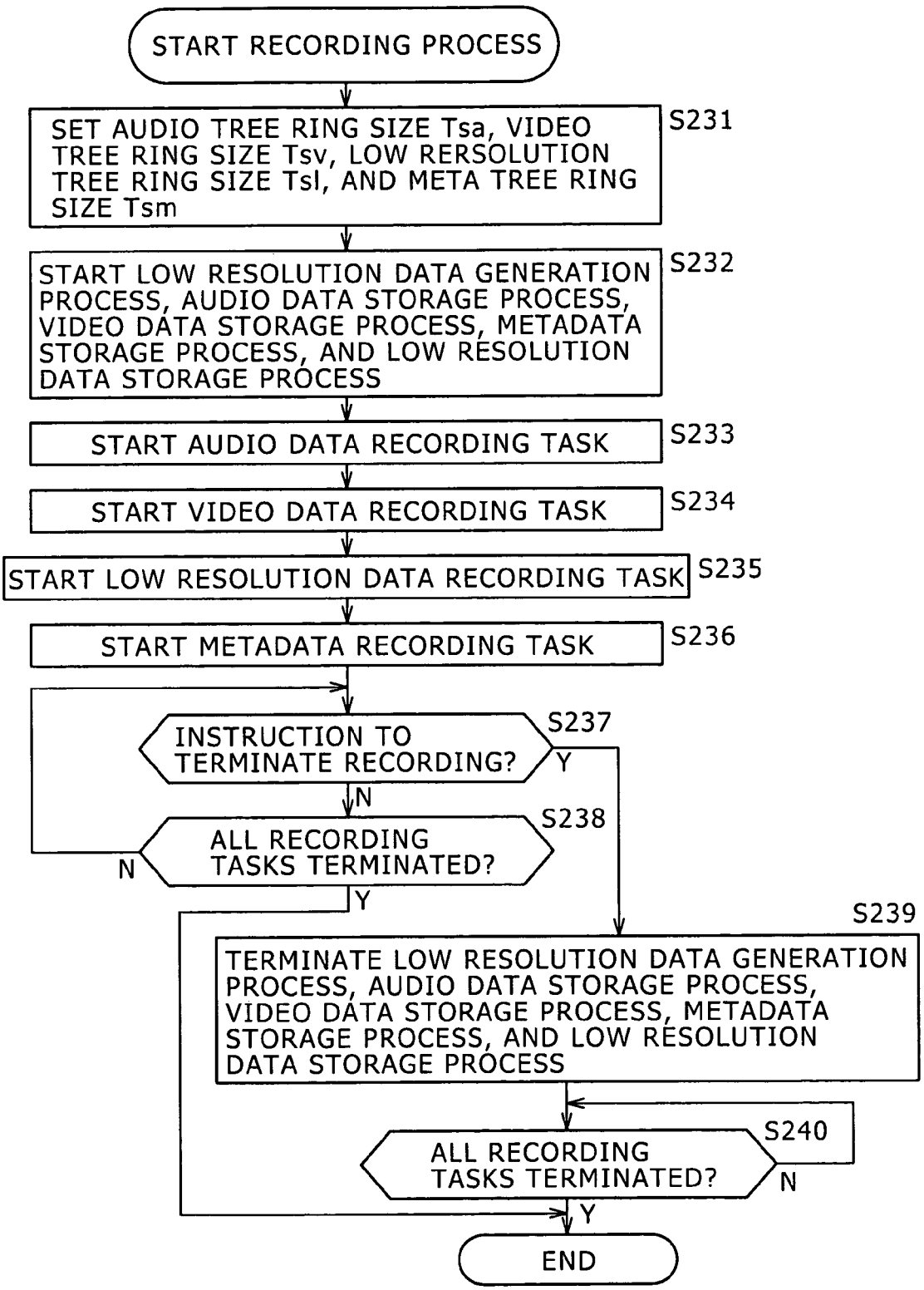
FIG. 33 is a flowchart showing a recording process by means of a control portion.

Referring now to the flowchart in FIG. 33, the following describes the recording process performed by the control portion 119.

The operation portion 120, when operated, supplies the control portion 119 with an operation signal to start a recording process. The control portion 119 starts the recording process.

At Step S231, the control portion 119 first configures not only audio tree ring size $T_{sa}$ and video tree ring size $T_{sv}$, but also low resolution tree ring size $T_{sl}$ and meta tree ring size $T_{sm}$.

Audio tree ring size $T_{sa}$ is a variable to determine the data amount of audio files collectively arranged and recorded on the optical disk 7. Audio tree ring size $T_{sa}$ is represented by the reproduction time of an audio file, for example. Similarly, video tree ring size $T_{sv}$ is a variable to determine the data amount of video files collectively arranged and recorded on the optical disk 7. Video tree ring size $T_{sv}$ is represented by the reproduction time of a video file, for example.

Audio tree ring size $T_{sa}$ and video tree ring size $T_{sv}$ are, so to speak, indirectly represented in reproduction times, not in the data amount itself such as the number of bits or bytes. The reason follows.

As will be described later, the recording process in FIG. 33 cyclically arranges and records audio tree ring data and video tree ring data on the optical disk 7. The audio tree ring data is a collection of audio files in units of data amounts based on audio tree ring size $T_{sa}$ extracted from a series of audio files. The video tree ring data is a collection of video files in units of data amounts based on video tree ring size $T_{sv}$ extracted from a series of video files.

As mentioned above, the audio tree ring data and the video tree ring data are cyclically arranged and recorded on the optical disk 7. In this case, audiovisual reproduction is not performed until there are available a video file and an audio file attendant thereon. From the viewpoint of such reproduction, it is necessary to record audio tree ring data for a given reproduction time slot and video tree ring data for that reproduction time slot at close positions, e.g., adjacently to each other, on the optical disk 7.

Generally, however, there is a large difference between the data amount of the audio file and that of the video file for the same reproduction time period. That is, the data amount of the audio file for a given reproduction time is considerably smaller that that of the video file for that reproduction time. Further, the audio file or the video file may use a variable data rate, not a fixed one.

Accordingly, let us consider that audio tree ring size $T_{sa}$ and video tree ring size $T_{sv}$ are expressed in data amounts and that the audio tree ring data and the video tree ring data are sequentially extracted in units of the data amounts from the series of audio files and video files, respectively. Video tree ring data for each reproduction time slot causes acquisition of audio tree ring data for a later (advanced) reproduction time slot corresponding to the gradually advancing reproduction time. As a result, it becomes difficult to arrange the audio file and the video file to be reproduced for the same reproduction time slot at close positions on the optical disk 7.

On the other hand, let us consider that audio tree ring size $T_{sa}$ and video tree ring size $T_{sv}$ are expressed in reproduction times and that the audio tree ring data and the video tree ring data for the reproduction time are extracted in units of data amounts sequentially from series of audio files and video files, respectively. This makes it possible to acquire a set of audio tree ring data and video tree ring data for similar reproduction time slots. As a result, it is possible to arrange audio files and video files to be reproduced for the same reproduction time slot at close positions.

It is desirable to set audio tree ring size $T_{sa}$ to a value so that it makes seeking and skipping faster than reading, from the optical disk 7, audio tree ring data having the data amount equivalent to the reproduction time expressed by audio tree ring size $T_{sa}$. The same also applies to video tree ring size $T_{sv}$. According to the experience of the inventors, such video tree ring size $T_{sv}$ is 1.5 to 2 seconds, for example.

To configure audio tree ring data and video tree ring data for similar reproduction time slots, the same value may be assigned to audio tree ring size $T_{sa}$ and video tree ring size $T_{sv}$. In this case, it is desirable to alternately arrange audio tree ring data and video tree ring data for similar reproduction time slots on the optical disk 7 from the viewpoint of the reproduction as mentioned above.

Further, audio tree ring size $T_{sa}$ and video tree ring size $T_{sv}$ can be different values. Generally, an audio file's data rate is considerably lower than a video file's data rate. In consideration for this, audio tree ring size $T_{sa}$ can be twice as large as video tree ring size $T_{sv}$, for example. In this case, a piece of audio tree ring data corresponds to two pieces of video tree ring data for a reproduction time slot similar to the reproduction time slot of the audio tree ring data. From the viewpoint of the reproduction as mentioned above, it is desirable to arrange one piece of audio tree ring data and two pieces of corresponding video tree ring data at close positions on the optical disk 7. Specifically, it is desirable to cyclically arrange one piece of audio tree ring data and two pieces of corresponding video tree ring data in the order of: audio tree ring data and two pieces of corresponding video tree ring data one after another; or one of two pieces of corresponding video tree ring data, audio tree ring data, and the other piece of video tree ring data, for example.

At Step S1, audio tree ring size $T_{sa}$ and video tree ring size $T_{sv}$ may be set to predetermined fixed values or variable values. When audio tree ring size $T_{sa}$ and video tree ring size $T_{sv}$ are set to variable values, the operation portion 120 can be operated to input the variable values, for example.

Low resolution tree ring size $T_{sl}$ is a variable to determine the data amount of low resolution data collectively arranged and recorded on the optical disk 7. Similarly to audio tree ring size $T_{sa}$ and video tree ring size $T_{sv}$ as mentioned above, for example, low resolution tree ring size $T_{sl}$ is expressed in the reproduction time in the reproduction time for the video file (or the audio file) originating the low resolution data. Similarly, meta tree ring size $T_s$ is a variable to determine the data amount of metadata collectively arranged and recorded on the optical disk 7. Similarly to audio tree ring size $T_{sa}$ and video tree ring size $T_{sv}$ as mentioned above, for example, meta tree ring size $T_s$ is expressed in the reproduction time of a video file (or an audio file) whose metadata describes various information (e.g., the date and time to capture an image).

Low resolution tree ring size $T_{sl}$ and meta tree ring size $T_{sm}$ are, so to speak, indirectly represented in reproduction times, not in the data amount itself such as the number of bits or bytes. The reason is the same as that for audio tree ring size $T_{sa}$ and video tree ring size $T_{sv}$ as mentioned above.

As will be described later, the recording process in FIG. 33 cyclically arranges and records not only audio tree ring data and video tree ring data, but also low resolution tree ring data and meta tree ring data. The audio tree ring data is a collection of audio files in units of data amounts based on audio tree ring size $T_{sa}$ extracted from a series of audio files. The video tree ring data is a collection of video files in units of data amounts based on video tree ring size $T_{sv}$ extracted from a series of video files. The low resolution tree ring data is a collection of low resolution data in units of data amounts based on low resolution tree ring size $T_{sl}$ extracted from a data series of low resolution data. The meta tree ring data is a collection of meta data in units of data amounts based on meta tree ring size $T_{sm}$ extracted from a data series of meta data.

There may be a case of cyclically arranging and recording audio tree ring data, video tree ring data, low resolution tree ring data, and meta tree ring data on the optical disk 7. The low resolution tree ring data results from reducing the data amount of the audio tree ring data or the video tree ring data. Consequently, it is necessary to record audio tree ring data and video tree ring data for a given reproduction time slot and low resolution tree ring data, i.e., an equivalence to the audio tree ring data or the video tree ring data with the reduced data amount for that reproduction time slot, at close positions on the optical disk 7. Further, the meta tree ring data represents information about the audio tree ring data or the video tree ring data. Consequently, it is necessary to record audio tree ring data and video tree ring data for a given reproduction time slot and meta tree ring data representing information about the audio tree ring data or the video tree ring data for that reproduction time slot at close positions on the optical disk 7.

Let us compare the data rate of the audio file or the video file with that of the low resolution data or the metadata for the same reproduction time. The data rate of the low resolution data or the metadata is smaller than that of the audio file or the video file.

Accordingly, representing low resolution tree ring size $T_{sl}$ and meta tree ring size $T_{sm}$ in data amounts causes a problem similar to that of representing audio tree ring size $T_{sa}$ and video tree ring size $T_{sv}$ in data amounts. That is, it becomes difficult to arrange the audio file, the video file, the low resolution data, and the metadata to be reproduced for similar reproduction time slots at close positions on the optical disk 7.

To solve this problem, the embodiment in FIG. 33 uses reproduction times to represent low resolution tree ring size $T_{sl}$ and meta tree ring size $T_{sm}$ as well as audio tree ring size $T_{sa}$ and video tree ring size $T_{sv}$. This makes it possible to arrange the audio file, the video file, the low resolution data, and the metadata to be reproduced for similar reproduction time slots at close positions on the optical disk 7.

At Step S231, predetermined fixe values or variable values may be used for audio tree ring size $T_{sa}$, video tree ring size $T_{sv}$, low resolution tree ring size $T_{sl}$, and meta tree ring size $T_{sm}$. When audio tree ring size $T_{sa}$, video tree ring size $T_{sv}$, low resolution tree ring size $T_{sl}$, and meta tree ring size $T_{sm}$ are set to variable values, the operation portion 120 can be operated to input the variable values, for example.

After Step S231, the process proceeds to Step S232. The control portion 110 starts a low resolution data generation process to generate a low resolution data series from the audio file and the video file supplied from format conversion portion 12 to the disk drive apparatus 11. In addition, the control portion 119 controls the memory controller 116 to start an audio file storage process and a video file storage process to supply the audio file and the video file obtained by the data conversion portion 118 to the memory 117 for storing these files. At Step S232, the control portion 119 controls the memory controller 116 to start a metadata storage process and a low resolution data storage process to supply the metadata and the low resolution data obtained by the data conversion portion 118 to the memory 117 for storing these data.

The process proceeds to Steps S233 and S234. At Step S233, the control portion 119 starts an audio file recording task, i.e., a control task to record an audio file on the optical disk 7. At Step S234, the control portion 119 starts a video file recording task, i.e., a control task to record a video file on the optical disk 7. The process proceeds to Step S235. At Step S235, the control portion 119 starts a low resolution data recording task, i.e., a control task to record low resolution data on the optical disk 7. The process proceeds to Step S236. At Step S236, the control portion 119 starts a metadata recording task, i.e., a control task to record metadata on the optical disk 7. The process proceeds to Step S237. Detailed descriptions will be provided for the audio file recording task at Step S233, the video file recording task at Step S234, the low resolution data recording task at Step S235, and the metadata recording task at Step S236.

At Step S237, the control portion 119 determines whether or not the operation portion 120 supplies an operation signal to instruct the termination of data recording. When it is determined that no such operation signal is supplied, the process proceeds to Step S238. The control portion 119 determines whether or not all recording tasks have terminated. When it is determined at Step S238 that all recording tasks have not terminated, the process returns to Step S237. The similar process is repeated thereafter.

At Step S238, it may be determined that all recording tasks have been terminated. This signifies termination of all the recording tasks such as the audio file recording task initiated at Step S233, the video file recording task initiated at Step S234, the low resolution data recording task initiated at Step S235, and the metadata recording task initiated at Step S236. In this case, the recording process terminates.

At Step S237, on the other hand, it may be determined that an operation signal to instruct the termination of data recording is supplied. That is, a user may operate the operation portion 120 to terminate the data recording. In this case, the process proceeds to Step S239. The control portion 119 terminates the low resolution data generation process, the audio file storage process, the video file storage process, the metadata storage process, and the low resolution data storage process initiated at Step S232. The process proceeds to Step S240.

Step S240, similarly to at Step S238, it is determined whether or not all the recording tasks have terminated. When it is determined at Step S240 that all the recording tasks have not terminated, the process returns to Step S240 and waits until all the recording tasks terminate.

At Step S240, the process may determine termination of all the recording tasks such as the audio file recording task initiated at Step S233, the video file recording task initiated at Step S234, the low resolution data recording task initiated at Step S235, and the metadata recording task initiated at Step S236. In this case, the recording process terminates.

Figure 34:
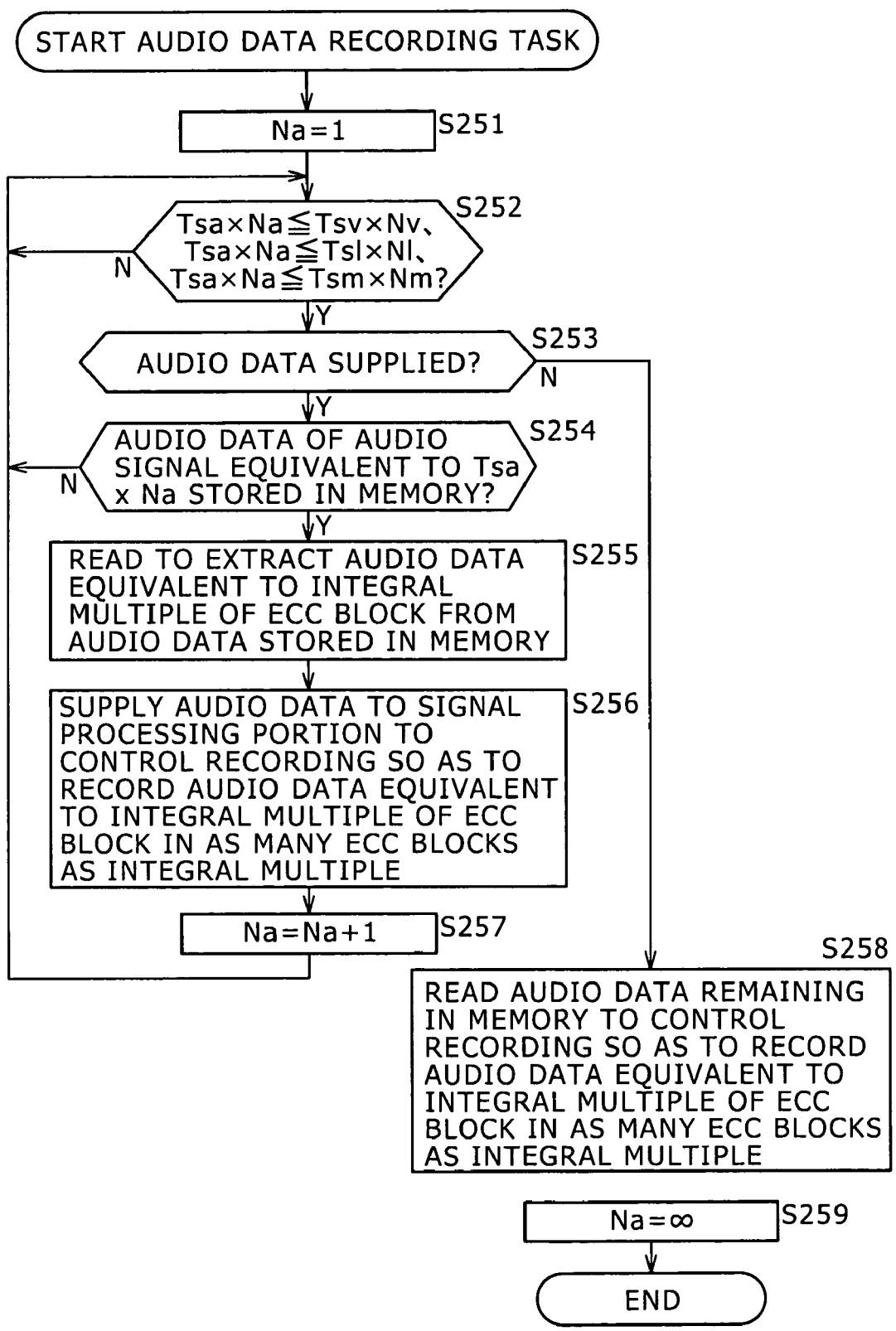
FIG. 34 is a flowchart showing an audio data recording task.

Referring now to the flowchart in FIG. 34, the following describes the audio file recording task initiated at Step S233 in FIG. 33.

When the audio file recording task starts, the control portion 119 initializes variable $N_a$ to 1, for example, at Step S251. Variable $N_a$ is incremented by one in the process at Step S257 later. The process then proceeds to Step S252.

At Step S252, similarly to at Step S12 in FIG. 5, the control portion 119 determines whether or not $T_{sa} \times N_a$ is smaller than or equal to $T_{sv} \times N_v$. Further, the control portion 119 determines whether or not $T_{sa} \times N_a$ is smaller than or equal to $T_{sl} \times N_l$ and is smaller than or equal to $T_{sm} \times N_m$.

In these conditions, $T_{sa}$ denotes an audio tree ring size representing a given reproduction time for an audio file. As will be described later, variable $N_a$ is incremented by one each time an audio file (audio tree ring data) having the data amount based on audio tree ring size $T_{sa}$ is recorded on the optical disk 7. Similarly, $T_{sv}$ denotes a video tree ring size. As will be described later, variable $N_a$ is incremented by one each time the video file recording task records a video file (video tree ring data) having the data amount based on video tree ring size $T_{sv}$ on the optical disk 7. Accordingly, $T_{sa} \times N_a$ is equivalent to the last reproduction time for audio tree ring data to be recorded on the optical disk 7 when the audio file is recorded in units of audio tree ring size $T_{sa}$. $T_{sv} \times N_v$ is equivalent to the last reproduction time for video tree ring data to be recorded on the optical disk 7 when the video file is recorded in units of video tree ring size $T_{sv}$.

$T_{sl}$ denotes a low resolution tree ring size. As will be described later, variable $N_l$ is incremented by one each time the low resolution data recording task records low resolution data (low resolution tree ring data) having the data amount based on low resolution tree ring size $T_{se}$ on the optical disk 7. Further, $T_{sm}$ denotes a meta tree ring size. As will be described later, variable $N_m$ is incremented by one each time the metadata recording task records metadata (meta tree ring data) having the data amount based on meta tree ring size $T_{sm}$ on the optical disk 7. Accordingly, $T_{si} \times N_l$ is equivalent to the last reproduction time for the low resolution tree ring data to be recorded on the optical disk 7 when the low resolution data is recorded in units of low resolution tree ring size $T_{se}$. $T_{sm} \times N_m$ is equivalent to the last reproduction time for the meta tree ring data to be recorded on the optical disk 7 when the metadata is recorded in units of meta tree ring size $T_{sm}$.

Let us suppose to cyclically arrange audio tree ring data, video tree ring data, low resolution tree ring data, and meta tree ring data so that they are recorded at close positions on the optical disk 7 in terms of similar reproduction time slots. Further, let us suppose to arrange audio tree ring data, video tree ring data, low resolution tree ring data, and meta tree ring data so that they are arranged at earlier positions on the optical disk 7 (at positions toward the beginning of a sequence of reading or writing data on the optical disk 7) correspondingly to earlier reproduction times. Moreover, let us suppose to arrange audio tree ring data, video tree ring data, low resolution tree ring data, and meta tree ring data for similar reproduction time slots in the order of audio tree ring data, video tree ring data, low resolution tree ring data, and meta tree ring data, for example, at earlier positions on the optical disk 7.

In this case, audio tree ring data to be recorded next is referred to as targeted audio tree ring data. The targeted audio tree ring data corresponds to the most recent reproduction time slot (closest to reproduction time $T_{sa} \times N_a$) prior to reproduction time $T_{sa} \times N_a$. The targeted audio tree ring data needs to be recorded immediately before video tree ring data, low resolution tree ring data, and meta tree ring data recorded for the most recent reproduction time slot earlier than reproduction time $T_{sa} \times N_a$. That is, the targeted audio tree ring data needs to be recorded immediately after video tree ring data, low resolution tree ring data, and meta tree ring data recorded for the second most recent reproduction time slot earlier than reproduction time $T_{sa} \times N_a$.

Video tree ring data to be recorded corresponds to the most recent reproduction time slot earlier than $T_{sv} \times N_v$. Low resolution tree ring data to be recorded corresponds to the most recent reproduction time slot earlier than $T_{si} \times N_l$. Meta tree ring data to be recorded corresponds to the most recent reproduction time slot earlier than $T_{sm} \times N_m$. When tree ring data belongs to similar reproduction time slots, the audio tree ring data is arranged at earlier positions on the optical disk 7 as mentioned above. The targeted audio tree ring data needs to be recorded at such timing that reproduction time $T_{sa} \times N_a$ for the audio tree ring data is smaller than or equal to reproduction time $T_{sv} \times N_v$ for the video tree ring data, reproduction time $T_{si} \times N_l$ for the low resolution tree ring data, and reproduction time $T_{sm} \times N_m$ for the meta tree ring data.

At Step S252, as mentioned above, it is determined whether or not reproduction time $T_{sa} \times N_a$ for the audio tree ring data is smaller than or equal to reproduction time $T_{sv} \times N_v$ for the video tree ring data, reproduction time $T_{si} \times N_l$ for the low resolution tree ring data, and reproduction time $T_{sm} \times N_m$ for the meta tree ring data. This determines whether or not the current timing is suited for targeted audio tree ring data recording.

At Step S252, it may be determined that reproduction time $T_{sa} \times N_a$ for the audio tree ring data is not smaller than or equal to (before) any of reproduction time $T_{sv} \times N_v$ for the video tree ring data, reproduction time $T_{si} \times N_l$ for the low resolution tree ring data, and reproduction time $T_{sm} \times N_m$ for the meta tree ring data. That is, the current timing may be not suited for recording of the targeted audio tree ring data. In this case, the process returns to Step S252. The similar process is repeated thereafter.

At Step S252, it may be determined that reproduction time $T_{sa} \times N_a$ for the audio tree ring data is smaller than or equal to all of reproduction time $T_{sv} \times N_v$ for the video tree ring data, reproduction time $T_{si} \times N_l$ for the low resolution tree ring data, and reproduction time $T_{sm} \times N_m$ for the meta tree ring data. That is, the current timing may be suited for recording of the targeted audio tree ring data. In this case, the process proceeds to Step S253. The control portion 119 determines whether or not an audio file is supplied to the memory 117 from the data conversion portion 118 via the memory controller 116. When it is determined that the audio file is supplied, the process proceeds to Step S254.

At Step S254, the control portion determines whether or not the memory 117 stores audio files needed for the reproduction equivalent to audio tree ring size $T_{sa} \times N_a$ in total. When it is determined that the memory 117 does not store sufficient audio files, the process returns to Step S252. The succeeding process is repeated. When it is determined at Step S254 that the memory 117 stores audio files equivalent to reproduction time $T_{sa} \times N_a$, the process proceeds to Step S255.

The data amount detection portion 141 of the data conversion portion 118 notifies the memory controller 116 of detection of audio files, if any, needed for the reproduction equivalent to reproduction time $T_{sa} \times N_a$ in total. Based on the notification, the memory controller 116 determines whether or not the memory 117 stores audio files needed for the reproduction equivalent to reproduction time $T_{sa} \times N_a$ in total. The memory controller 116 notifies the control portion 119 of the determination result. Based on the determination result from the memory controller 116, the control portion 119 performs the determination at step S254.

Figure 35:
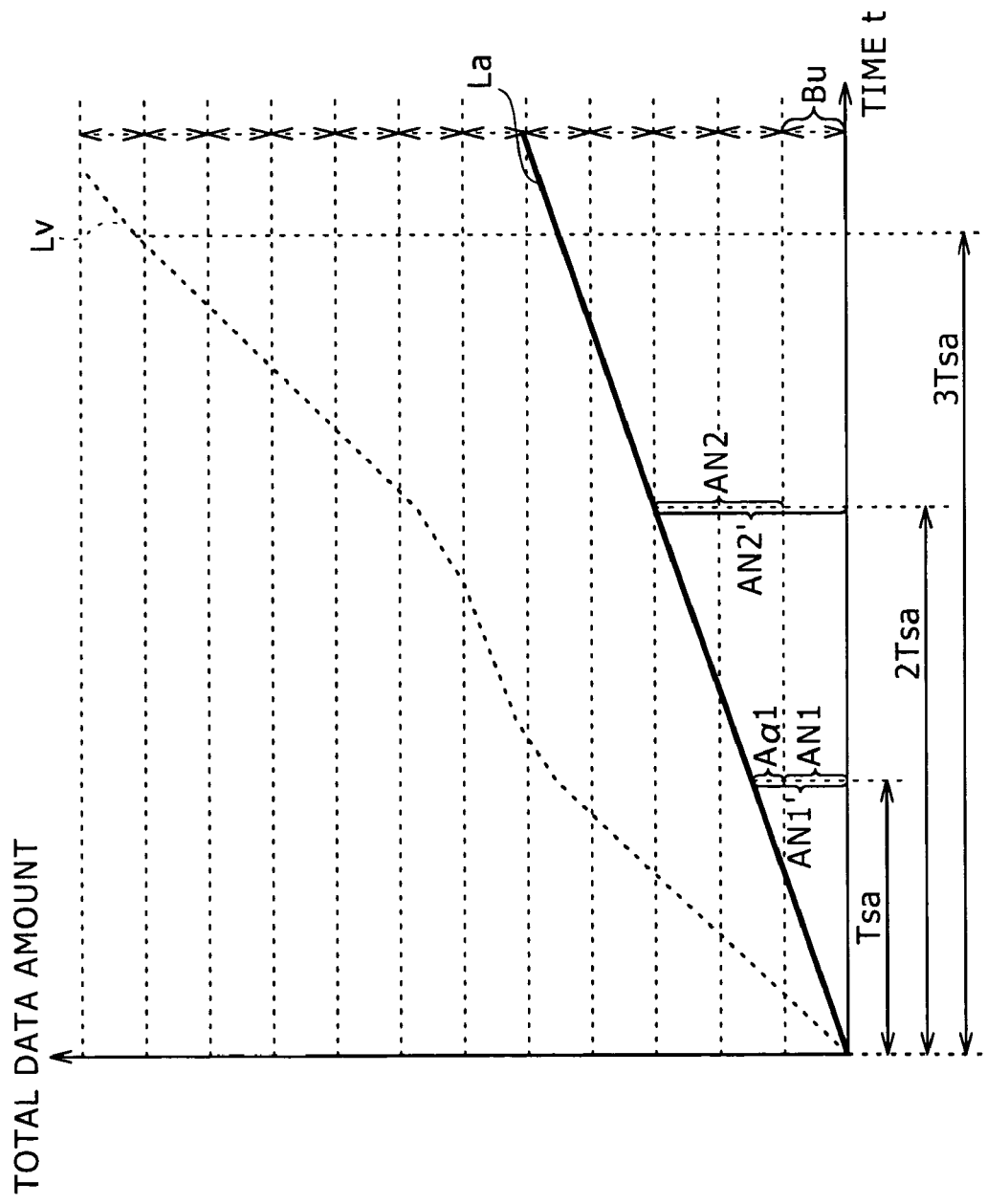
FIG. 35 shows changes in total data amount La of audio data and total data amount Lv of video data.

FIG. 35 shows the relationship between the overall data amount (total data amount) La of audio files to be stored in the memory 117 and the time (reproduction time). On the right of FIG. 6, a small vertical bidirectional arrow (an arrow indicating an interval between horizontal dotted lines) represents data amount Bu of an ECC block. Dotted line Lv in FIG. 35 indicates overall data amount (total data amount) Lv of video files to be stored in the memory 117 and corresponds to a solid line in FIG. 9 to be described. Further in FIG. 35, a straight line is used to represent the audio file's total data amount La. This indicates that the audio file's data rate is fixed. However, variable data rates may be used for audio files.

In FIG. 35, let us assume $N_a = 1$, for example. Then, AN1' represents the data amount of audio file needed for the reproduction equivalent to time $T_{sa} \times N_a$ (=1). At Step S254, let us suppose that the memory 117 stores an audio file with the total data amount of AN1', assuming $N_a = 1$. In this case, it is determined that the memory 117 stores the audio file equivalent to reproduction time $T_{sa} \times N_a$. The process proceeds to Step S255.

At Step S255, the control portion 119 controls the memory controller 116 to read an audio file according to the chronological order of input and extract it from those stored in the memory 117. The data amount of the audio file to be extracted is an integral multiple of (multiplied by n) data amount Bu of one ECC block, for example, as a unit of reading or writing to the optical disk 7 and is equivalent to a maximum data amount capable of being read from the memory 117. The process proceeds to Step S256. As mentioned above, the most recent audio tree ring data before reproduction time $T_{sa} \times N_a$ corresponds to the audio tree ring data to be read from the memory 117 as the audio file whose data amount is an integral multiple of the ECC block and is equivalent to a maximum data amount capable of being read from the memory 117.

When the time is $1 \times T_{sa}$ in FIG. 35, the memory 117 stores at least an audio file with the data amount AN1'. Data amount AN1' is greater than the data amount of one ECC block and is smaller than the data amount of two ECC blocks. At Step S255, the control portion 119 reads an audio file with data amount AN1 equal to data amount Bu of one ECC block as targeted audio tree ring data from the memory 117 to extract the audio file.

There may be an audio file that is not read at Step S255. That is, at the time $1 \times T_{sa}$ in FIG. 35, there may be an audio file whose data amount A$\alpha$1 is smaller than data amount Bu of one ECC block. Such audio file is unchangedly left in the memory 117.

At Step S256 in FIG. 34, the control portion 119 allows the memory controller 116 to supply the signal processing portion 115 with targeted audio tree ring data obtained at Step S255 having the data amount equivalent to an integral multiple of the ECC block. In this manner, recording control is provided so as to record the targeted audio tree ring data having the data amount equivalent to an integral multiple of the ECC block onto as many ECC blocks as the integral multiple.

Figure 36:
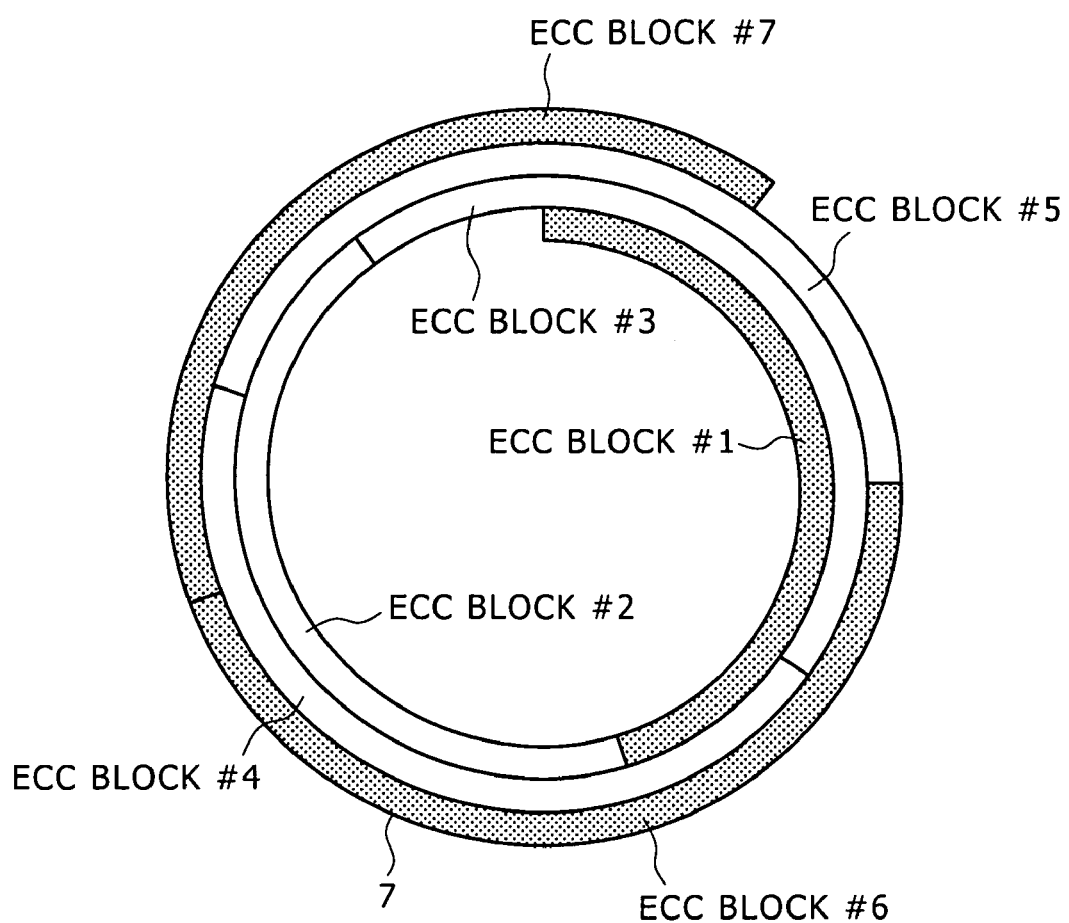
FIG. 36 shows states of recording audio data and video data on an optical disk.

At the time $1 \times T_{sa}$ in FIG. 35, the memory controller 116 supplies the signal processing portion 115 with an audio file equivalent to data amount Bu of one ECC block as targeted audio tree ring data. The pickup portion 112 is supplied with the targeted audio tree ring data having data amount Bu of one ECC block. As shown in FIG. 36, the targeted audio tree ring data is recorded onto ECC block #1, i.e., one of ECC blocks on the optical disk 7 so that boundaries of the audio tree ring data match those of the ECC block #1 on the optical disk 7.

For simplicity, the optical disk 7 is supposed to contain a physically contiguous, large enough free area. Let us suppose that data is read or written to the optical disk 7 from inside peripheries to outside peripheries. Then, it is assumed that data is continuously recorded on free areas from inside peripheries to outside peripheries in the order of data supplied from the memory controller 116 to the signal processing portion 115.

After the control is performed to record the targeted audio tree ring data at Step S256 as mentioned above, the process proceeds to Step S257. The control portion 119 increments variable $N_a$ by 1. The process returns to Step S252. The succeeding process is performed.

At Step S253, it may be determined that no audio file is supplied to the memory 117. That is, the data conversion portion 118 may stop supplying an audio file to the memory controller 116. In such case, the process proceeds to Step S258. The control portion 119 controls the memory controller 116 to read all audio files remaining in the memory 117. The control portion 119 allows the memory controller 116 to supply the corresponding audio tree ring data to the signal processing portion 115. In this manner, the control portion 119 provides recording control so as to record the audio tree ring data having the data amount equivalent to an integral multiple of the ECC block onto as many ECC blocks as the integral multiple.

As mentioned above, an audio file has the data amount equivalent to an integral multiple of the ECC block. At Step S253, the audio tree ring data having the data amount equivalent to an integral multiple of the ECC block is recorded onto as many ECC blocks as the integral multiple.

Thereafter, the process proceeds to Step S259. The control portion 119 sets variable $N_a$ to a value equivalent to the infinity (a very large value). The audio file recording task then terminates.

In this manner, the audio file recording task in FIG. 34 is performed in units of reading and writing to the optical disk 7. For example, the audio tree ring data having the data amount equivalent to an integral multiple of the ECC block is cyclically recorded onto as many ECC blocks as the integral multiple so that the boundaries of the audio tree ring data match those of the ECC block on the optical disk 7.

Referring now to the flowchart in FIG. 36, the following describes the video file recording task initiated at Step S234 in FIG. 33.

When the video file recording task starts, the control portion 119 initializes variable $N_v$ to 1, for example, at Step S261. Variable $N_v$ is incremented by one in the process at Step S267 later. The process then proceeds to Step S262.

At Step S262, the control portion 119 determines whether or not $T_{sv} \times N_v$ is smaller than $T_{sa} \times N_a$, $T_{si} \times N_l$, and $T_{sm} \times N_m$.

In this condition, $T_{sa} \times N_a$ is equivalent to the last reproduction time for audio tree ring data to be recorded on the optical disk 7 when audio files are recorded in units of audio tree ring size $T_{sa}$. $T_{sv} \times N_v$ is equivalent to the last reproduction time for video tree ring data to be recorded on the optical disk 7 when video files are recorded in units of video tree ring size $T_{sv}$.

Let us suppose that audio tree ring data and video tree ring data are cyclically arranged so that these data for similar reproduction time slots are recorded at close positions on the optical disk 7 as mentioned above. Further, let us suppose that, in terms of the arrangement of audio tree ring data and video tree ring data for similar reproduction time slots, audio tree ring data precedes video tree ring data. Video tree ring data to be recorded next is referred to as targeted video tree ring data. The targeted video tree ring data corresponds to video tree ring data for the most recent reproduction time slot (closest to reproduction time $T_{sv} \times N_v$) before reproduction time $T_{sv} \times N_v$. The targeted video tree ring data needs to be recorded immediately after audio tree ring data recorded for the most recent reproduction time slot before reproduction time $T_{sa} \times N_a$. Accordingly, the targeted video tree ring data needs to be recorded at the timing when reproduction time $T_{sv} \times N_v$ for the video tree ring data is smaller than reproduction time $T_{sa} \times N_a$ for the audio tree ring data.

At Step S262, it is determined whether or not reproduction time $T_{sv} \times N_v$ for the video tree ring data is smaller than reproduction time $T_{sa} \times N_a$ for the audio tree ring data as mentioned above. In this manner, it is determined whether or not the current timing is suited for targeted video tree ring data recording.

The condition that $T_{sv} \times N_v$ is smaller than or equal to $T_{si} \times N_l$ is similar to the case at Step S252 in FIG. 34. As mentioned above, the targeted video tree ring data is video tree ring data to be recorded next, i.e., video tree ring data for the most recent reproduction time slot (closest to reproduction time $T_{sv} \times N_v$) before reproduction time $T_{sv} \times N_v$. The condition aims at recording the targeted video tree ring data immediately before the low resolution tree ring data for the most recent reproduction time slot before reproduction time $T_{sv} \times N_v$. That is, the condition aims at recording the targeted video tree ring data immediately after the low resolution tree ring data recorded for the next most recent reproduction time slot before reproduction time $T_{sv} \times N_v$.

The condition that $T_{sv} \times N_v$ is smaller than or equal to $T_{sm} \times N_m$ is similar to the case at Step S252 in FIG. 34. As mentioned above, the targeted video tree ring data is video tree ring data to be recorded next, i.e., video tree ring data for the most recent reproduction time slot before reproduction time $T_{sv} \times N_v$. The condition aims at recording the targeted video tree ring data immediately before the meta tree ring data for the most recent reproduction time slot before reproduction time $T_{sv} \times N_v$. That is, the condition aims at recording the targeted video tree ring data immediately after the meta tree ring data recorded for the next most recent reproduction time slot before reproduction time $T_{sv} \times N_v$.

At Step S262, it may be determined that reproduction time $T_{sv} \times N_v$ for the video tree ring data is not smaller than reproduction time $T_{sa} \times N_a$ for the audio tree ring data, not smaller than or equal to reproduction time $T_{sl} \times N_l$ for the low resolution tree ring data, or not smaller than or equal to reproduction time $T_{sm} \times N_m$ for the meta tree ring data. That is, the current timing may not be suited for recording of the targeted video tree ring data. In this case, the process returns to Step S262. The similar process is repeated thereafter.

At Step S262, it may be determined that reproduction time $T_{sv} \times N_v$ for the video tree ring data is smaller than reproduction time $T_{sa} \times N_a$ for the audio tree ring data, smaller than or equal to reproduction time $T_{sl} \times N_l$ for the low resolution tree ring data, and smaller than or equal to reproduction time $T_{sm} \times N_m$ for the meta tree ring data. That is, the current timing may be suited for recording of the targeted video tree ring data. In this case, the process returns to Step S263. The control portion 119 determines whether or not a video file is supplied to the memory 117 from the data conversion portion 118 via the memory controller 116. When it is determined that the video file is supplied, the process proceeds to Step S24.

At Step S264, the control portion 119 determines whether or not the memory 117 stores video files needed for the reproduction equivalent to video tree ring size $T_{sv} \times N_v$ in total. When it is determined that the memory 117 does not store sufficient video files, the process returns to Step S262. The succeeding process is repeated. When it is determined at Step S264 that the memory 117 stores video files equivalent to reproduction time $T_{sv} \times N_v$, the process proceeds to Step S265.

The data amount detection portion 141 of the data conversion portion 118 notifies the memory controller 116 of detection of video files, if any, needed for the reproduction equivalent to reproduction time $T_{sv} \times N_v$ in total. Based on the notification, the memory controller 116 determines whether or not the memory 117 stores video files needed for the reproduction equivalent to reproduction time $T_{sv} \times N_v$ in total. The memory controller 116 notifies the control portion 119 of the determination result. Based on the determination result from the memory controller 116, the control portion 119 performs the determination at step S264.

Figure 40:
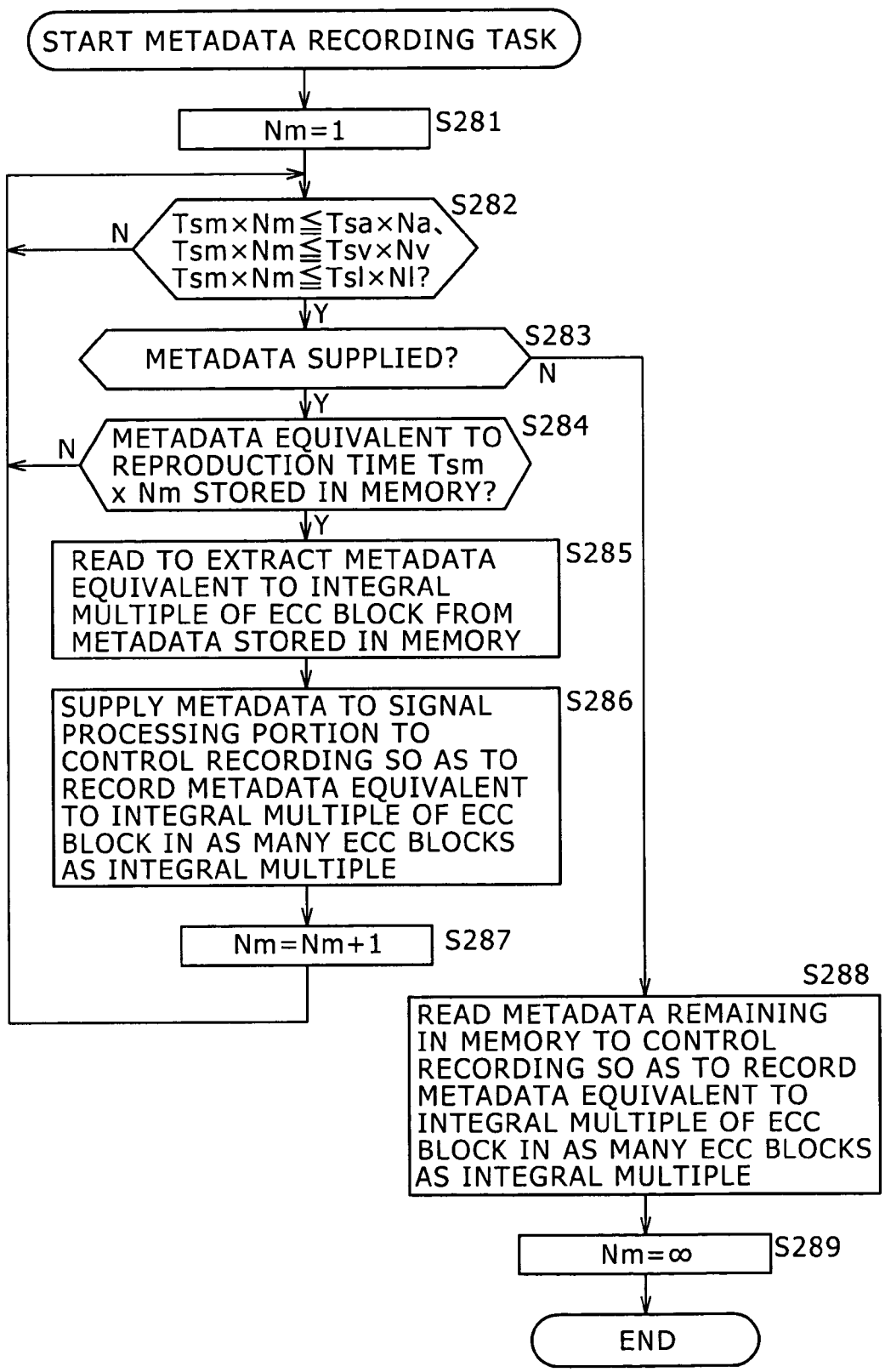
FIG. 40 is a flowchart showing a mate data recording task.

FIG. 40 shows the relationship between the overall data amount (total data amount) La of video files to be stored in the memory 117 and the time (reproduction time). On the right of FIG. 40, similarly to FIG. 35, a small vertical bidirectional arrow (an arrow indicating an interval between horizontal dotted lines) represents data amount Bu of an ECC block. Dotted line Lv in FIG. 40 indicates total data amount La of audio files to be stored in the memory 117 and corresponds to a solid line in FIG. 35 above.

In FIG. 40, let us assume $N_v=1$, for example. Then, VN1' represents the data amount of video file needed for the reproduction equivalent to time $T_{sv} \times N_v$ (=1). At Step S264, let us suppose that the memory 117 stores an video file with the total data amount of VN1', assuming $N_v=1$. In this case, it is determined that the memory 117 stores the video file equivalent to reproduction time $T_{sv} \times N_v$. The process proceeds to Step S265.

At Step S265, the control portion 119 controls the memory controller 116 to read a video file according to the chronological order of input and extract it from those stored in the memory 117. The data amount of the video file to be extracted is an integral multiple of (multiplied by n) data amount Bu of one ECC block, for example, as a unit of reading or writing to the optical disk 7 and is equivalent to a maximum data amount capable of being read from the memory 117. The process proceeds to Step S266. As mentioned above, the most recent video tree ring data before reproduction time $T_{sv} \times N_v$ corresponds to the video tree ring data to be read from the memory 117 as the video file whose data amount is an integral multiple of the ECC block and is equivalent to a maximum data amount capable of being read from the memory 117.

When the time is $1 \times T_{sv}$ in FIG. 40, the memory 117 stores at least a video file with the data amount VN1'. Data amount VN1' is greater than the data amount of four ECC blocks and is smaller than the data amount of five ECC blocks. At Step S265, the control portion 119 reads a video file with data amount VN1 equal to data amount Bu of four ECC blocks as targeted video tree ring data from the memory 117 to extract the video file.

There may be a video file that is not read at Step S265. That is, at the time $1 \times T_{sv}$ in FIG. 40, there may be a video file whose data amount V$\alpha$1 is smaller than data amount Bu of one ECC block. Such video file is unchangedly left in the memory 117.

Figure 39:
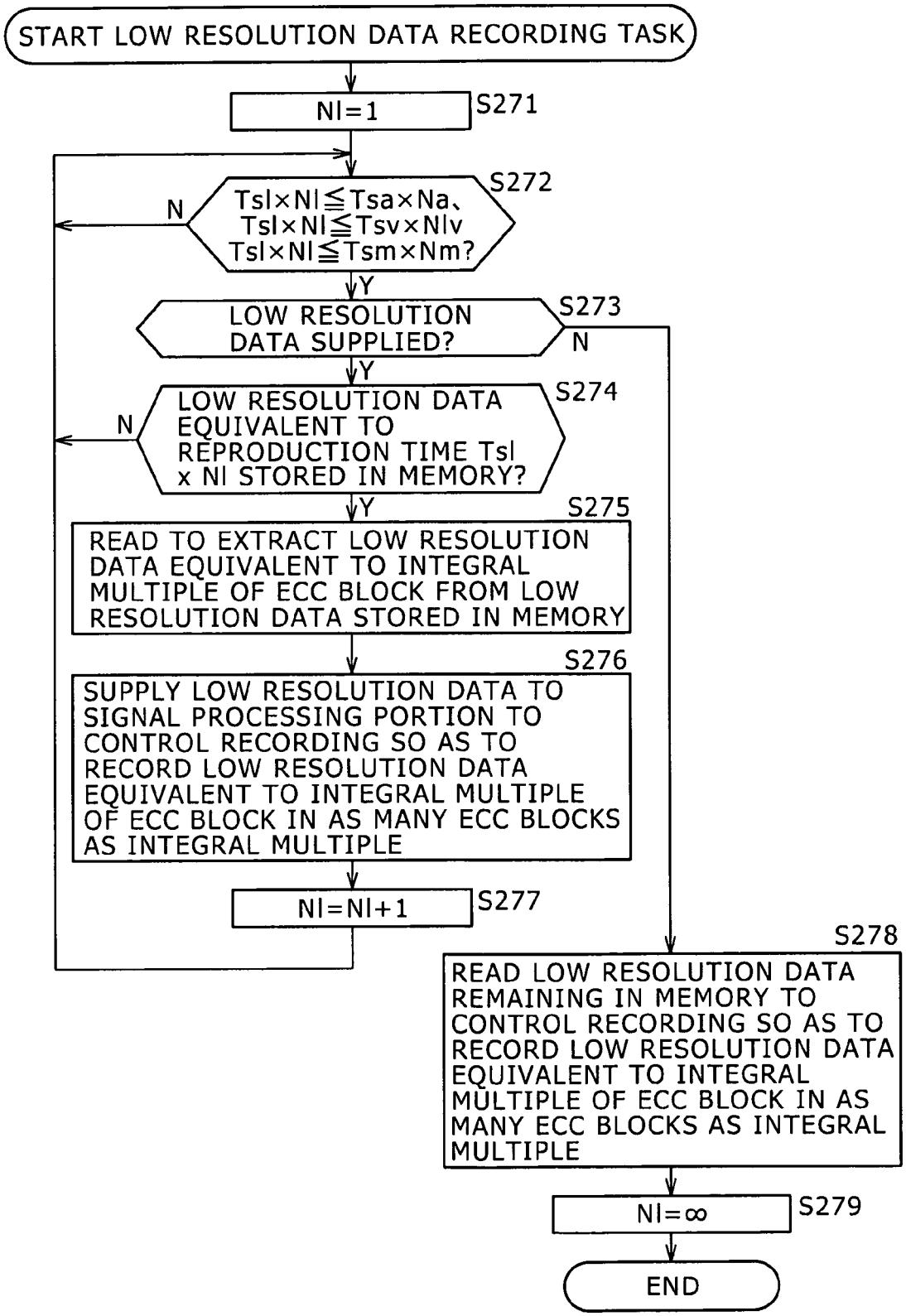
FIG. 39 is a flowchart showing a low resolution data recording task.

At Step S266 in FIG. 39, the control portion 119 allows the memory controller 116 to supply the signal processing portion 115 with targeted video tree ring data obtained at Step S265 having the data amount equivalent to an integral multiple of the ECC block. In this manner, recording control is provided so as to record the targeted video tree ring data having the data amount equivalent to an integral multiple of the ECC block onto as many ECC blocks as the integral multiple.

At the time $1 \times T_{sv}$ in FIG. 40, the memory controller 116 supplies the signal processing portion 115 with a video file equivalent to data amount Bu of four ECC blocks as targeted video tree ring data. The pickup portion 112 is supplied with the targeted video tree ring data having data amount Bu of four ECC blocks. As shown in FIG. 36 above, the targeted video tree ring data is recorded onto ECC blocks #2, #3, #4, #5, i.e., four ECC blocks on the optical disk 7 so that boundaries of the video tree ring data match those of the ECC blocks #2 through #5 on the optical disk 7 (the boundary at the beginning of ECC block #2 and the boundary at the end of ECC block #5).

For simplicity, let us suppose that audio tree ring size $T_{sa}$ equals video tree ring size $T_{sv}$. After the audio file recording task in FIG. 34 and the video file recording task in FIG. 39 start, under the condition of $N_a=N_a=1$, ECC block #1 records the most recent audio tree ring data before reproduction time $T_{sa} \times N_a$ as shown in FIG. 36. When ECC block #1 records the audio tree ring data, the audio file recording task in FIG. 34 increments variable $N_a$ by one at Step S257 to set $N_a=2$. At this time, variable $N_v$ remains 1. Therefore, reproduction time $T_{sa} \times N_a$ becomes smaller than reproduction time $T_{sa} \times N_a$. As a result, the video file recording task in FIG. 39 records the most recent video tree ring data before $T_{sv} \times N_v$ onto ECC blocks #2 through #5 at Step S266.

As mentioned above, it is assumed that data is continuously recorded on free areas from inside peripheries to outside peripheries of the optical disk 7 in the order of data supplied from the memory controller 116 to the signal processing portion 115. The video tree ring data equivalent to four ECC blocks, i.e., the most recent video tree ring data before reproduction time $T_{sv} \times N_v$, begins with ECC block #2 immediately after ECC block #1 that records audio tree ring data immediately before. Consequently, the video tree ring data is recorded onto ECC blocks #2 through #5 as shown in FIG. 36.

According to the above-mentioned description, audio tree ring data and video tree ring data obtained under the condition of $N_a=N_a=1$ are arranged and recorded at adjacent positions on the optical disk 7. That is, the most recent audio tree ring data before reproduction time $T_{sa} \times N_a$ and the most recent video tree ring data before reproduction time $T_{sv} \times N_v$ equal to reproduction time $T_{sa} \times N_a$ are arranged and recorded at adjacent positions on the optical disk 7. In short, audio tree ring data and video tree ring data for similar reproduction time slots are arranged and recorded at adjacent positions on the optical disk 7.

After the control is provided to record the targeted video tree ring data as mentioned above at Step S266, the process proceeds to Step S267. The control portion 119 increments variable $N_v$ by one. The process returns to Step S262. The succeeding process is repeated.

At Step S263, it may be determined that no video file is supplied to the memory 117. That is, the data conversion portion 118 may stop supplying a video file to the memory controller 116. In such case, the process proceeds to Step S268. The control portion 119 controls the memory controller 116 to read all video files remaining in the memory 117. The control portion 119 allows the memory controller 116 to supply the video files to the signal processing portion 115. In this manner, the control portion 119 provides recording control so as to record the video tree ring data having the data amount equivalent to an integral multiple of the ECC block onto as many ECC blocks as the integral multiple.

A video file has the data amount equivalent to an integral multiple of the ECC block. At Step S268, the video tree ring data having the data amount equivalent to an integral multiple of the ECC block is recorded onto as many ECC blocks as the integral multiple.

Thereafter, the process proceeds to Step S269. The control portion 119 sets variable $N_v$ to a value equivalent to the infinity (a very large value). The video file recording task then terminates.

In this manner, the video file recording task in FIG. 36 is performed in units of reading and writing to the optical disk 7 similarly to the video file recording task in FIG. 34. For example, the video tree ring data having the data amount equivalent to an integral multiple of the ECC block is cyclically recorded onto as many ECC blocks as the integral multiple so that the boundaries of the video tree ring data match those of the ECC block on the optical disk 7.

Referring now to the flowchart in FIG. 39, the following describes the low resolution data recording task that starts at Step S235 in FIG. 33 to record low resolution data as a low resolution data file.

When the low resolution data recording task starts, the control portion 119 initializes variable $N_l$ to 1, for example, at Step S271. Variable $N_l$ is incremented by one in the process at Step S277 later. The process then proceeds to Step S272.

At Step S272, the control portion 119 determines whether or not $T_{sl} \times N_l$ is smaller than $T_{sa} \times N_a$, $T_{sv} \times N_v$, and $T_{sm} \times N_m$.

Figure 37:
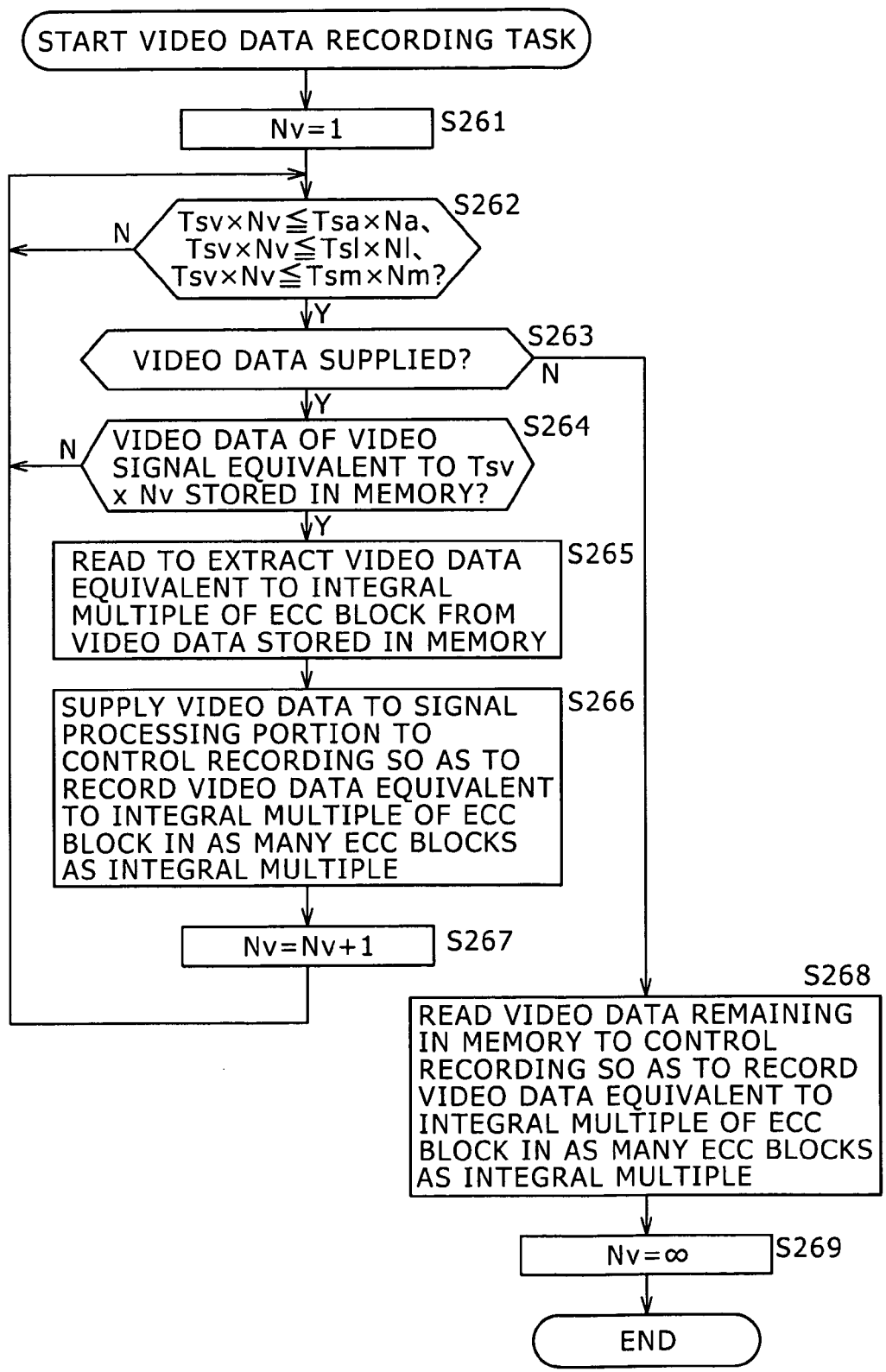
FIG. 37 is a flowchart showing a video data recording task.
Figure 38:
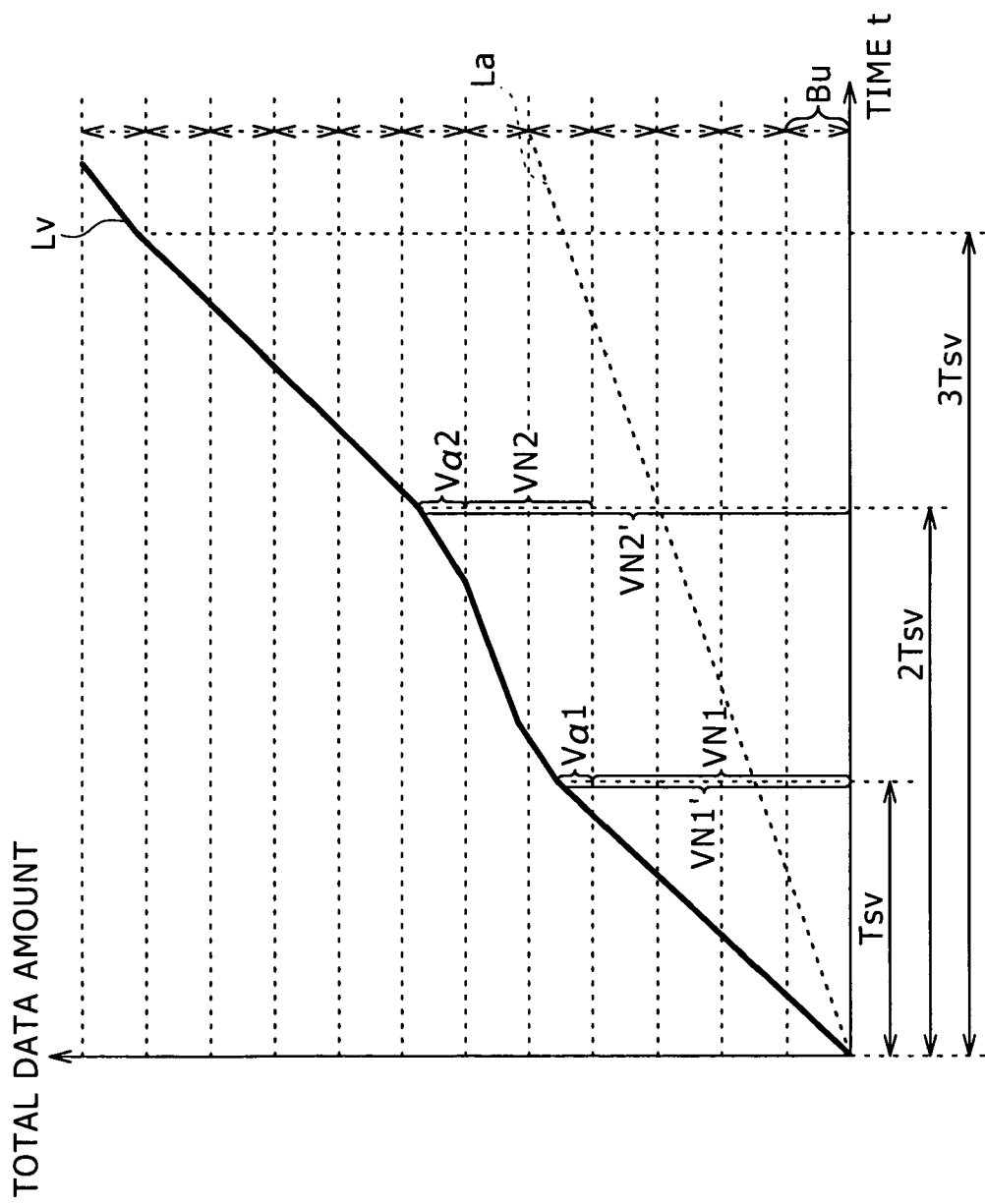
FIG. 38 shows changes in total data amount La of audio data and total data amount Lv of video data.

The condition that $T_{sl} \times N_l$ is smaller than $T_{sa} \times N_a$ is similar to the case at Step S262 in FIG. 37. As mentioned above, the targeted low resolution tree ring data is low resolution tree ring data to be recorded next. The condition aims at recording the targeted low resolution tree ring data immediately after the audio tree ring data for the most recent reproduction time slot before reproduction time $T_{sl} \times N_l$. The condition that $T_{sl} \times N_l$ is smaller than $T_{sv} \times N_v$ is also similar to the case at Step S262 in FIG. 37. As mentioned above, the targeted low resolution tree ring data is low resolution tree ring data to be recorded next. The condition aims at recording the targeted low resolution tree ring data immediately after the video tree ring data for the most recent reproduction time slot before reproduction time $T_{sl} \times N_l$.

The condition that $T_{sl} \times N_l$ is smaller than or equal to $T_{sm} \times N_m$ is similar to the case at Step S252 in FIG. 34. As mentioned above, the targeted low resolution tree ring data is low resolution tree ring data to be recorded next, i.e., low resolution tree ring data for the most recent reproduction time slot (closest to reproduction time $T_{sl} \times N_l$) before reproduction time $T_{sl} \times N_l$. The condition aims at recording the targeted low resolution tree ring data immediately before the meta tree ring data for the most recent reproduction time slot before reproduction time $T_{sl} \times N_l$. That is, the condition aims at recording the targeted low resolution tree ring data immediately after the meta tree ring data recorded for the next most recent reproduction time slot before reproduction time $T_{sl} \times N_l$.

At Step S272, it may be determined that reproduction time $T_{sl} \times N_l$ for the low resolution tree ring data is not smaller than reproduction time $T_{sa} \times N_a$ for the audio tree ring data, not smaller than reproduction time $T_{sv} \times N_v$ for the video tree ring data, or not smaller than or equal to reproduction time $T_{sm} \times N_m$ for the meta tree ring data. That is, the current timing may not be suited for recording of the targeted low resolution tree ring data. In this case, the process returns to Step S272. The similar process is repeated thereafter.

At Step S272, it may be determined that reproduction time $T_{sl} \times N_l$ for the low resolution tree ring data is smaller than reproduction time $T_{sa} \times N_a$ for the audio tree ring data, smaller than reproduction time $T_{sv} \times N_v$ for the video tree ring data, and smaller than or equal to reproduction time $T_{sm} \times N_m$ for the meta tree ring data. That is, the current timing may be suited for recording of the targeted low resolution tree ring data. In this case, the process returns to Step S273. The control portion 119 determines whether or not low resolution data is supplied to the memory 117 from the data conversion portion 118 via the memory controller 116. When it is determined that the low resolution data is supplied, the process proceeds to Step S274.

At Step S274, the control portion 119 determines whether or not the memory 117 stores low resolution data needed for the reproduction equivalent to low resolution tree ring size $T_{sl} \times N_l$ in total. When it is determined that the memory 117 does not store sufficient low resolution data, the process returns to Step S272. The similar process is repeated. When it is determined at Step S274 that the memory 117 stores low resolution data equivalent to reproduction time $T_{sl} \times N_l$, the process proceeds to Step S275.

The data amount detection portion 141 of the data conversion portion 118 notifies the memory controller 116 of detection of video files and audio files, if any, needed for the reproduction equivalent to reproduction time $T_{sl} \times N_l$ in total. Based on the notification, the memory controller 116 determines whether or not the memory 117 stores low resolution data needed for the reproduction equivalent to reproduction time $T_{sl} \times N_l$ in total. The memory controller 116 notifies the control portion 119 of the determination result. Based on the determination result from the memory controller 116, the control portion 119 performs the determination at step S274. The embodiment defines that the low resolution data results from compressing and encoding a video file or the like whose data amount is reduced. Further, it is possible to define that the low resolution data directly results from a video file or the like whose data amount is reduced.

At Step S275, the control portion 119 controls the memory controller 116 to read low resolution data according to the chronological order of input and extract it from those stored in the memory 117. The data amount of the low resolution data to be extracted is an integral multiple of (multiplied by n) data amount Bu of one ECC block, for example, as a unit of reading or writing to the optical disk 7 and is equivalent to a maximum data amount capable of being read from the memory 117. The process proceeds to Step S276.

As mentioned above, the most recent low resolution tree ring data before reproduction time $T_{sl} \times N_l$ corresponds to the low resolution tree ring data to be read from the memory 117 as the low resolution data whose data amount is an integral multiple of the ECC block and is equivalent to a maximum data amount capable of being read from the memory 117.

Low resolution data not read at Step S275 is left in the memory 117.

At Step S276, the control portion 119 allows the memory controller 116 to supply the signal processing portion 115 with targeted low resolution tree ring data obtained at Step S275 having the data amount equivalent to an integral multiple of the ECC block. Recording control is provided so as to record the targeted low resolution tree ring data having the data amount equivalent to an integral multiple of the ECC block onto as many ECC blocks as the integral multiple. In this manner, the low resolution tree ring data having the data amount equivalent to an integral multiple of the ECC block is recorded onto as many ECC blocks as the integral multiple so that the boundaries of the low resolution tree ring data match those of the ECC block on the optical disk 7.

The process proceeds to Step S277. the control portion 119 increments variable $N_l$ by 1. The process returns to Step S272. The similar process is repeated.

At Step S273, it may be determined that no low resolution data is supplied to the memory 117. That is, the data conversion portion 118 may stop supplying low resolution data to the memory controller 116. In such case, the process proceeds to Step S278. The control portion 119 controls the memory controller 116 to read all low resolution data remaining in the memory 117. The control portion 119 allows the memory controller 116 to supply the low resolution data to the signal processing portion 115. In this manner, the control portion 119 provides recording control so as to record the low resolution tree ring data having the data amount equivalent to an integral multiple of the ECC block onto as many ECC blocks as the integral multiple.

A low resolution data file has the data amount equivalent to an integral multiple of the ECC block. At Step S278, the low resolution data tree ring data having the data amount equivalent to an integral multiple of the ECC block is recorded onto as many ECC blocks as the integral multiple.

Thereafter, the process proceeds to Step S279. The control portion 119 sets variable $N_l$ to a value equivalent to the infinity (a very large value). The low resolution data recording task then terminates.

Referring now to the flowchart in FIG. 40, the following describes the metadata recording task initiated at Step S236 in FIG. 33.

When the metadata recording task starts, the control portion 119 initializes variable $N_l$ to 1, for example, at Step S287. Variable $N_l$ is incremented by one in the process at Step S287 later. The process then proceeds to Step S282.

At Step S282, the control portion 119 determines whether or not $T_{sm} \times N_m$ is smaller than $T_{sa} \times N_a$, $T_{sv} \times N_v$, and $T_{sl} \times N_l$.

The condition that $T_{sm} \times N_m$ is smaller than $T_{sa} \times N_a$ is similar to the case at Step S262 in FIG. 37. As mentioned above, the targeted meta tree ring data is meta tree ring data to be recorded next. The condition aims at recording the targeted meta tree ring data immediately after the audio tree ring data for the most recent reproduction time slot before reproduction time $T_{sm} \times N_m$. The condition that $T_{sm} \times N_m$ is smaller than $T_{sv} \times N_v$ is also similar to the case at Step S262 in FIG. 37. As mentioned above, the targeted meta tree ring data is meta tree ring data to be recorded next. The condition aims at recording the targeted meta tree ring data immediately after the video tree ring data for the most recent reproduction time slot before reproduction time $T_{sm} \times N_m$. Similarly, there is a condition that $T_{sm} \times N_m$ is smaller than $T_{sl} \times N_l$. As mentioned above, the targeted meta tree ring data is meta tree ring data to be recorded next. The condition aims at recording the targeted meta tree ring data immediately after the low resolution tree ring data for the most recent reproduction time slot before reproduction time $T_{sm} \times N_m$.

At Step S282, it may be determined that reproduction time $T_{sm} \times N_m$ for the meta tree ring data is not smaller than reproduction time $T_{sa} \times N_a$ for the audio tree ring data, not smaller than reproduction time $T_{sv} \times N_v$ for the video tree ring data, or not smaller than or equal to reproduction time $T_{sl} \times N_l$ for the meta tree ring data. That is, the current timing may not be suited for recording of the targeted meta tree ring data. In this case, the process returns to Step S282. The similar process is repeated thereafter.

At Step S282, it may be determined that reproduction time $T_{sm} \times N_m$ for the meta tree ring data is smaller than reproduction time $T_{sa} \times N_a$ for the audio tree ring data, smaller than reproduction time $T_{sv} \times N_v$ for the video tree ring data, and smaller than or equal to reproduction time $T_{sl} \times N_l$ for the low resolution tree ring data. That is, the current timing may be suited for recording of the targeted meta tree ring data. In this case, the process returns to Step S283. The control portion 119 determines whether or not meta data is supplied to the memory 117 from the data conversion portion 118 via the memory controller 116. When it is determined that the meta data is supplied, the process proceeds to Step S284.

At Step S284, the control portion 119 determines whether or not the memory 117 stores meta data needed for the reproduction equivalent to meta tree ring size $T_{sm} \times N_m$ in total. When it is determined that the memory 117 does not store sufficient metadata, the process returns to Step S282. The similar process is repeated. When it is determined at Step S284 that the memory 117 stores low resolution data equivalent to reproduction time $T_{sm} \times N_m$, the process proceeds to Step S285.

The data amount detection portion 141 of the data conversion portion 118 notifies the memory controller 116 of detection of video files and audio files, if any, needed for the reproduction equivalent to reproduction time $T_{sm} \times N_m$ in total. Based on the notification, the memory controller 116 determines whether or not the memory 117 stores meta data needed for the reproduction equivalent to reproduction time $T_{sm} \times N_m$ in total. The memory controller 116 notifies the control portion 119 of the determination result. Based on the determination result from the memory controller 116, the control portion 119 performs the determination at step S284.

At Step S285, the control portion 119 controls the memory controller 116 to read meta data according to the chronological order of input and extract it from those stored in the memory 117. The data amount of the metadata to be extracted is an integral multiple of (multiplied by n) data amount Bu of one ECC block, for example, as a unit of reading or writing to the optical disk 7 and is equivalent to a maximum data amount capable of being read from the memory 117. The process proceeds to Step S286.

As mentioned above, the most recent meta tree ring data before reproduction time $T_{sm} \times N_m$ corresponds to the meta tree ring data to be read from the memory 117 as the meta data whose data amount is an integral multiple of the ECC block and is equivalent to a maximum data amount capable of being read from the memory 117.

Meta data not read at Step S285 is left in the memory 117.

At Step S286, the control portion 119 allows the memory controller 116 to supply the signal processing portion 115 with targeted meta tree ring data obtained at Step S285 having the data amount equivalent to an integral multiple of the ECC block. Recording control is provided so as to record the targeted meta tree ring data having the data amount equivalent to an integral multiple of the ECC block onto as many ECC blocks as the integral multiple. In this manner, the meta tree ring data having the data amount equivalent to an integral multiple of the ECC block is recorded onto as many ECC blocks as the integral multiple so that the boundaries of the meta tree ring data match those of the ECC block on the optical disk 7.

The process proceeds to Step S287. the control portion 119 increments variable $N_m$ by 1. The process returns to Step S282. The similar process is repeated.

At Step S283, it may be determined that no meta data is supplied to the memory 117. That is, the data conversion portion 118 may stop supplying meta data to the memory controller 116. In such case, the process proceeds to Step S288. The control portion 119 controls the memory controller 116 to read all meta data remaining in the memory 117. The control portion 119 allows the memory controller 116 to supply the meta data to the signal processing portion 115. In this manner, the control portion 119 provides recording control so as to record the meta tree ring data having the data amount equivalent to an integral multiple of the ECC block onto as many ECC blocks as the integral multiple.

Thereafter, the process proceeds to Step S289. The control portion 119 sets variable $N_m$ to a value equivalent to the infinity (a very large value). The meta data recording task then terminates.

In this manner, the control portion 119 performs the process for the audio file recording task, the video file recording task, the low resolution data recording task, and the metadata recording task to record audio files, video files, metadata, and low resolution data on the optical disk 7. For example, let us suppose that audio tree ring size $T_{sa}$ and video tree ring size $T_{sv}$ are equivalent to the same time. In this case, the control portion 119 sequentially records the audio tree ring data as a set of audio files and the video tree ring data as a set of video files for similar reproduction time slots so that they are arranged at adjacent positions on the optical disk 7. Further, the control portion 119 sequentially records the low resolution tree ring data as a set of low resolution data and the metadata tree ring data as a set of metadata for similar reproduction time slots so that they are arranged at positions adjacent to the audio tree ring data and the video tree ring data on the optical disk 7.

Video files, audio files, and the like are recorded on the optical disk 7 as if tree rings were formed. From this analogy, a set of audio files or video files recorded on the optical disk 7 is referred to as audio "tree ring" data or video "tree ring" data. The same applies to the low resolution tree ring data and the meta tree ring data. In the description to follow, the term "tree ring data" is used to express a collection of data in a given data series recorded on the optical disk 7 as if tree rings were formed.

Audio tree ring size $T_{sa}$ and video tree ring size $T_{sv}$ determine the width of a tree ring (the number of tracks to record one piece of audio tree ring data or video tree ring data) formed on the optical disk 7. Audio tree ring size $T_{sa}$ and video tree ring size $T_{sv}$ can be varied in accordance with radial positions of the optical disk 7 to record audio tree ring data and video tree ring data. Depending on audio tree ring size $T_{sa}$ or video tree ring size $T_{sv}$ there may be a case of recording one piece of audio tree ring data or video tree ring data on a track that is shorter than one lap.

As mentioned above, audio tree ring data and video tree ring data for similar reproduction time slots are recorded at close positions on the optical disk 7. Therefore, it is possible to fast read and reproduce an audio file and a video file at the same reproduction time from the optical disk 7.

The audio file and the video file are assumed to be tree ring data equivalent to the data amount of multiple ECC blocks. The audio file and the video file are recorded on the multiple ECC blocks so that boundaries of the tree ring data match those of ECC blocks. It is possible to read only the audio file or the video file from the optical disk 7. As a result, it is possible to fast edit only the audio file or the video file.

The header, the body, and the footer in a video file each are assigned with the data amount equal to an integral multiple of an ECC block. The header, the body, and the footer are recorded in units of ECC blocks. That is, one ECC block does not record any two of the header, the body, and the footer.

When one of the header, the body, and the footer is written or read, the write or read process is performed for the minimum number of ECC blocks. The write or read process becomes more efficient. As a result, a process to write a file causes the minimum number of clusters whose data is rewritten. When the optical disk 7 is subject to a physical limitation (in terms of physicality) on the number of rewrite operations, there is an advantage of prolonging the life of the optical disk 7 with reference to the number of rewrite operations.

The determination processes are performed at Step S252 of the audio file recording task in FIG. 34, Step S262 of the video file recording task in FIG. 37, Step S272 of the low resolution data recording task in FIG. 39, and Step S282 of the metadata recording task in FIG. 40. The determination processes allow the audio tree ring data, the video tree ring data, the low resolution tree ring data, and the meta tree ring data for similar reproduction time slots to be collectively and cyclically recorded on the optical disk 7 in the order of the audio tree ring data, the video tree ring data, the low resolution tree ring data, and the meta tree ring data.

The priority of recording on the optical disk 7 is not limited to the order of the audio tree ring data, the video tree ring data, the low resolution tree ring data, and the meta tree ring data as mentioned above.

The priority of recording on the optical disk 7 may be the order of the meta tree ring data, the audio tree ring data, the video tree ring data, and the low resolution tree ring data.

As mentioned above, the memory controller 116 reads data from the memory 117 to extract the audio tree ring data, the video tree ring data, the low resolution tree ring data, and the meta tree ring data. The following further describes processes to configure (extract) the memory controller 116 reads data from the memory 117 to extract the audio tree ring data, the video tree ring data, the low resolution tree ring data, and the meta tree ring data with reference to FIGS. 41 through 45.

Figure 41:
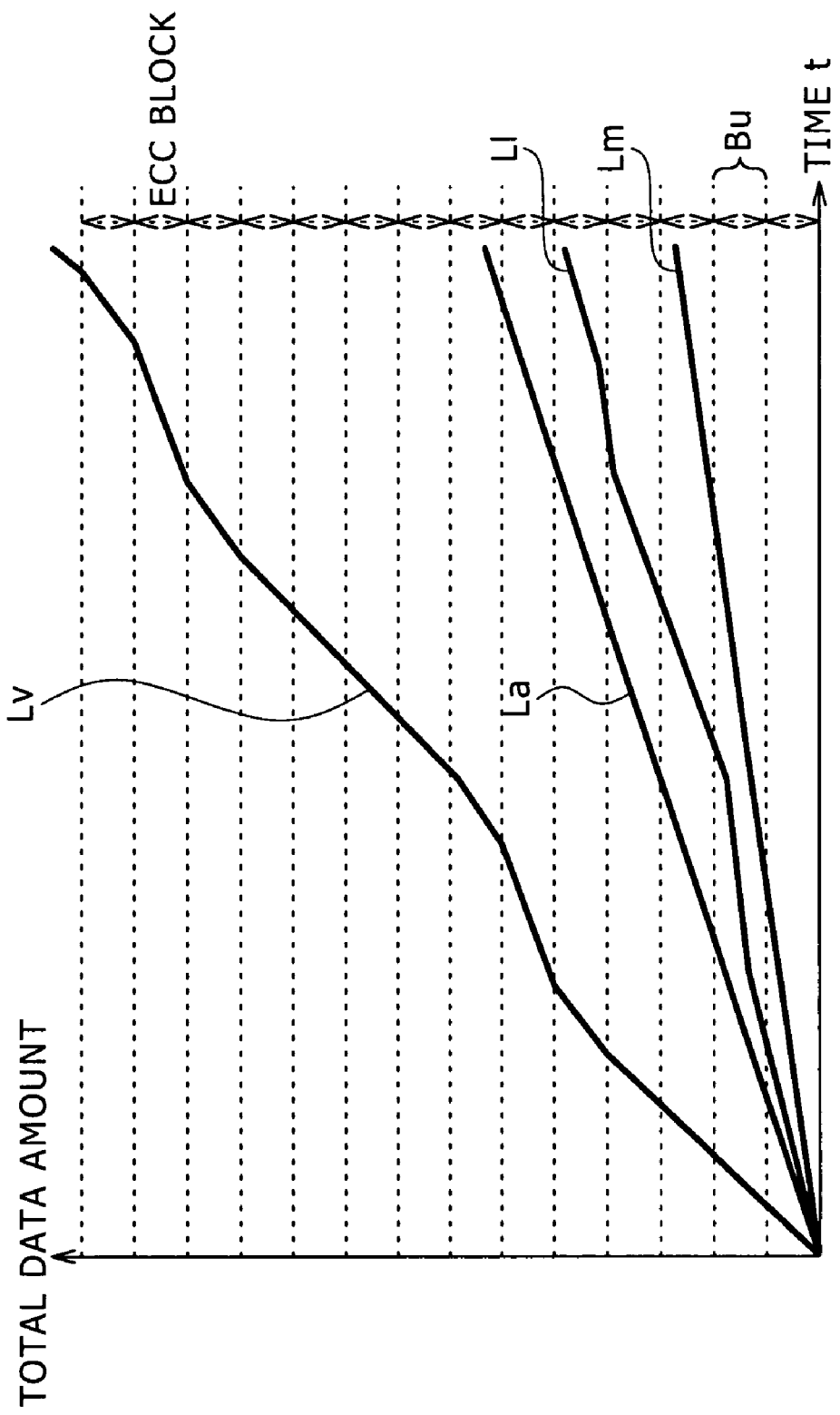
FIG. 41 shows the total data amount of data recorded in memory.

FIG. 41 shows the relationship between time (reproduction time) t and each of overall data amount (total data amount) La for audio files, total data amount Lv for video files, total data amount Ll for low resolution data, and total data amount Lm for metadata. On the right of FIG. 41 (also FIGS. 42 through 45), a small vertical bidirectional arrow (an arrow indicating an interval between horizontal dotted lines) represents data amount Bu of an ECC block.

As mentioned above, when the memory 117 stores audio files needed for the reproduction equivalent to reproduction time $T_{sa} \times N_a$, the memory controller 116 reads an audio file having the maximum data amount that is capable of reading from the memory 117 and is equivalent to an integral multiple of the ECC block. The memory controller 116 extracts this audio file as audio tree ring data. When the memory 117 stores video files needed for the reproduction equivalent to reproduction time $T_{sv} \times N_v$, the memory controller 116 reads a video file having the maximum data amount that is capable of reading from the memory 117 and is equivalent to an integral multiple of the ECC block. The memory controller 116 extracts this video file as video tree ring data. When the memory 117 stores low resolution data needed for the reproduction equivalent to reproduction time $T_{sl} \times N_l$, the memory controller 116 reads low resolution data having the maximum data amount that is capable of reading from the memory 117 and is equivalent to an integral multiple of the ECC block. The memory controller 116 extracts this low resolution data as low resolution tree ring data. When the memory 117 stores meta data needed for the reproduction equivalent to reproduction time $T_{sm} \times N_m$, the memory controller 116 reads meta data having the maximum data amount that is capable of reading from the memory 117 and is equivalent to an integral multiple of the ECC block. The memory controller 116 extracts this meta data as meta tree ring data.

Figure 42:
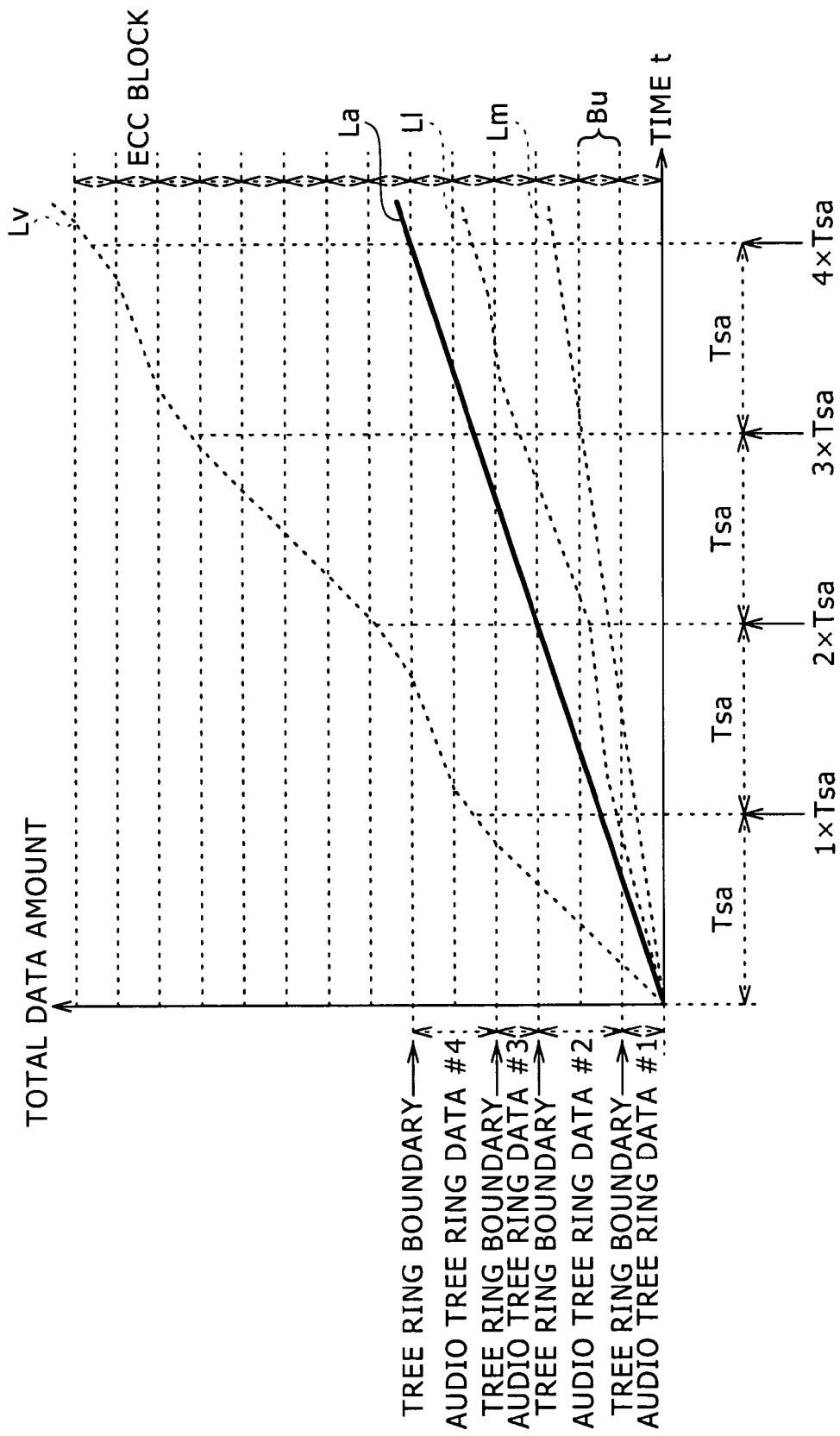
FIG. 42 shows the total data amount of data recorded in memory.

FIG. 41 shows a change in total data amount La of an audio file stored in the memory 117. In this case, as shown in FIG. 42, the memory controller 116 reads the audio file having the maximum data amount capable of reading from the memory 117 and equivalent to an integral multiple of the ECC block at the timing corresponding to $i \times T_{sa}$ (where i=1, 2, and so on) equivalent to an integral multiple of video tree ring size $T_{sa}$ along time t. The memory controller 116 extracts the read audio file as audio tree ring data.

According to the embodiment in FIG. 42, the audio file is extracted for one ECC block, two ECC blocks, one ECC block, and two ECC blocks as audio tree ring data #1, #2, #3, and #4 at timings $T_{sa}$, $2 \times T_{sa}$, $3 \times T_{sa}$, and $4 \times T_{sa}$, respectively, along time t.

After audio tree ring data #1, #2, #3, and #4 are extracted at timings $T_{sa}$, $2 \times T_{sa}$, $3 \times T_{sa}$, and $4 \times T_{sa}$ along time t, fractional data remaining in the memory 117 is included in the next tree ring.

Figure 43:
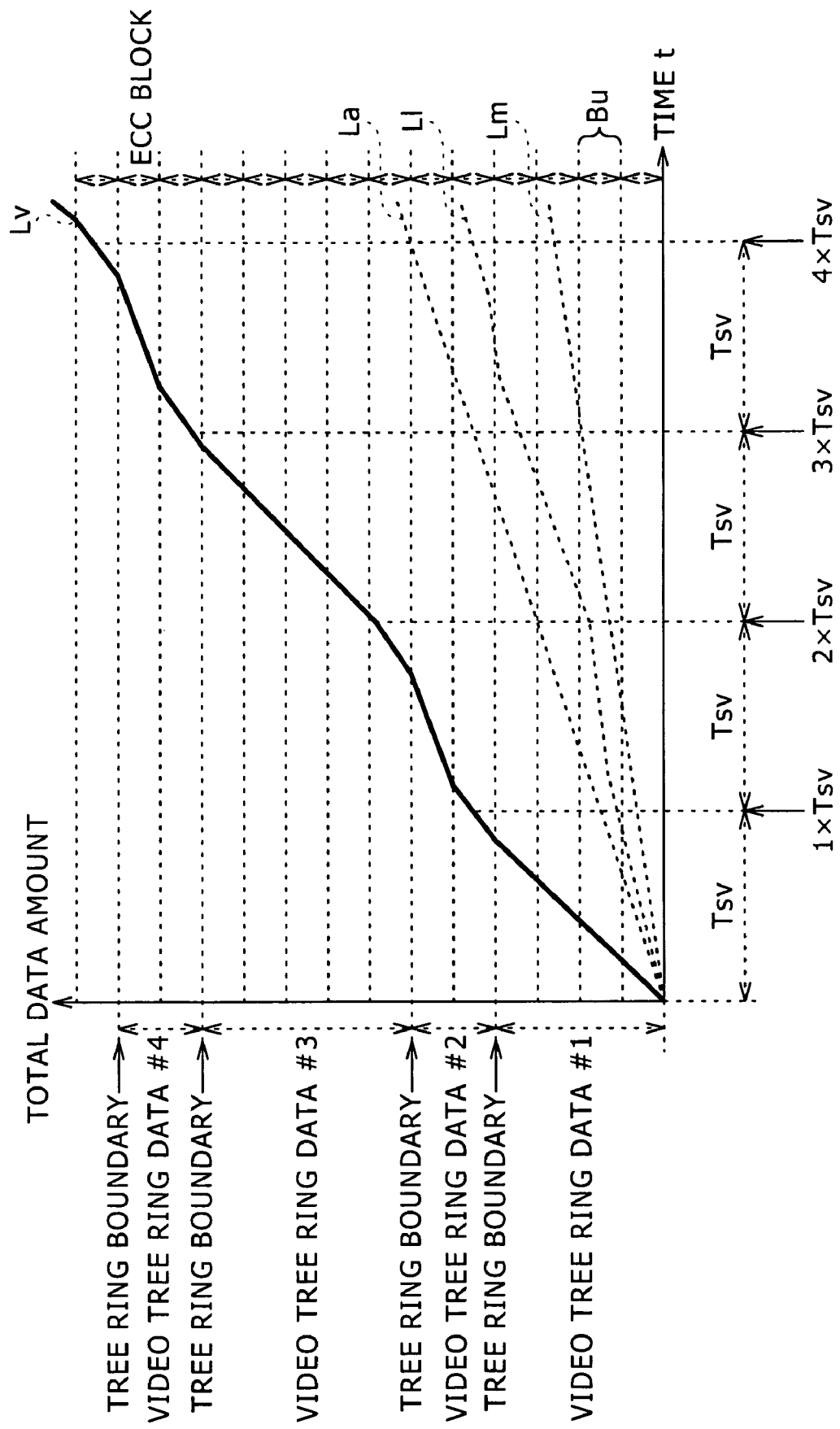
FIG. 43 shows the total data amount of data recorded in memory.

FIG. 41 shows a change in total data amount Lv of a video file stored in the memory 117. In this case, as shown in FIG. 43, the memory controller 116 reads the video file having the maximum data amount capable of reading from the memory 117 and equivalent to an integral multiple of the ECC block at the timing corresponding to $i \times T_{sv}$ equivalent to an integral multiple of video tree ring size $T_{sv}$ along time t. The memory controller 116 extracts the read video file as video tree ring data.

According to the embodiment in FIG. 43, the video file is extracted for four ECC blocks, two ECC blocks, five ECC blocks, and two ECC blocks as video tree ring data #1, #2, #3, and #4 at timings $T_{sv}$, $2 \times T_{sv}$, $3 \times T_{sv}$, and $4 \times T_{sv}$ respectively, along time t.

After video tree ring data #1, #2, #3, and #4 are extracted at timings $T_{sv}$, $2 \times T_{sv}$, $3 \times T_{sv}$, and $4 \times T_{sv}$ along time t, fractional data remaining in the memory 117 is included in the next tree ring.

Figure 44:
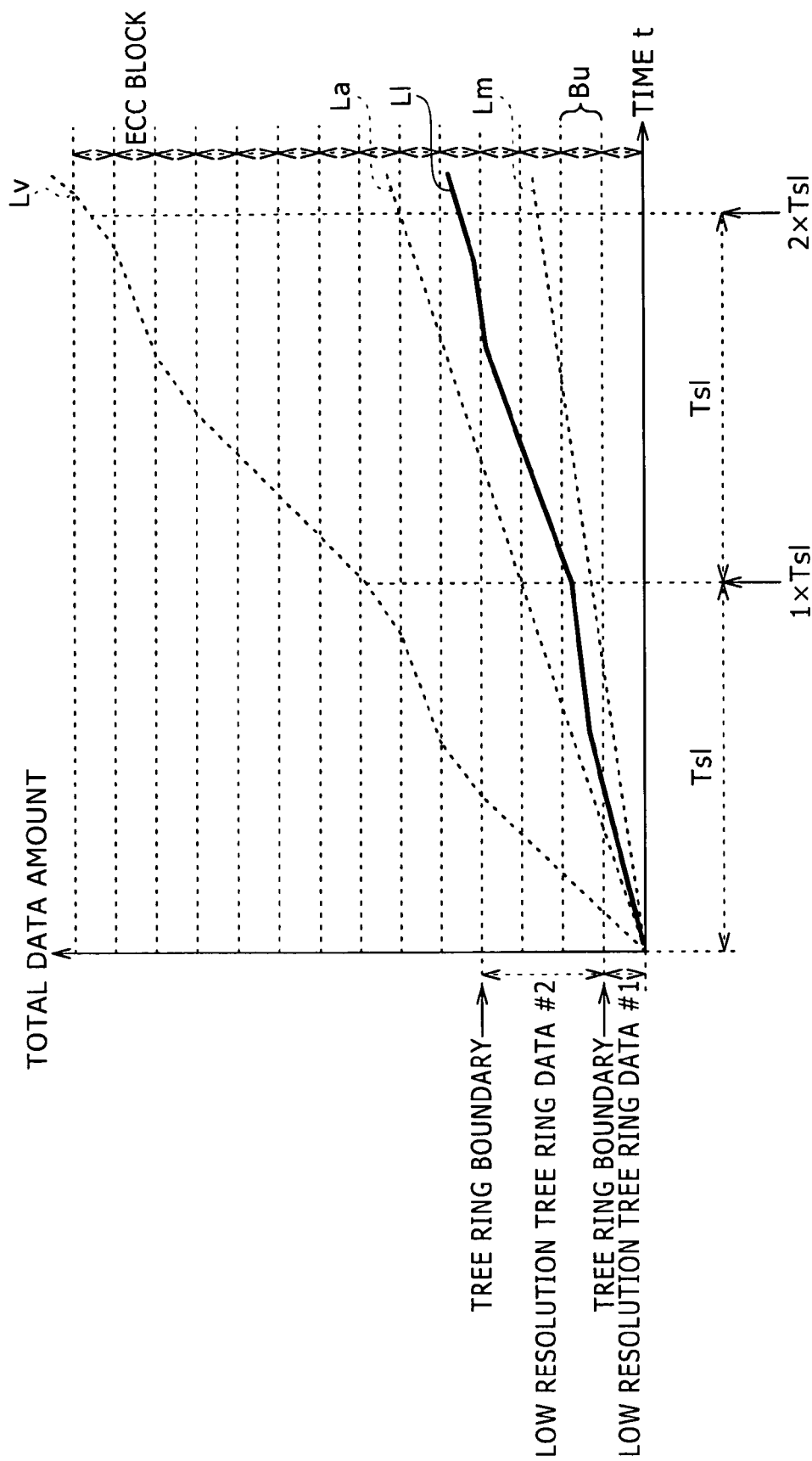
FIG. 44 shows the total data amount of data recorded in memory.

FIG. 41 shows a change in total data amount Ll of low resolution data stored in the memory 117. In this case, as shown in FIG. 44, the memory controller 116 reads the low resolution data having the maximum data amount capable of reading from the memory 117 and equivalent to an integral multiple of the ECC block at the timing corresponding to $i \times T_{sl}$ equivalent to an integral multiple of low resolution tree ring size $T_{sl}$ along time t. The memory controller 116 extracts the read low resolution data as low resolution tree ring data.

According to the embodiment in FIG. 44, the low resolution data is extracted for one ECC block and three ECC blocks as low resolution tree ring data #1 and #2 at timings $T_{sl}$ and $2 \times T_{sl}$, respectively, along time t.

After low resolution tree ring data #1 and #2 are extracted at timings $T_{sl}$ and $2 \times T_{sl}$ along time t, fractional data remaining in the memory 117 is included in the next tree ring.

Figure 45:
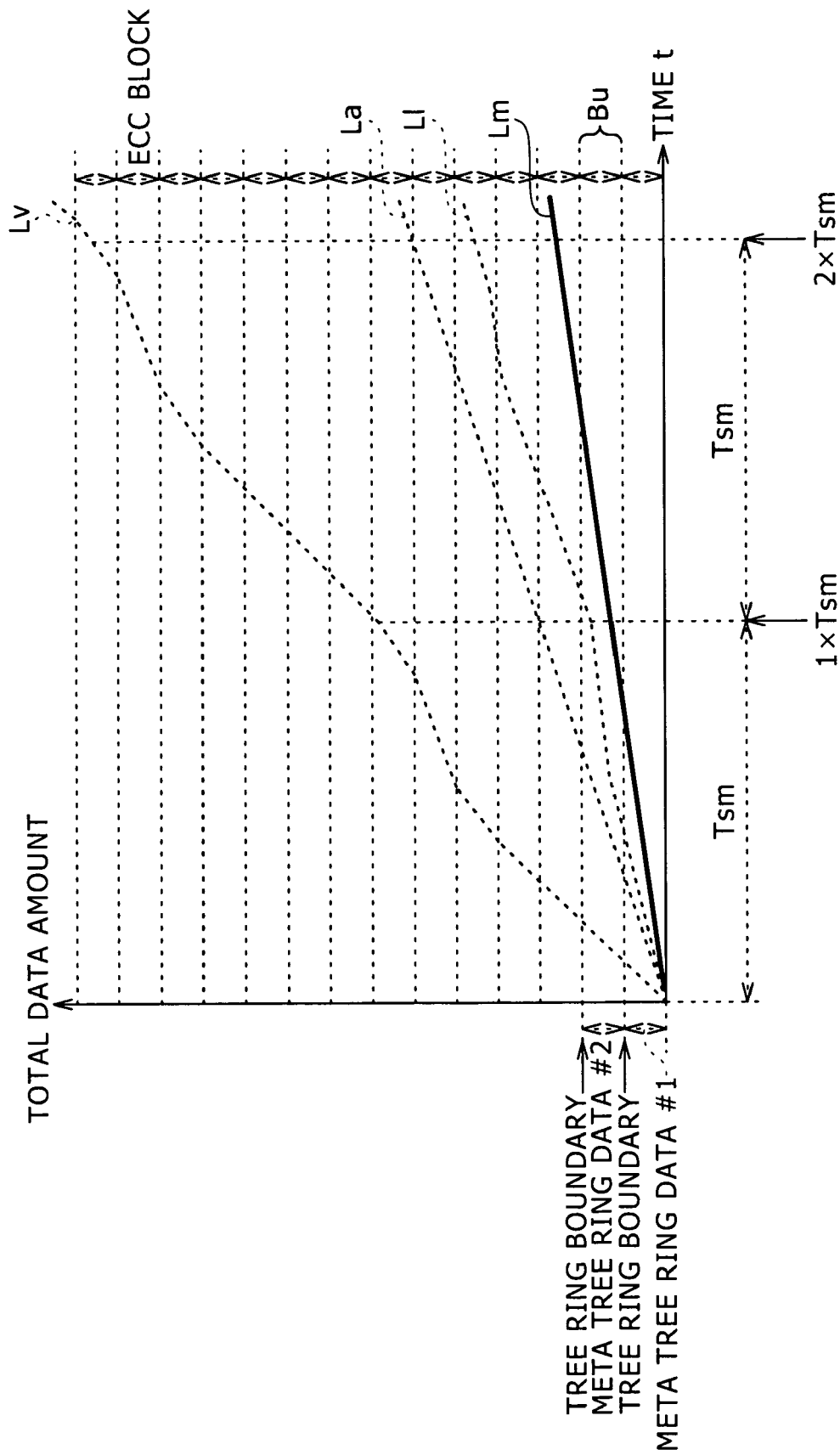
FIG. 45 shows the total data amount of data recorded in memory.

FIG. 41 shows a change in total data amount Lm of meta data stored in the memory 117. In this case, as shown in FIG. 45, the memory controller 116 reads the meta data having the maximum data amount capable of reading from the memory 117 and equivalent to an integral multiple of the ECC block at the timing corresponding to $i \times T_{sm}$ equivalent to an integral multiple of meta tree ring size $T_{sm}$ along time t. The memory controller 116 extracts the read meta data as meta tree ring data.

According to the embodiment in FIG. 45, the meta data is extracted for each one ECC block as meta tree ring data #1 and #2 at timings $T_{sm}$ and $2 \times T_{sm}$, respectively, along time t.

After meta tree ring data #1 and #2 are extracted at timings $T_{sm}$ and $2 \times T_{sm}$ along time t, fractional data remaining in the memory 117 is included in the next tree ring.

For example, let us suppose such relationship between audio tree ring size $T_{sa}$ in FIG. 42, video tree ring size $T_{sv}$ in FIG. 43, low resolution tree ring size $T_{sl}$ in FIG. 44, and meta tree ring size $T_{sm}$ in FIG. 45 that video tree ring size $T_{sv}$ equals audio tree ring size $T_{sa}$ and low resolution tree ring size $T_{sl}$ or meta tree ring size $T_{sm}$ equals the double of audio tree ring size $T_{sa}$ ($2 \times T_{sa} = 2 \times T_{sv} = T_{sl} = T_{sm}$), for example. In this case, the audio file recording task in FIG. 34, the video file recording task in FIG. 37, the low resolution data recording task in FIG. 39, and the metadata recording task in FIG. 40 cyclically record audio tree ring data #1 through #4 in FIG. 42, video tree ring data #1 through #4 in FIG. 43, low resolution tree ring data #1 and #2 in FIG. 44, and meta tree ring data #1 and #2 in FIG. 45 on the optical disk 7 as shown in FIG. 27.

That is, the audio tree ring data, the video tree ring data, the low resolution tree ring data, and the meta tree ring data for similar reproduction time slots are recorded at positions toward the beginning of the optical disk 7 according to the priority of the audio tree ring data, the video tree ring data, the low resolution tree ring data, and the meta tree ring data as mentioned above.

With respect to the audio tree ring data having the highest priority, for example, the video tree ring data with the same video tree ring size $T_{sv}$ as audio tree ring size $T_{sa}$ is recorded on the optical disk 7 at the same cycle as the audio tree ring data. When audio tree ring data is recorded for a given reproduction time slot, the audio tree ring data is followed by video tree ring data recorded for a reproduction time slot similar to that of the recorded audio tree ring data.

A low resolution tree ring has low resolution tree ring size $T_{sl}$ that is twice as large as audio tree ring size $T_{sa}$. The low resolution tree ring is recorded on the optical disk 7 at a cycle that is twice as large as that of audio tree ring data. That is, low resolution tree ring data for a given reproduction time slot corresponds to audio tree ring data having two reproduction time slots that halve the given reproduction time slot. The low resolution tree ring data is recorded after the audio tree ring data for the two reproduction time slots is recorded.

A meta tree ring has meta tree ring size $T_{sm}$ that is twice as large as audio tree ring size $T_{sa}$. The meta tree ring is recorded on the optical disk 7 at a cycle that is twice as large as that of audio tree ring data. That is, meta tree ring data for a given reproduction time slot corresponds to audio tree ring data having two reproduction time slots that halve the given reproduction time slot. The meta tree ring data is recorded after the audio tree ring data for the two reproduction time slots is recorded.

Figure 46:
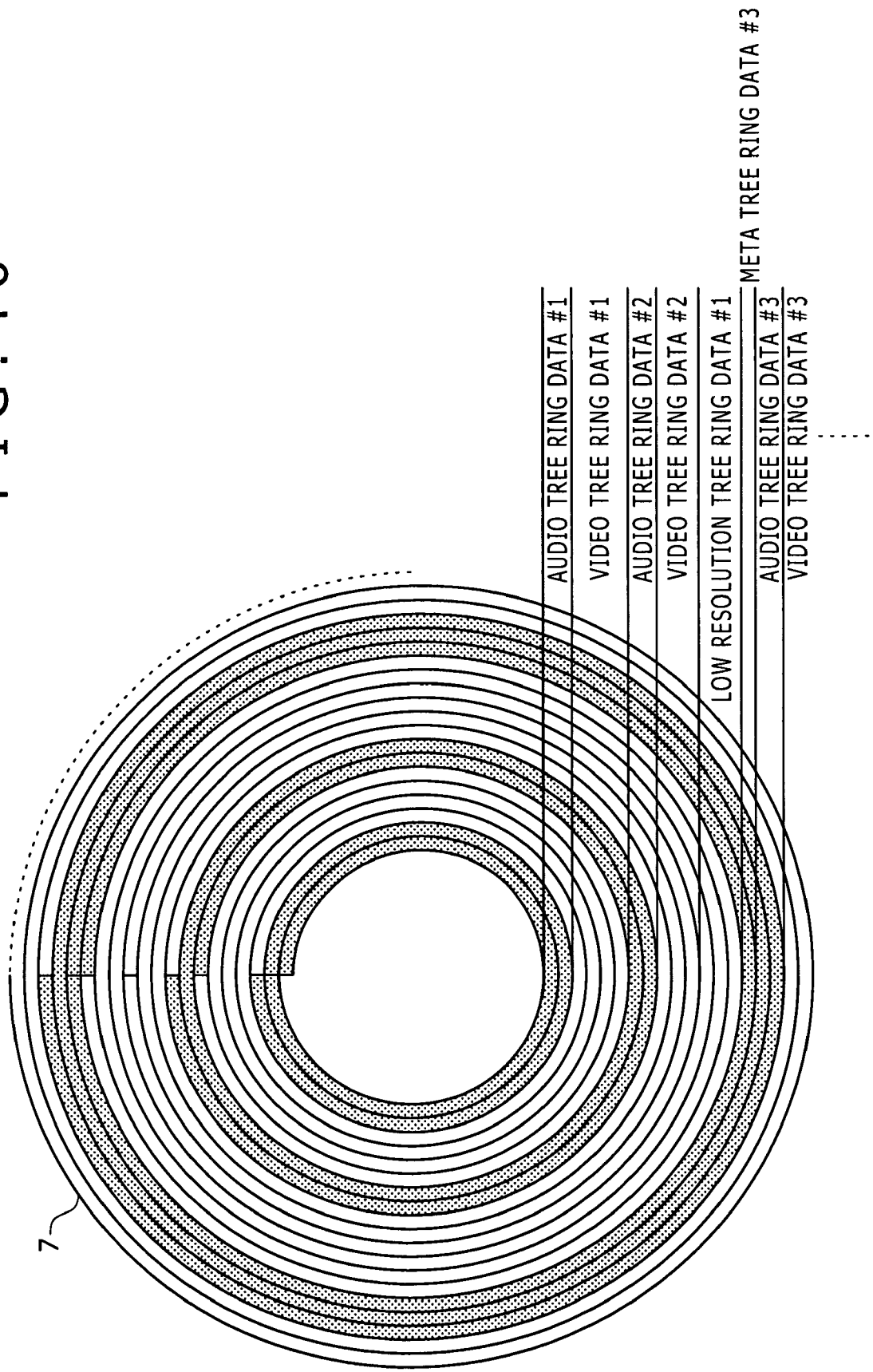
FIG. 46 shows states of recording data on an optical disk.

Consequently, as shown in FIG. 46, audio tree ring data #1 through #4 in FIG. 42, video tree ring data #1 through #4 in FIG. 43, low resolution tree ring data #1 and #2 in FIG. 44, and meta tree ring data #1 and #2 in FIG. 45 are recorded on the optical disk 7 from inside peripheries to outside peripheries thereof in the order of audio tree ring data #1, video tree ring data #1, audio tree ring data #2, video tree ring data #2, low resolution tree ring data #1, meta tree ring data #1, audio tree ring data #3, video tree ring data #3, audio tree ring data #4, video tree ring data #4, low resolution tree ring data #2, meta tree ring data #2, and so on.

According to the embodiment as shown in FIGS. 41 through 46, video tree ring size $T_{sv}$ is assumed to be equal to audio tree ring size $T_{sa}$. Low resolution tree ring size $T_{sl}$ or meta tree ring size $T_{sm}$ is assumed to be equal to the double of audio tree ring size $T_{sa}$. The present invention is not limited to the above-mentioned relationship between audio tree ring size $T_{sa}$, video tree ring size $T_{sv}$, low resolution tree ring size $T_{sl}$, and meta tree ring size $T_{sm}$. That is, audio tree ring size $T_{sa}$, video tree ring size $T_{sv}$, low resolution tree ring size $T_{sl}$, and meta tree ring size $T_{sm}$ all may be the same time or different times.

Further, audio tree ring size $T_{sa}$, video tree ring size $T_{sv}$, low resolution tree ring size $T_{sl}$, and meta tree ring size $T_{sm}$ can be configured in accordance with uses and purposes of the optical disk 7.

That is, low resolution tree ring size $T_{sl}$ and meta tree ring size $T_{sm}$ can be larger than audio tree ring size $T_{sa}$ and video tree ring size $T_{sv}$.

Let us consider that low resolution tree ring size $T_{sl}$ is larger than audio tree ring size $T_{sa}$ and video tree ring size $T_{sv}$ (e.g., low resolution tree ring size $T_{sl}$ is ten seconds while audio tree ring size $T_{sa}$ and video tree ring size $T_{sv}$ each are two seconds). In such case, for example, it is possible to improve shuttle reproduction rates using low resolution data and transfer rates of low resolution data to external apparatuses such as computers.

The low resolution data is characterized by a smaller data amount than mainline data and therefore is capable of fast reading from the optical disk 7. Further, the low resolution data causes small processing loads and can be used for variable speed reproduction such as the shuttle reproduction. Increasing low resolution tree ring size $T_{sl}$ can decrease the frequency of seeks that occur during reading of only low resolution data from the optical disk 7. This makes it possible to faster read only the low resolution data from the optical disk 7. It is possible to improve speeds of the shuttle reproduction using the low resolution data. When the low resolution data is transferred to a computer for processing, a transfer rate can be improved (to shorten the time required for the transfer).

Let us consider that meta tree ring size $T_s$ is larger than audio tree ring size $T_{sa}$ and video tree ring size $T_{sv}$ (e.g., meta tree ring size $T_{sm}$ is 20 seconds while audio tree ring size $T_{sa}$ and video tree ring size $T_{sv}$ each are two seconds). In such case, similarly to the case of increasing low resolution tree ring size $T_{sl}$, only metadata can be read from the optical disk 7 in a short period of time. For example, a time code included in the metadata can be used to fast retrieve a specific frame from a video file as mainline data.

Low resolution tree ring size $T_{sl}$ can be increased when there is a need for the shuttle reproduction or fast transfer of low resolution data to the outside. Meta tree ring size $T_s$ can be increased when there is a need for fast frame retrieval. In this manner, it is possible to provide the highly convenient optical disk 7 that satisfies these needs.

As mentioned above, increasing low resolution tree ring size $T_{sl}$ or meta tree ring size $T_{sm}$ can shorten the time to read (or even to write) a specific data series of only low resolution data or metadata.

Accordingly, increasing audio tree ring size $T_{sa}$ or video tree ring size $T_{sv}$ can shorten the time to read (or event write) only audio files or video files as mainline data. As a result, it is possible to accelerate the process of so-called AV (Audio Visual) split editing that edits only audio files or video files.

When the video and the audio are reproduced, a wait is needed until there become available video files corresponding to the reproduction times and audio files associated with the video files. When audio tree ring size $T_{sa}$ or video tree ring size $T_{sv}$ is increased, it is necessary to read an audio file having the increased audio tree ring size $T_{sa}$ or a video file having the increased video tree ring size $T_{sv}$ and then read the other. The time lapse increases until the video file at a given reproduction time and the audio file associated with the video file become available. This also increases a delay between the time the reproduction is instructed and the time the reproduction actually starts. Let us consider a case of simultaneously reproducing the video file at a given reproduction time and the audio file associated with the video file. The audio file having the increased audio tree ring size $T_{sa}$ or the video file having the increased video tree ring size $T_{sv}$ is read first and needs to be stored in the memory 117 at least until the other starts being read. In consideration for the foregoing, increasing audio tree ring size $T_{sa}$ or video tree ring size $T_{sv}$ also increases a delay until the start of reproduction and necessitates a large capacity for the memory 117.

Accordingly, it is desirable to determine audio tree ring size $T_{sa}$ and video tree ring size $T_{sv}$ in consideration for a delay until the start of reproduction and allowable values for the capacity of the memory 117.

The low resolution data or the metadata has a data amount sufficiently smaller than that of the audio file or the video file. Increasing low resolution tree ring size $T_{sl}$ or meta tree ring size $T_{sm}$ causes a permissible increase in the capacity needed for the memory 117 compared to the case of increasing audio tree ring size $T_{sa}$ or video tree ring size $T_{sv}$.

Figure 47:
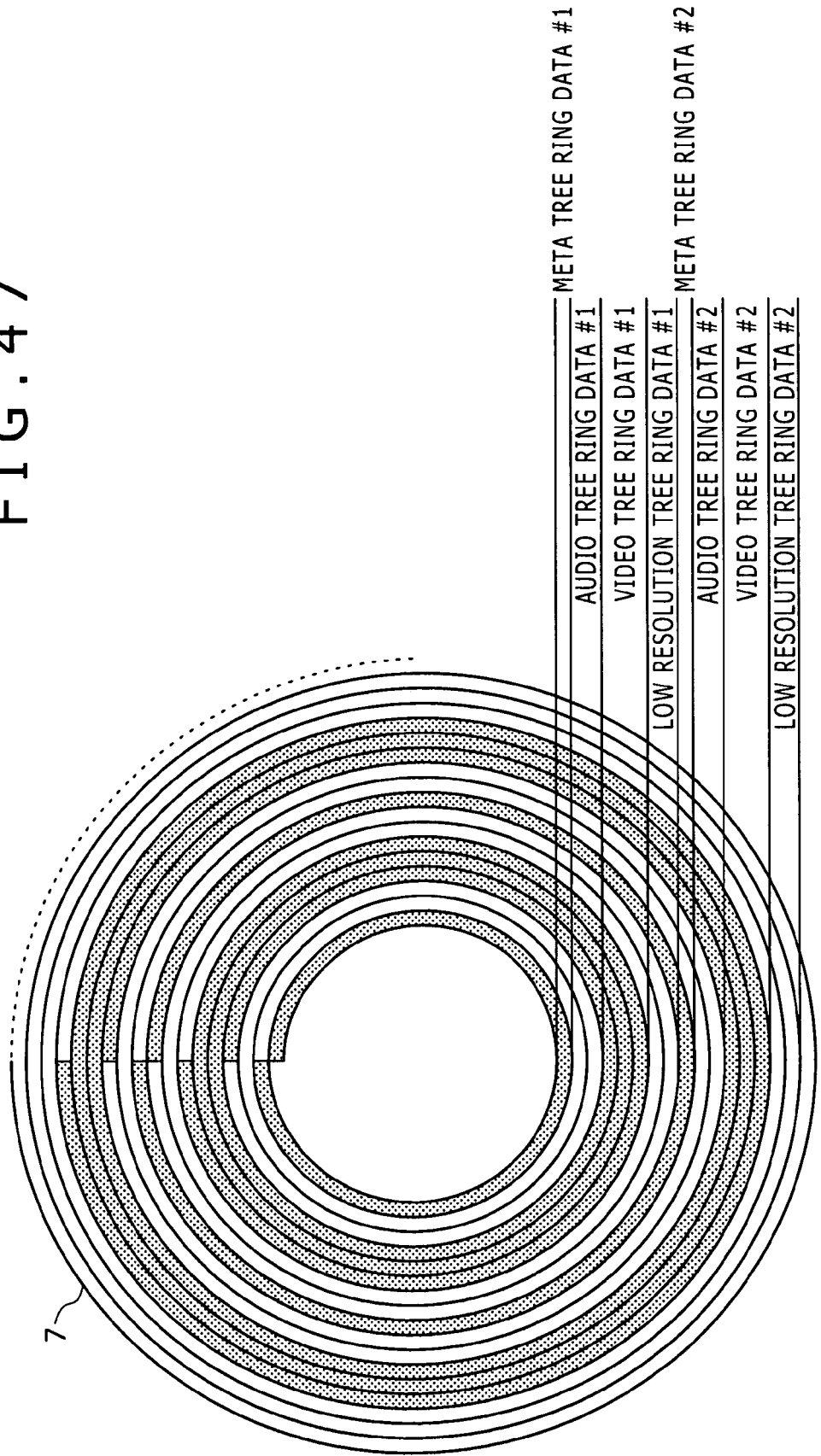
FIG. 47 shows states of recording data on an optical disk.

The priority of recording on the optical disk 7 may be meta tree ring data, audio tree ring data, video tree ring data, and low resolution tree ring data in order. In this case, as shown in FIG. 47, for example, meta tree ring data #1 and #2, audio tree ring data #1 and #2, video tree ring data #1 and #4, and low resolution tree ring data #1 and #2 are recorded on the optical disk 7 from inside peripheries to outside peripheries thereof in the order of meta tree ring data #1, audio tree ring data #1, video tree ring data #1, low resolution tree ring data #1, meta tree ring data #2, audio tree ring data #2, video tree ring data #2, low resolution tree ring data #2, and so on.

Figure 48:
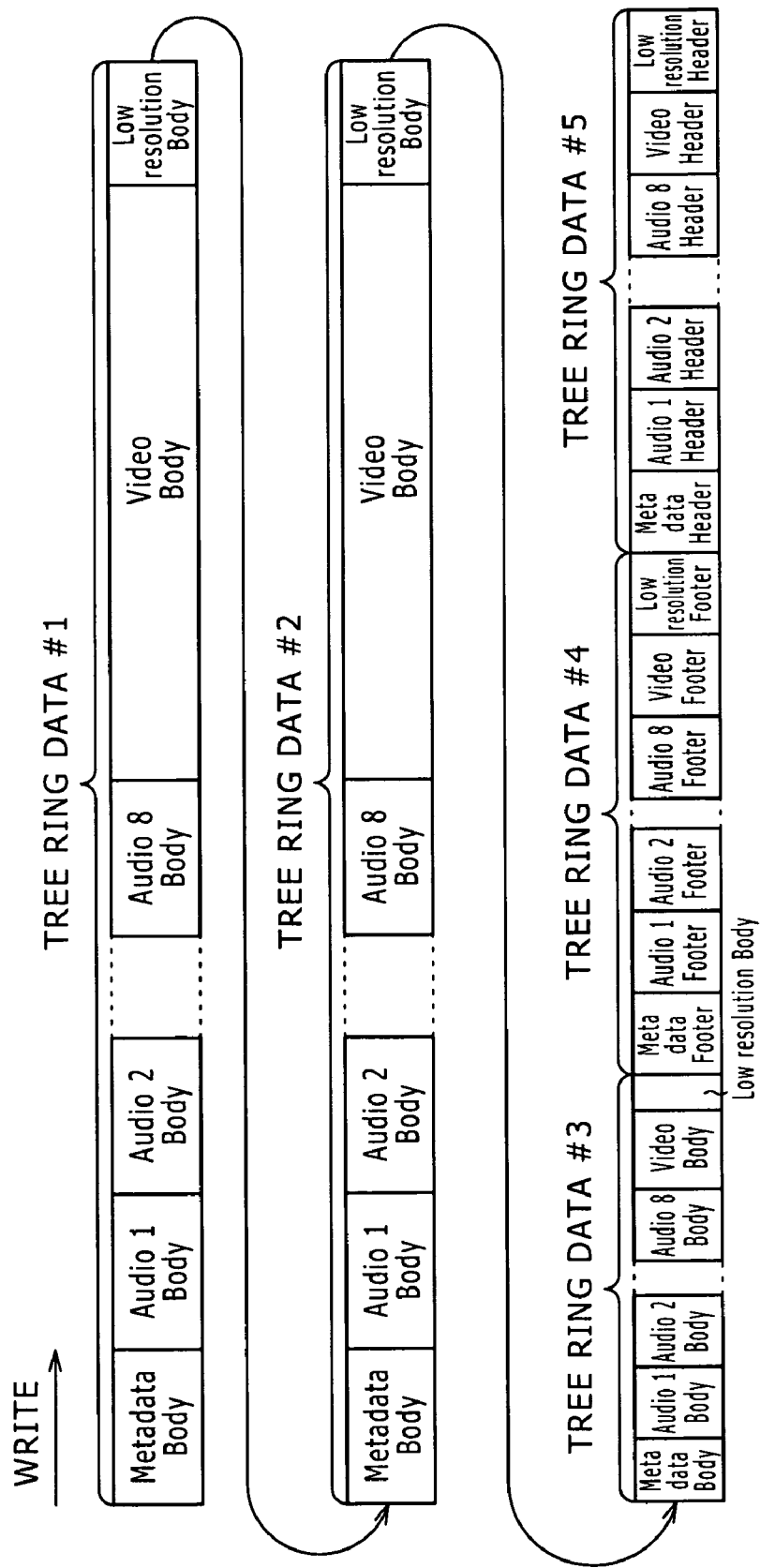
FIG. 48 diagrams data recorded on an optical disk.

FIG. 48 shows how the disk drive apparatus 11 reads or writes data on the optical disk 7. FIG. 48 illustrates reading or writing of four data series of a metadata, an audio file, a video file, and low resolution data on the optical disk 7.

FIG. 48 represents meta tree ring data #1, audio tree ring data #1, video tree ring data #1, and low resolution tree ring data #1 as tree ring data #1; meta tree ring data #2, audio tree ring data #2, video tree ring data #2, and low resolution tree ring data #2 as tree ring data #2; and Nth data, i.e., meta tree ring data #N, audio tree ring data #N, video tree ring data #N, and low resolution tree ring data #N as tree ring data #N.

When data is written to the optical disk 7, let us suppose that the optical disk has a sufficient contiguous free area having no flaw (defect). Audio tree ring data, video tree ring data, low resolution tree ring data, and meta tree ring data are extracted from data series of the metadata, the audio file, the video file, and the low resolution data, respectively, and are written to the free area on the optical disk 7 like a single stroke as shown in FIG. 48. The meta tree ring data, the audio tree ring data, the video tree ring data, and the low resolution tree ring data each have the data amount equivalent to an integral multiple of the ECC block of the optical disk 7. These data are recorded so that the data boundary matches the ECC block boundary.

As described with reference to the flowchart for the metadata file generation process in FIG. 13 and the flowchart for the video file generation process in FIG. 15, the metadata file and the video file are supplied in the order of the body, the footer, and the header to the disk drive apparatus 11.

As described with reference to the flowchart for the audio file generation process in FIG. 16, the audio file is supplied to the disk drive apparatus 11 in the order of the value and the KLV-structured filler as the body's audio items, then the footer, and then the header, the audio item key, and the length.

As described with reference to the flowchart for the low resolution file synthesis in FIG. 32, the low resolution file is supplied to the memory controller 116 in the order of the body, the footer, and the header.

Consequently, audio tree ring data, video tree ring data, low resolution tree ring data, and meta tree ring data are extracted from the data series of the metadata, the audio file, the video file, and the low resolution data and are written to a free area on the optical disk 7 in the order of the body, the footer, and the header as shown in FIG. 48.

Figure 49:
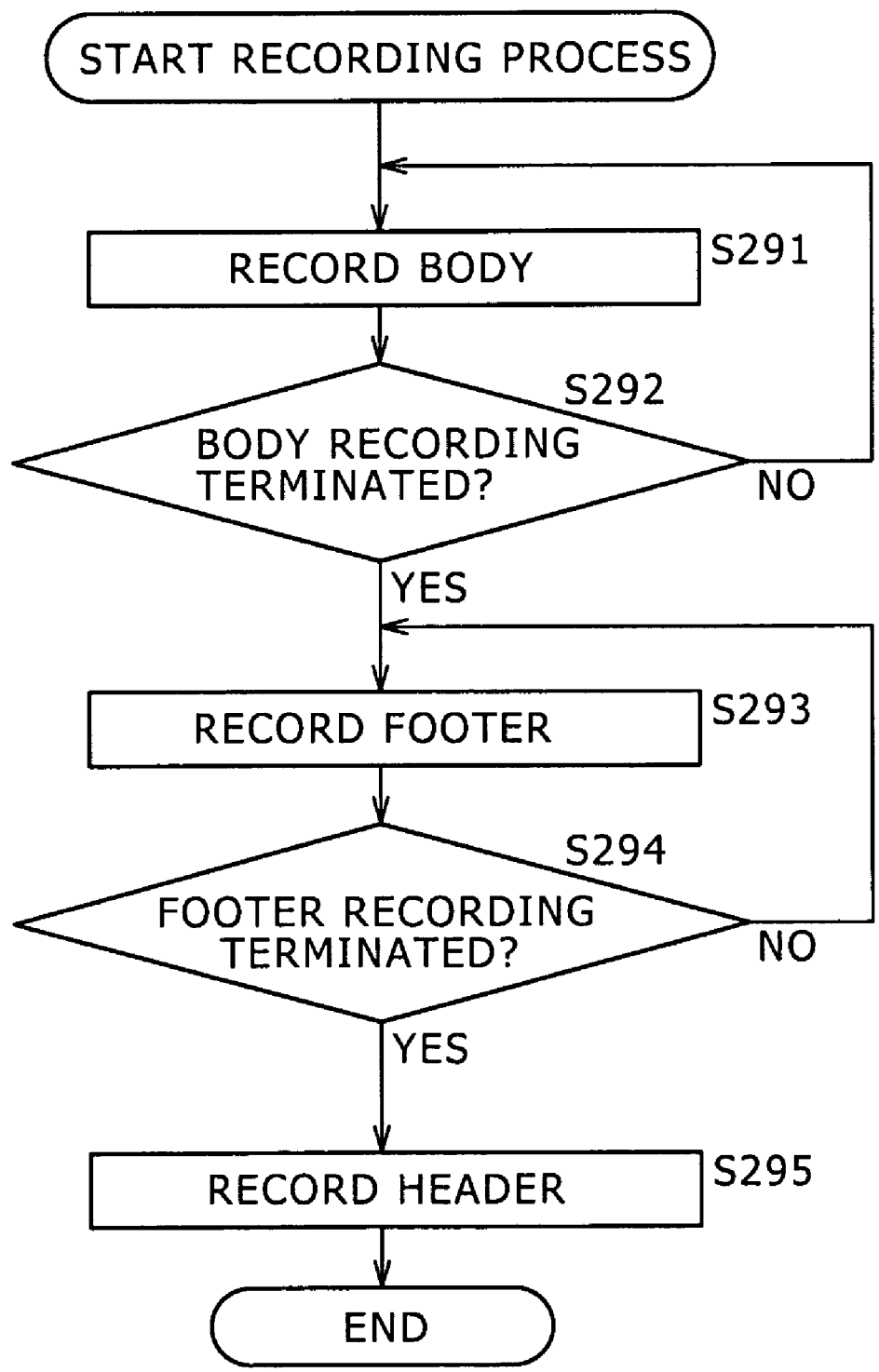
FIG. 49 is a flowchart showing a recording process.

The following describes a recording process with reference to a flowchart in FIG. 49. This recording process summarizes the processes described with reference to the flowcharts for the metadata file generation process in FIG. 13, the video file generation process in FIG. 15, the audio file generation process in FIG. 16, the low resolution file synthesis process in FIG. 32, and the recording process in FIG. 33.

At Step S291, the control portion 119 of the disk drive apparatus 11 records bodies of the metadata file, the video file, the audio file, and the low resolution file on the optical disk 7. The process proceeds to Step S292. At Step S292, the control portion 119 determines whether or not the bodies of the metadata file, the video file, the audio file, and the low resolution file have been recorded completely. When it is determined that the body recording is not completed, the process returns to Step S291. The body recording process is repeated.

When it is determined at Step S292 that the body recording is completed, the process proceeds to Step S293. The control portion 119 records footers of the metadata file, the video file, the audio file, and the low resolution file on the optical disk 7. The process proceeds to Step S294. At Step S294, the control portion 119 determines whether or not the footers of the metadata file, the video file, the audio file, and the low resolution file have been recorded completely. When it is determined that the footer recording is not completed, the process returns to Step S293. The footer recording process is repeated.

When it is determined at Step S294 that the footer recording is completed, the process proceeds to Step S295. The control portion 119 records headers of the metadata file, the video file, the audio file, and the low resolution file on the optical disk 7. The recording process then terminates.

As mentioned above, the header is recorded after the body and the footer. a single process can be used to record the header containing data such as the audio data reproduction time or the time code (TC) that is determined by settlement of the body.

It is possible to reliably record the header following the body and the footer, i.e., at positions close to the body and the footer on the optical disk 7.

When a file is read from the optical disk 7, the header, the body, and the footer are sequentially sought. The header, the body, and the footer are sequentially read.

According to the embodiment, the memory controller 116 extracts the audio tree ring data by reading an audio file at every time corresponding to an integral multiple of audio tree ring size $T_{sa}$ so that the audio file's data amount is an integral multiple of the read or write unit such as an ECC block and is equivalent to a maximum data amount capable of being read from the memory 117. That is, when the memory 117 stores an audio file with the data amount that is greater than N ECC blocks and is smaller than N+1 ECC blocks at the time corresponding to an integral multiple of audio tree ring size $T_{sa}$, the memory controller 116 extracts an audio file with the data amount of N ECC blocks as audio tree ring data. In addition, for example, after the time reaches an integral multiple of audio tree ring size $T_{sa}$, it is possible to extract audio tree ring data by waiting until the memory stores an audio file with the data amount greater than or equal to N+1 ECC blocks, and then reading the audio file with the data amount equivalent to N+1 ECC blocks. The same applies to extraction of the video tree ring data, the low resolution tree ring data, and the meta tree ring data. That is, the data amount of tree ring data just needs to be equivalent to an integral multiple of the unit of reading or writing to the optical disk 7 and approximate to the data amount needed for the reproduction equivalent to the reproduction time specified as the audio tree ring size and the like.

All the constituent elements of metadata can be included in the meta tree ring data. Further, some of the constituent elements can be included in the meta tree ring data and the other constituent elements can be recorded independently of the meta tree ring data. That is, the metadata constituent elements are grouped into, for example, constituent elements such as the time code usable for the retrieval of video file frames and the other constituent elements. The constituent elements usable for the retrieval can be collectively recorded on inside peripheries of the optical disk 7, for example. The other constituent elements can be included in the meta tree ring data and cyclically recorded on the optical disk 7. In this case, since the constituent elements usable for the retrieval are collectively recorded on the optical disk 7, the time needed for the retrieval can be shortened.

All constituent elements of the metadata may be collectively recorded on inside peripheries of the optical disk 7. When all constituent elements of the metadata are collectively recorded on inside peripheries of the optical disk 7, for example, it is necessary to suspend the recording of data series other than the metadata until all constituent elements of the metadata are completely recorded. Alternatively, all constituent elements of the metadata need to be stored until data series other than the metadata are completely recorded. By contrast, it may be preferable to collectively record only metadata's constituent elements usable for the retrieval. In this case, it is possible to shorten the time to wait until recording of the data series other than the metadata compared to the case of collectively recording all the constituent elements of the metadata on the optical disk 7. Further, it is possible to decrease the data amount of metadata that needs to be stored until the data series other than the metadata are completely recorded.

The present invention is applicable to disk-shaped recording media other than optical disks.

While there have been described the cases of arranging video files and audio files on spiral tracks, the files can be alternately arranged on concentrical tracks. In this case, tracks continue from an inner one to an outer one.

Figure 50:
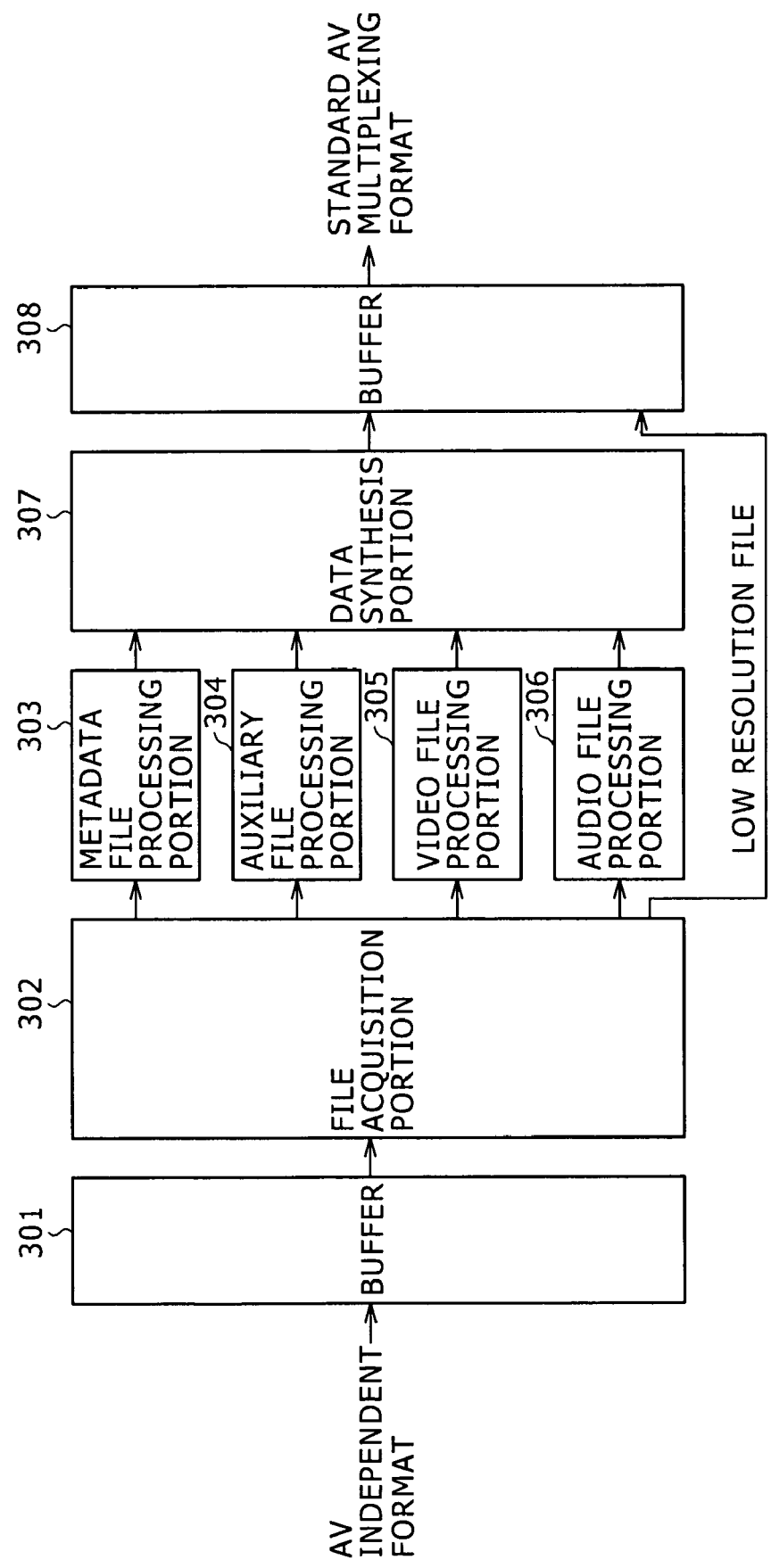
FIG. 50 is a block diagram exemplifying the configuration of an independent/standard format conversion portion.

FIG. 50 exemplifies the configuration of the independent/standard format conversion portion 22 in FIG. 7.

A buffer 301 temporarily stores AV independent format files (master file, file-based metadata file, frame-based metadata file, auxiliary file, video file, audio files for eight channels, and low resolution data file) supplied from the disk drive apparatus 11 (FIG. 1).

A file acquisition portion 302 references the master file stored in the buffer 301 to identify names of the file-based metadata file, the frame-based metadata file, the auxiliary file, the video file, the audio files for eight channels, and the low resolution file. Based on the file names, the file acquisition portion 302 obtains the file-based metadata file, the frame-based metadata file, the auxiliary file, the video file, the audio files for eight channels, and the low resolution file via the buffer 301 by allowing the disk drive apparatus 11 to read these files. Further, the file acquisition portion 302 supplies the obtained files to the corresponding file processing portions, i.e., the file-based metadata file and the frame-based metadata file to a metadata file processing portion 303; the auxiliary file to an auxiliary file processing portion 304; the video file to a video file process portion 305; and the audio files for eight channels to an audio file process portion 306. The file acquisition portion 302 supplies the low resolution file to a buffer 309.

The metadata file processing portion 303 extracts file-based metadata from the file-based metadata file supplied from the file acquisition portion 302. The metadata file processing portion 303 extracts a system item containing frame-based metadata from the frame-based metadata file. The metadata file processing portion 303 supplies the file-based metadata and the system item to the data synthesis portion 307.

The auxiliary file processing portion 304 extracts an auxiliary item from the auxiliary file supplied from the file acquisition portion 302 and supplies the auxiliary item to the data synthesis portion 307.

The video file process portion 305 extracts a picture item from the video file supplied from the file acquisition portion 302 and supplies the picture item to the data synthesis portion 307.

The audio file process portion 105 extracts channel-based audio data from the audio files for eight channels supplied from the file acquisition portion 302. Further, the audio file process portion 105 multiplexes and arranges the channel-based audio data to configure a sound item and supplies it to the data synthesis portion 307.

The data synthesis portion 307 configures a standard AV multiplexing format file using the file-based metadata and the system item supplied from the metadata file processing portion 303, the auxiliary item supplied from the audio file processing portion 304, the picture item supplied from the video file process portion 305, and the sound item supplied from the audio file process portion 306 and supplies the standard AV multiplexing format file to a buffer 308.

The buffer 308 temporarily stores the standard AV multiplexing format file supplied from the data synthesis portion 307 or the low resolution file supplied from the file acquisition portion 302 and supplies the file to the communication I/F 13 (FIG. 1).

Figure 51:
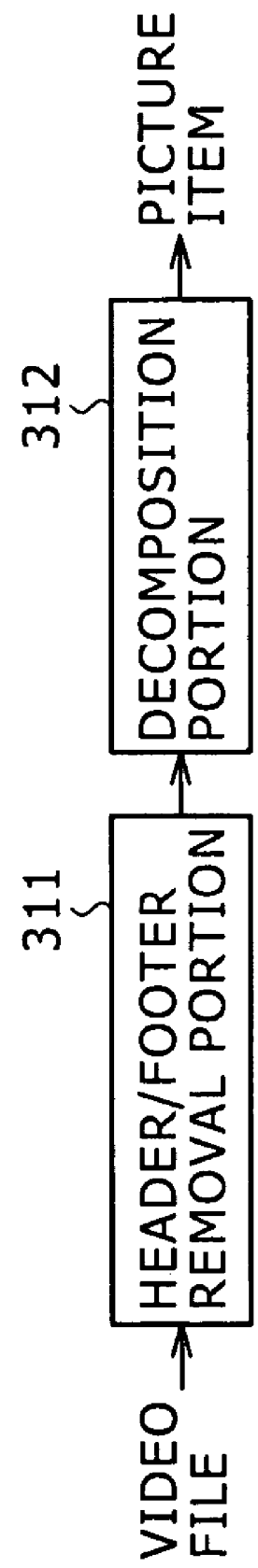
FIG. 51 is a block diagram showing the configuration of a video file process portion.

FIG. 51 exemplifies the configuration of the video file process portion 305 in FIG. 50.

The video file supplied from the file acquisition portion 302 is supplied to a header/footer removal portion 311. The header/footer removal portion 311 removes the header and the footer from the supplied video file and supplies the remaining body to a decomposition portion 312. The decomposition portion 312 separates a picture item sequence contained in the body supplied from the header/footer removal portion 311. The decomposition portion 312 extracts units of multiplexing with the other items (system item, sound item, and auxiliary item), i.e., individual picture items containing frame-based video data. The decomposition portion 312 supplies the picture items to the data synthesis portion 307 (FIG. 50).

Figure 52:
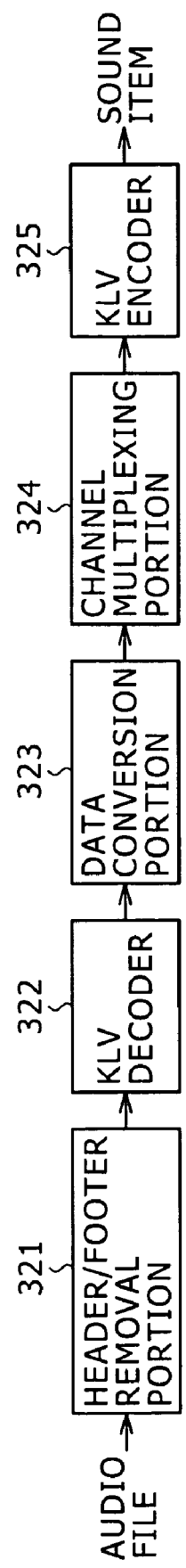
FIG. 52 is a block diagram showing the configuration of an audio file process portion.

FIG. 52 exemplifies the configuration of the audio file process portion 306 in FIG. 50.

The audio files for eight channels supplied from the file acquisition portion 302 are supplied to a header/footer removal portion 321. The header/footer removal portion 321 removes the header and the footer from each of the supplied audio files for eight channels and supplies the resultant remaining body for each channel to a KLV decoder 322.

The KLV decoder 322 decomposes the KLV structure of each channel's body supplied from the header/footer removal portion 321 to obtain WAVE format audio data for each channel. The KLV decoder 322 supplies the WAVE format audio data to a data conversion portion 323.

The data conversion portion 323 applies a conversion process to the audio data supplied from the KLV decoder 322. This conversion process is reverse to that of the data conversion portion 63 in FIG. 10. That is, the data conversion portion 323 converts channel-based WAVE format audio data supplied from the KLV decoder 322 into channel-based AES3 format audio data and supplies the audio data to a channel multiplexing portion 324.

The channel multiplexing portion 324 multiplexes channel-based audio data supplied from the data conversion portion 124 in units of samples. The channel multiplexing portion 324 supplies the resulting multiplexed audio data to a KLV encoder 325.

The KLV encoder 325 divides the multiplexed audio data supplied from the channel multiplexing portion 324 into units corresponding to frames of the video data. The KLV encoder 325 KLV-codes the multiplexed audio data corresponding to each frame according to the KLV structure. The KLV encoder 325 provides the KLV structure of the multiplexed audio data corresponding to each frame with a filler KLV structure to complement an insufficient fixed length of the sound item. In this manner, the KLV encoder 325 configures a sound item and supplies it to the data synthesis portion 307 (FIG. 50).

Figure 53:
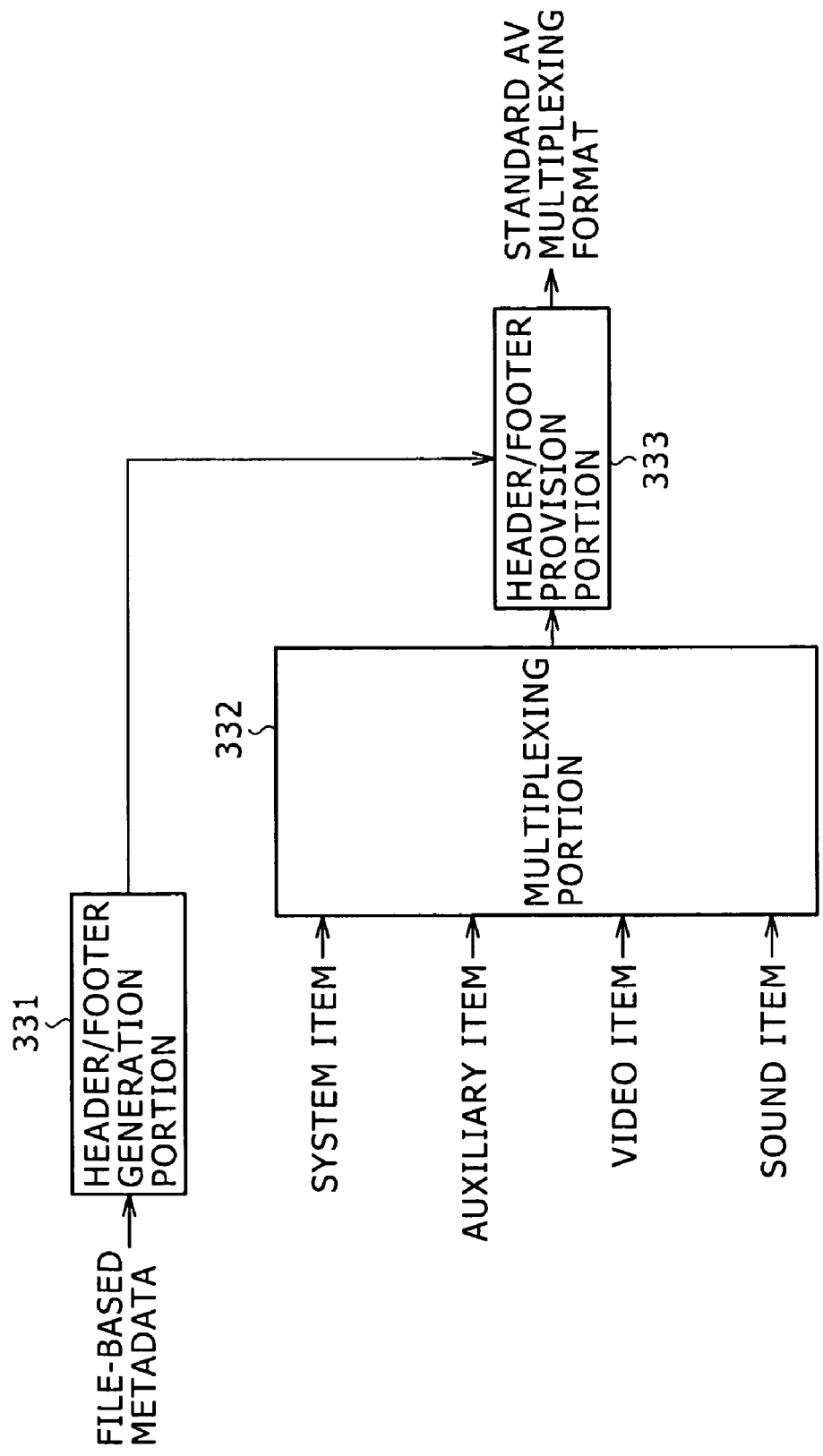
FIG. 53 is a block diagram showing the configuration of a data synthesis portion.

FIG. 53 exemplifies the configuration of the data synthesis portion 307 in FIG. 50.

A header/footer generation portion 331 is supplied with file-based metadata output from the metadata file processing portion 303. The header/footer generation portion 331 generates a header and a footer for a standard AV multiplexing format file. Further, the header/footer generation portion 331 places the file-based metadata from the metadata file processing portion 303 in the header's header metadata. The header/footer generation portion 331 supplies the header and the footer to a header/footer provision portion 333.

A multiplexing portion 332 is supplied with the system item output from the metadata file processing portion 303, the auxiliary item output from the auxiliary file processing portion 304, the picture item output from the video file process portion 305, and the sound item output from the audio file process portion 306. The multiplexing portion 332 sequentially multiplexes the system item, the picture item, the sound item, and the auxiliary item in this order as supplied to configure an edit unit sequence. The multiplexing portion 332 supplies the edit unit sequence as a body to the header/footer provision portion 333.

The header/footer provision portion 333 provides the body supplied from the multiplexing portion 332 with the header and the footer supplied from header/footer generation portion 331. In this manner, the header/footer provision portion 333 configures and outputs a standard AV multiplexing format file.

The independent/standard format conversion portion 22 in FIG. 50 performs the metadata file process for processing metadata files, the audio file process for processing auxiliary files, the video file process for processing video files, and the audio file process for processing audio files and uses the results of these processes to perform a synthesis process that synthesizes (generates) a standard AV multiplexing format file.

Referring now to flowcharts in FIGS. 54 through 58, the following describes the metadata file process, the auxiliary file process, the video file process, the audio file process, and the synthesis process performed by the independent/standard format conversion portion 22.

Figure 54:
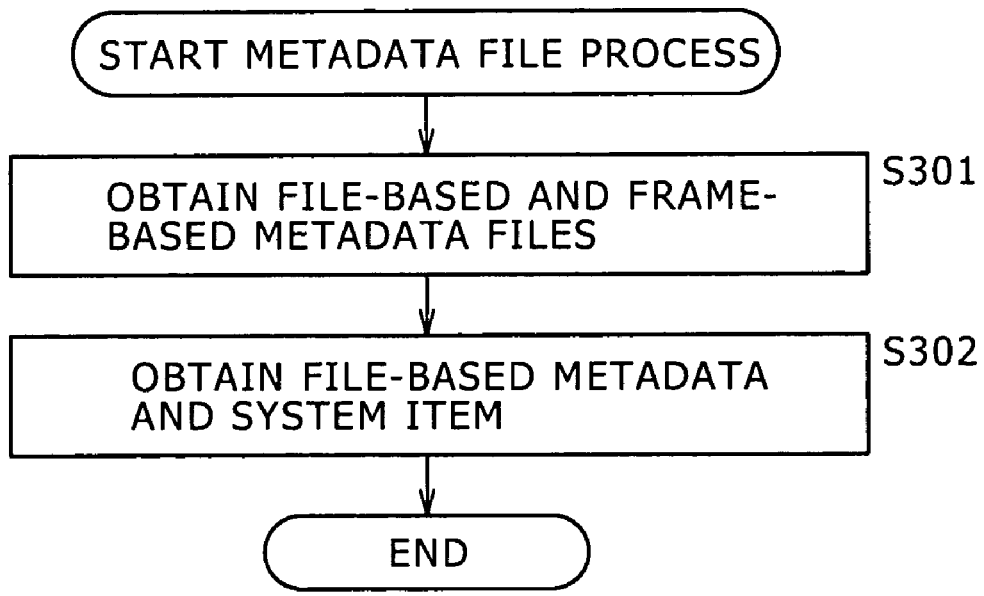
FIG. 54 is a flowchart showing a metadata file process.

First, with reference to the flowchart in FIG. 54, the following describes the metadata file process.

The metadata file process starts, for example, when the disk drive apparatus 11 reads the master file from the optical disk 7 and stores the master file in the buffer 301.

At Step S301, the file acquisition portion 302 references the master file stored in the buffer 301 to identify the file names of file-based and frame-based metadata files. Further, at Step S301, the file acquisition portion 302 obtains the file-based and frame-based metadata files based on the file names via the buffer 301 by allowing the disk drive apparatus 11 to read those files from the optical disk 7. The file acquisition portion 302 supplies the file-based and frame-based metadata files to the metadata file processing portion 303. At Step S302, the metadata file processing portion 303 extracts file-based metadata from the file-based metadata file supplied from the file acquisition portion 302. In addition, the metadata file processing portion 303 extracts the system item containing the frame-based metadata from the frame-based metadata file. The metadata file processing portion 303 supplies the file-based metadata and the system item to the data synthesis portion 307 to terminate the metadata file process.

Figure 55:
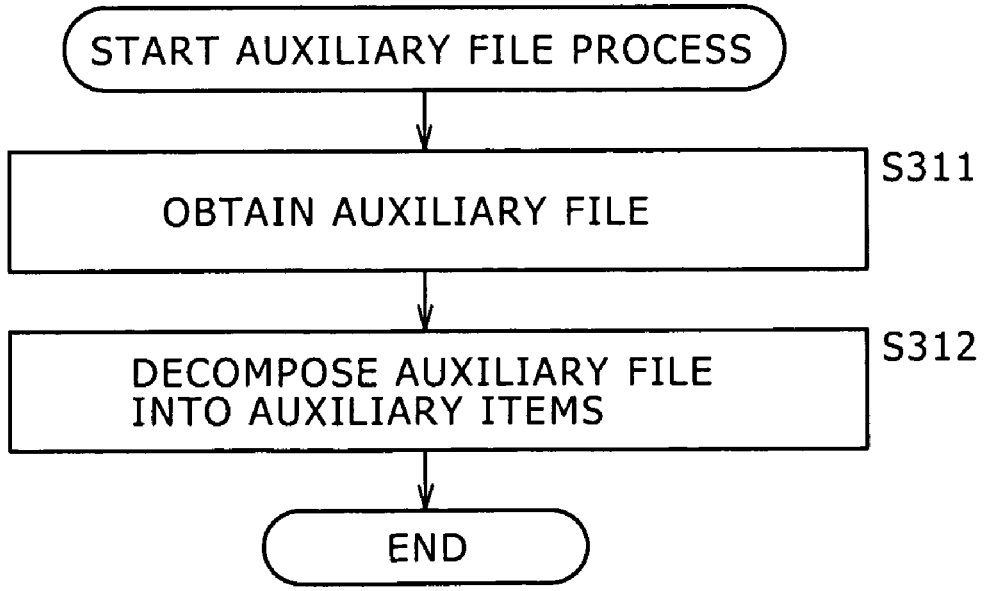
FIG. 55 is a flowchart showing an auxiliary file process.

With reference to the flowchart in FIG. 55, the following describes the auxiliary file process.

The auxiliary file process starts, for example, when the disk drive apparatus 11 reads the master file from the optical disk 7 and stores the master file in the buffer 301.

At Step S311, the file acquisition portion 302 references the master file stored in the buffer 301 to identify the file name of an auxiliary file. Further, at Step S311, the file acquisition portion 302 obtains the auxiliary file based on the file name via the buffer 301 by allowing the disk drive apparatus 11 to read that file from the optical disk 7. The file acquisition portion 302 supplies the auxiliary file to the auxiliary file processing portion 304. The process proceeds to Step S312.

At Step S312, the auxiliary file processing portion 304 decomposes the auxiliary file supplied from the file acquisition portion 302 in units of auxiliary items to extract (obtain) auxiliary items from the auxiliary file. the auxiliary file processing portion 304 supplies the auxiliary items to the data synthesis portion 307 to terminate the auxiliary file process.

Figure 56:
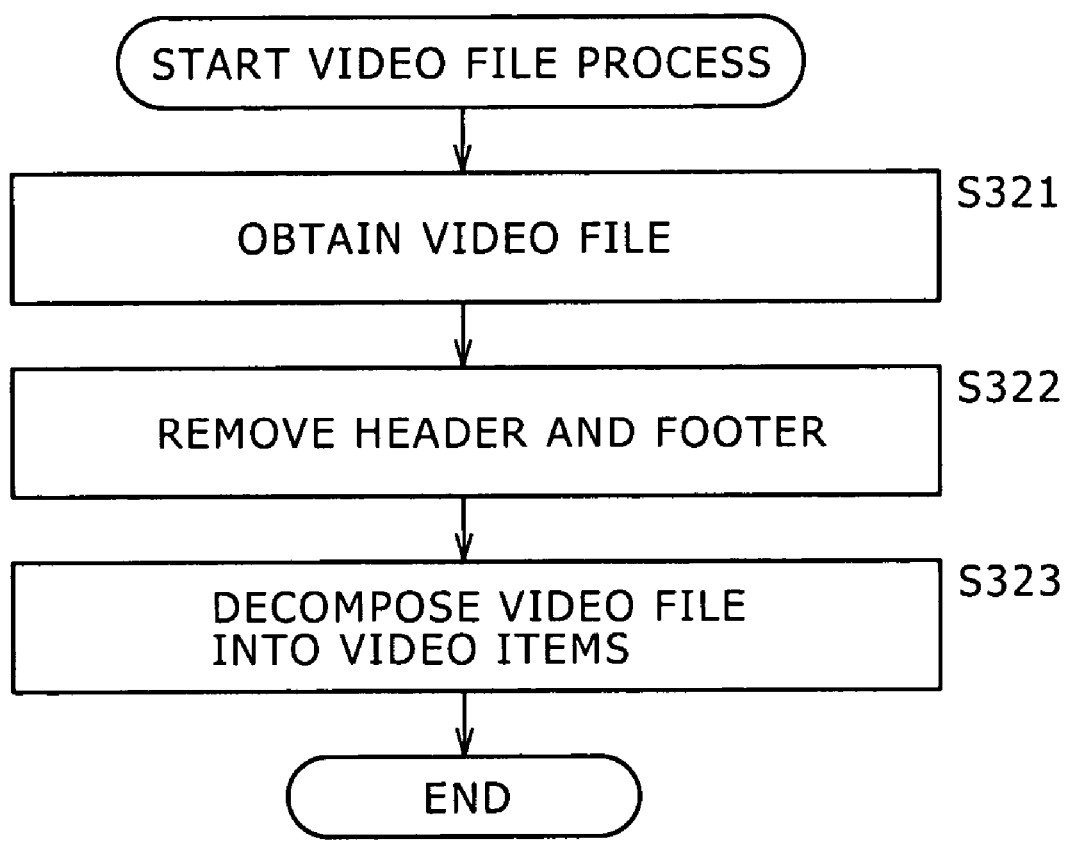
FIG. 56 is a flowchart showing a video file process.

With reference to the flowchart in FIG. 56, the following describes the video file process.

The video file process starts, for example, when the disk drive apparatus 11 reads the master file from the optical disk 7 and stores the master file in the buffer 301.

At Step S321, the file acquisition portion 302 references the master file stored in the buffer 301 to identify the file name of a video file. Further, at Step S321, the file acquisition portion 302 obtains the video file based on the file name via the buffer 301 by allowing the disk drive apparatus 11 to read that file from the optical disk 7. The file acquisition portion 302 supplies the video file to the video file process portion 305. The process proceeds to Step S322.

At Step S322, the header/footer removal portion 311 of the video file process portion 305 (FIG. 51) removes the header and the footer from the video file supplied from the file acquisition portion 302. The header/footer removal portion 311 supplies the remaining body to the decomposition portion 312. The process proceeds to Step S323. At Step S323, the decomposition portion 312 decomposes a sequence of picture items arranged in the body supplied from header/footer removal portion 311 into individual picture items and supplies these picture items to the data synthesis portion 307 to terminate the video file process.

Figure 57:
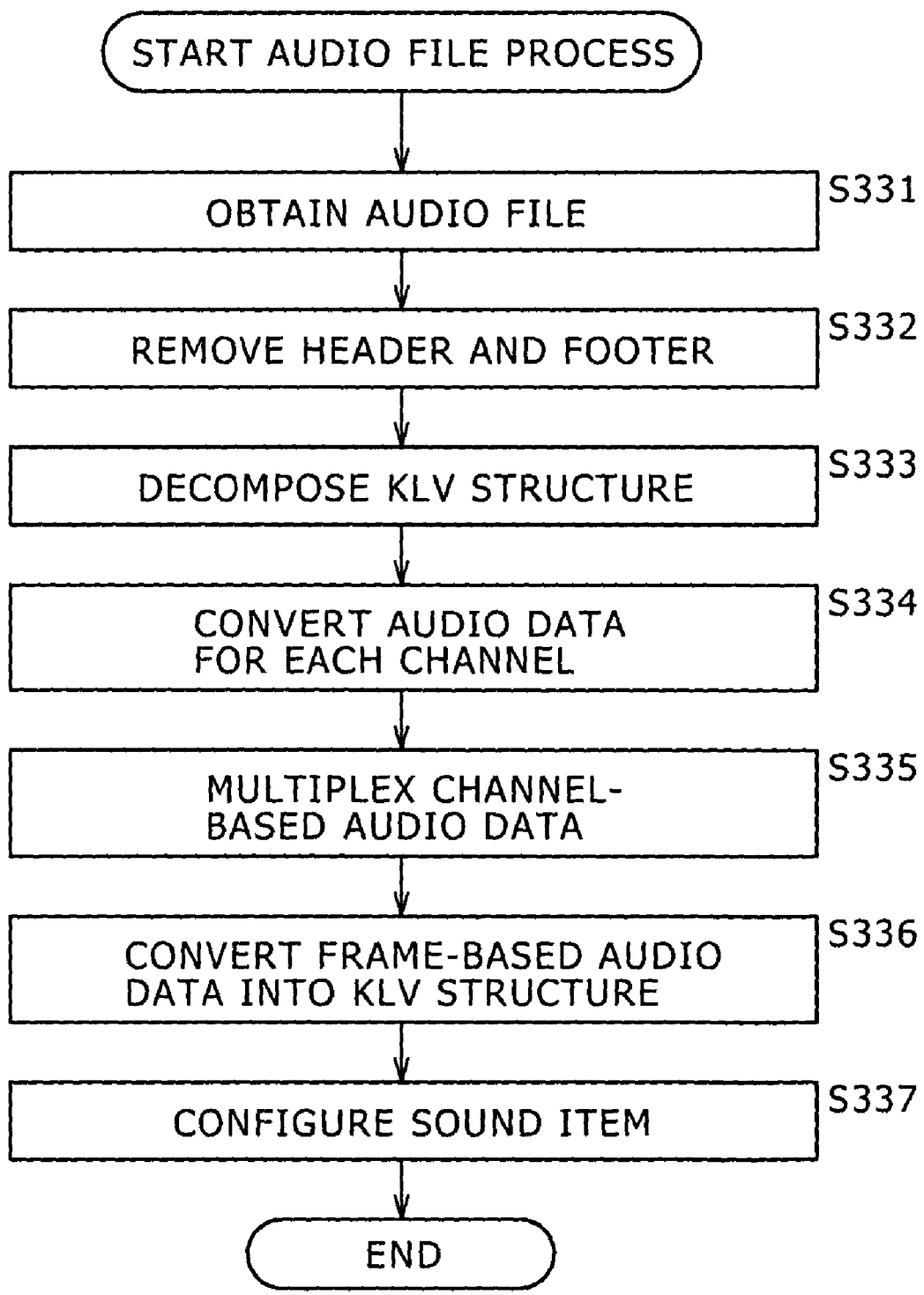
FIG. 57 is a flowchart showing an audio file process.

With reference to the flowchart in FIG. 57, the following describes the audio file process.

The audio file process starts, for example, when the disk drive apparatus 11 reads the master file from the optical disk 7 and stores the master file in the buffer 301.

At Step S331, the file acquisition portion 302 references the master file stored in the buffer 301 to identify the file name of an audio file for each of eight channels. Further, at Step S331, the file acquisition portion 302 obtains the audio files for eight channels based on the file names via the buffer 301 by allowing the disk drive apparatus 11 to read those files from the optical disk 7. The file acquisition portion 302 supplies the audio files to the audio file process portion 306. The process proceeds to Step S332.

At Step S332, the header/footer removal portion 321 of the audio file process portion 106 (FIG. 52) removes the headers and the footers from the audio files for eight channels supplied from the file acquisition portion 302. The header/footer removal portion 321 supplies the remaining body for each channel to the KLV decoder 322. The process proceeds to Step S333. At Step S333, the KLV decoder 322 decomposes the KLV structure of each channel's body supplied from the header/footer removal portion 321. The KLV decoder 322 supplies the resulting WAVE format audio data for each channel to the data conversion portion 323. The process proceeds to Step S334.

At Step S334, the data conversion portion 323 converts each channel's WAVE format audio data supplied from KLV decoder 322 into channel-based AES3 format audio data and supplies this data to the channel multiplexing portion 324. The process proceeds to Step S335. At Step S335, the channel multiplexing portion 324 multiplexes each channel's audio data supplied from the data conversion portion 124 and supplies the resulting multiplexed audio data to the KLV encoder 325. The process proceeds to Step S336.

At Step S336, the KLV encoder 325 divides the multiplexed audio data supplied from the channel multiplexing portion 324 into units corresponding to the frames of the video data. The KLV encoder 325 KLV-codes the multiplexed audio data corresponding to the frame according to the KLV structure. The process proceeds to Step S337. Further, at Step S337, the KLV encoder 325 attaches the necessary filler's KLV structure to the KLV structure of the multiplexed audio data corresponding to each frame. In this manner, the KLV encoder 325 configures a sound item and supplies it to the data synthesis portion 307 to terminate the audio file process.

Figure 58:
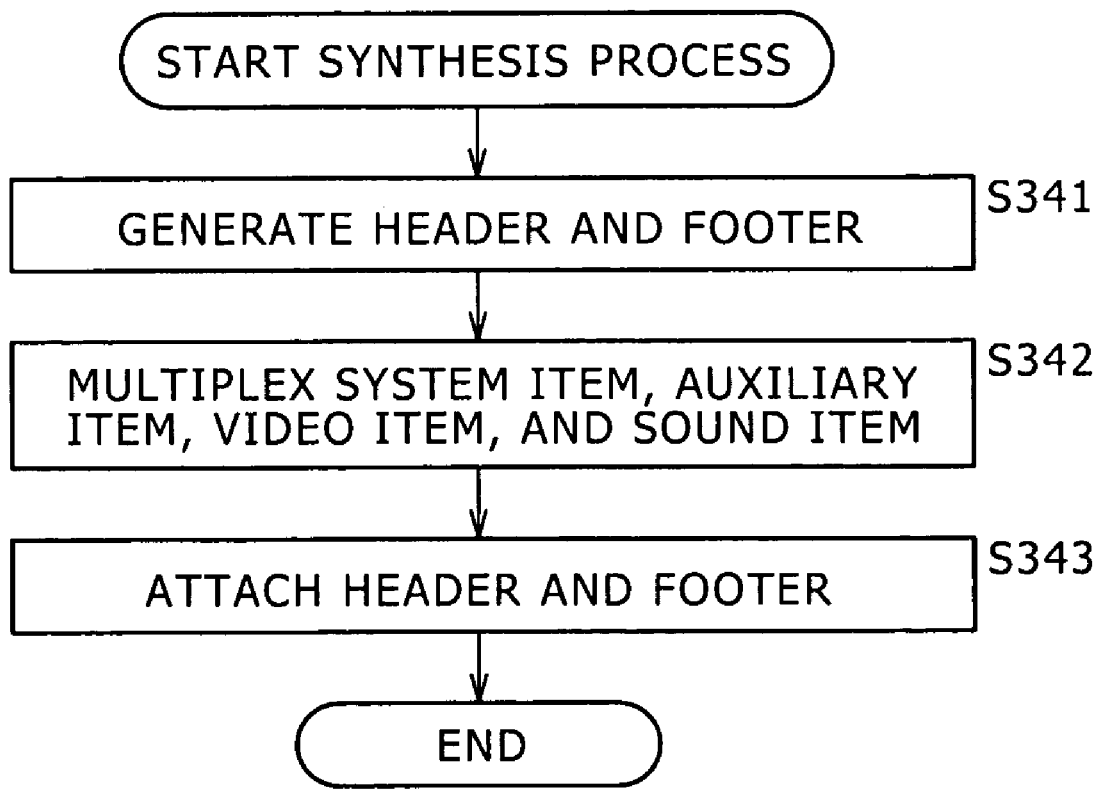
FIG. 58 is a flowchart showing a synthesis process.

With reference to the flowchart in FIG. 58, the following describes the synthesis process.

The synthesis process starts, for example, when the data synthesis portion 307 is supplied with the file-based metadata and the system item from the metadata file processing portion 303, the auxiliary item from the auxiliary file processing portion 304, the picture item from the video file process portion 305, and the sound item from the audio file process portion 306.

At Step S341, the header/footer generation portion 331 of the data synthesis portion 307 (FIG. 53) generates a header and a footer for the standard AV multiplexing format file. Further, the header/footer generation portion 331 arranges the file-based metadata from the metadata file processing portion 303 in the header's header metadata. In addition, at Step S341, the header/footer generation portion 331 supplies the header/footer provision portion 333 with the header and the footer that are obtained as mentioned above. The process proceeds to Step S342.

At Step S342, the multiplexing portion 332 multiplexes the system item output from the metadata file processing portion 303, the auxiliary item output from the auxiliary file processing portion 304, the picture item output from the video file process portion 305, and the sound item output from the audio file process portion 306. The multiplexing portion 332 supplies the resulting multiplexed edit unit sequence as a body to the header/footer provision portion 333. The process proceeds to Step S343.

At Step S343, the header/footer provision portion 333 provides the body supplied from the multiplexing portion 332 with the header and the footer supplied from the header/footer generation portion 331. In this manner, the header/footer provision portion 333 configures and outputs a standard AV multiplexing format file to terminate the synthesis process.

Efficient read and write processes can be provided by configuring a file so that it is sized to bean integral multiple of units of reading and writing on the recording medium.

It may be preferable to generate the second data to be placed at the beginning of the file and the third data to be placed at the end thereof. The second and the third data may be attached to the first, second, or third data to generate the fourth data so that the data amount of the first, second, or third data corresponds to an integral multiple of the unit of reading and writing on a recording medium. In this case, the usability of recording media improves. The more efficient read and write processes can be provided when files are read from or written to recording media.

The sequence of the above-mentioned processes can be implemented on not only the hardware, but also the software. When the sequence of processes is implemented on the software, programs constituting the software are installed on a general-purpose computer and the like.

FIG. 59 embodies the configuration of a computer installed with a program to implement the sequence of the above-mentioned processes.

The program can be previously recorded on a hard disk 405 or ROM 403 as a recording medium contained in the computer.

Alternatively, the program can be temporarily or permanently stored (recorded) on a removable recording medium 411 such as a flexible disk, CD-ROM (Compact Disc Read Only Memory), an MO (Magneto Optical) disk, a DVD (Digital Versatile Disc), a magnetic disk, and semiconductor memory. The removable recording medium 411 can be provided as so-called package software.

In addition to installing the program on the computer from the removable recording medium 411 as mentioned above, the program can be wirelessly transferred to the computer from a download site via an artificial satellite for digital satellite broadcasting or wiredly transferred to the computer via networks such as LAN (Local Area Network) and the Internet. The computer can use a communication portion 408 to receive the transferred program and install it in the built-in hard disk 405.

The computer includes a CPU (Central Processing Unit) 402. The CPU 402 connects with an input/output interface 410 via a bus 401. An input portion 407 is composed of a keyboard, a mouse, a microphone, and the like. When a user operates the input portion, an instruction is input to the CPU 402 via the input/output interface 410. The CPU 402 accordingly executes the program stored in the ROM (Read Only Memory) 403. Alternatively, the CPU 402 loads the program into RAM (Random Access Memory) 404 for execution. The program may be stored in the hard disk 405. The program may be transferred from a satellite or a network, be received at the communication portion 408, and be installed on the hard disk 405. The program may be read from the removable recording medium 411 mounted on the drive 409 and be installed on the hard disk 405. In this manner, the CPU 402 performs the processes according to the above-mentioned flowcharts or the above-mentioned block diagram configurations. Depending on needs, for example, the CPU 402 outputs a process result from an output portion 406 composed of an LCD (Liquid Crystal Display), a speaker, and the like via the input/output interface 410. Alternatively, the CPU 402 transmits the process result from the communication portion 408 and records it on the hard disk 405, for example.

The program may be processed on one computer or multiple computers in a distributed processing fashion. Further, the program may be transferred to a remote computer for execution.

As mentioned above, there is provided the standard AV multiplexing format file where the video data and the audio data are multiplexed and are arranged in the body. There is further provided the AV independent format file where the video data or the audio data is collectively arranged in the body. The standard AV multiplexing format file and the AV independent format file are mutually converted. For example, the standard AV multiplexing format can be used to transmit files (exchange or stream files) via the network 4. The AV independent format can be used to record files on the optical disk 7.

When an AV independent format file is recorded on the optical disk 7, it is possible to easily perform the AV independent editing, for example.

The AV independent format allows frame-based metadata to be collectively (integrally) arranged in a single file (frame-based metadata file). The frame-based metadata can be fast retrieved.

Further, the AV independent format uses the WAVE coding system for audio data, making it possible to decrease the data amount of audio data compared to the standard AV multiplexing format that uses the AES3 coding system.

The AV independent format uses the header, the body, and the footer having the same format as the standard AV multiplexing format. Further, the header and the footer have the same format as the standard AV multiplexing format. Accordingly, a standard apparatus compliant with the standard AV multiplexing format can transmit and receive AV independent format files and read or write these files on recording media.

With respect to the standard AV multiplexing format file, the body contains multiple essences such as the video data, the audio data, the user data, and the frame-based metadata in a multiplexed fashion. By contrast, with respect to the AV independent format files (video files and audio files), the body contains only video data or audio data. Therefore, the AV independent format file can be an MXF file whose body is composed of a single essence. An apparatus that can interpret the MXF having the single-essence body can read the contents of a video file or an audio file that is an MXF file having the single-essence body.

According to the embodiment, the disk apparatus 1 reads and writes AV independent format files on the optical disk 7. In addition, AV independent format files can be read from or written to not only disk-shaped recording media such as the optical disk 7, but also tape-shaped recording media such as magnetic tape, semiconductor memory, and the like.

The embodiment in FIG. 1 configures the single disk apparatus 1 composed of the disk drive apparatus 11, the format conversion portion 12, and the communication I/F 13. Further, it is possible to provide the disk drive apparatus 11, the format conversion portion 12, and the communication I/F 13 as independent apparatuses.

The embodiment uses MXF compliant files as standard AV multiplexing format files. Standard AV multiplexing format files may include not only MXF compliant files, but also a file that is composed of the header, the body, and the footer, and contains two (or more) pieces of any multiplexed data.

According to the embodiment, the multiplexed video data and audio data is arranged in the body of a standard AV multiplexing format file. In addition, the standard AV multiplexing format file's body may contain multiplexed (stream of) two or more pieces of video data or multiplexed (stream of) two or more pieces of audio data, for example.

INDUSTRIAL APPLICABILITY

As mentioned above, the first invention can provide efficient read and write processes.

The first invention can improve the usability of recording media and efficiently read and write files to recording media.

The second invention can provide efficient read and write processes.

The second invention can improve the usability and efficiently read and write files to recording media.

The invention claimed is:

1. A file generation apparatus for generating a file of first data to be recorded on a recording medium, the file generation apparatus comprising:
memory means for storing data;
first generation means for generating second data to be arranged at the beginning of the file;
second generation means for generating third data to be arranged at the end of the file; and
third generation means for generating fourth data as stuffing data which allows the data amount of each of the first, second, and third data to be an integral multiple of a unit of reading or writing to the recording medium by adding the fourth data to the first data, the second data, and the third data,
wherein the first data includes a body portion of the file, the second data includes a header portion of the file, and the third data includes a footer portion of the file,
wherein the first data is converted from a standard AV multiplexing file that has frame-based video and audio data, the first data being either video data or audio data organized according to an edit unit, and when the first data is video data, the first data corresponding to each edit unit matches a boundary of a sector unit of the recording medium,
wherein the second data and the third data have a format that is the same as the format of the standard AV multiplexing file, and
wherein the stuffing data has a KLV structure.

2. The file generation apparatus according to claim 1, wherein the first generation means generates the second data.

3. The file generation apparatus according to claim 1, wherein the first generation means further comprises format conversion means for converting the first data into a KLV (Key, Length, Value) structure; and
wherein the first generation means generates the second data composed of the file's header, and a key and a length arranged between the header and the first data.

4. The file generation apparatus according to claim 1, wherein the third generation means generates the fourth data by making an addition to each of N−1 portions of the first data toward the beginning out of the first data divided into N portions, where N is an integer, so that the data amount of each of the first data divided into N−1 portions becomes an integral multiple of a physical unit area of the recording medium and the overall data amount of the first data becomes an integral multiple of the unit of reading and writing on the recording medium.

5. The file generation apparatus according to claim 1, wherein the third generation means generates the fourth data for the first data divided into units corresponding to specified reproduction times with video data and audio data for a plurality of channels multiplexed in accordance with the divided units so that the data amount for each of divided units of the first data corresponds to an integral multiple of the unit of reading and writing on the recording medium.

6. The file generation apparatus according to claim 5, wherein the third generation means generates the fourth data so that the data amount totaling partition data for separating divided portions of the first data from each other, metadata contained in each of divided portions of the first data, and the video data corresponds to an integral multiple of the unit of reading and writing on the recording medium.

7. The file generation apparatus according to claim 5, wherein the third generation means generates the fourth data so that the data amount of each of divided portions of the audio data contained in each of divided portions of the first data corresponds to an integral fraction of the unit of reading and writing on the recording medium and the overall data amount of the audio data corresponds to an integral multiple of the unit of reading and writing on the recording medium.

8. A method of generating a file of first data recorded on a recording medium, comprising:
a first generation step of generating second data to be arranged at the beginning of the file;
a second generation step of generating third data to be arranged at the end of the file;
a third generation step of generating fourth data as stuffing data which allows the data amount of each of the first, second, and third data to be an integral multiple of a unit of reading or writing to the recording medium by adding the fourth data to the first data, the second data, and the third data; and
a converting step of converting the first data from a standard AV multiplexing file that has frame-based video and audio data, the first data being either video data or audio data organized according to an edit unit, wherein when the first data is video data, the first data corresponding to each edit unit matches a boundary of a sector unit of the recording medium, wherein the first data includes a body portion of the file, the second data includes a header portion of the file, and the third data includes a footer portion of the file, wherein the second data and the third data have a format that is the same as the format of the standard AV multiplexing file, and wherein the stuffing data has a KLV structure.

9. A computer-readable medium storing an executable program, that when executed, causes a computer to perform a file generation process of generating a file of first data, the program comprising:

a first generation step of generating second data to be arranged at the beginning of the file;

a second generation step of generating third data to be arranged at the end of the file;

a third generation step of generating fourth data as stuffing data which allows the data amount of each of the first, second, and third data to be an integral multiple of a unit of reading or writing to the recording medium by adding the fourth data to the first data, the second data, and the third data; and a converting step of converting the first data from a standard AV multiplexing file that has frame-based video and audio data, the first data being either video data or audio data organized according to an edit unit, wherein when the first data is video data, the first data corresponding to each edit unit matches a boundary of a sector unit of the recording medium, wherein the first data includes a body portion of the file, the second data includes a header portion of the file, and the third data includes a footer portion of the file, wherein the second data and the third data have a format that is the same as the format of the standard AV multiplexing file, and wherein the stuffing data has a KLV structure.

10. A recording medium to record a file of first data, wherein first additional data as stuffing data is added to record the first data whose data amount corresponds to an integral multiple of a unit of reading or writing to the recording medium so that a boundary of the first data matches a boundary of the unit;

wherein second data is arranged at the beginning of the file and is attached with second additional data as stuffing data to have the data amount corresponding to an integral multiple of the unit so that a boundary of the second data matches a boundary of the unit; and wherein third data is arranged at the end of the file and is attached with third additional data as stuffing data to have the data amount corresponding to an integral multiple of the unit so that a boundary of the third data matches a boundary of the unit, wherein the first data includes a body portion of the file, the second data includes a header portion of the file, and the third data includes a footer portion of the file, wherein the first data is converted from a standard AV multiplexing file that has frame-based video and audio data, the first data being either video data or audio data organized according to an edit unit, and when the first data is video data, the first data corresponding to each edit unit matches a boundary of a sector unit of the recording medium, wherein the second data and the third data have a format that is the same as the format of the standard AV multiplexing file, and wherein the stuffing data has a KLV structure.

* * * * *